United States Patent
Hyde et al.

(10) Patent No.: US 8,776,145 B2
(45) Date of Patent: *Jul. 8, 2014

(54) IN-TRANSIT ELECTRONIC MEDIA WITH LOCATION-BASED CONTENT

(75) Inventors: Roderick A. Hyde, Redmond, WA (US); Muriel Y. Ishikawa, Livermore, CA (US); Jordin T. Kare, Seattle, WA (US); David B. Tuckerman, Lafayette, CA (US); Thomas A. Weaver, San Mateo, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 146 days.

This patent is subject to a terminal disclaimer.

(21) Appl. No.: 13/200,097

(22) Filed: Sep. 16, 2011

(65) Prior Publication Data

US 2013/0074111 A1    Mar. 21, 2013

Related U.S. Application Data

(63) Continuation-in-part of application No. 13/200,101, filed on Sep. 16, 2011, and a continuation-in-part of application No. 13/200,099, filed on Sep. 16, 2011.

(51) Int. Cl.
*H04N 7/173* (2011.01)

(52) U.S. Cl.
USPC ............... 725/75; 725/74; 725/81; 725/83; 725/85

(58) Field of Classification Search
CPC .......... H04N 21/414; H04N 21/41407; H04N 21/41415; H04N 21/41422
USPC .................................. 725/74–77, 81–82, 85
See application file for complete search history.

(56) References Cited

U.S. PATENT DOCUMENTS

| 5,547,248 A | 8/1996 | Marechal |
| 5,568,484 A | 10/1996 | Margis |

(Continued)

FOREIGN PATENT DOCUMENTS

JP    2006155546 A  *  6/2006

OTHER PUBLICATIONS

Freed, Joshua; "Midwest Airlines name dropped in favor of Frontier"; The Salt at Lake Tribune; Apr. 13, 2010; 1 page; located at http://www.sltrib/com/portlet/article/html;fragments/print_article.jsp?a . . . .

(Continued)

*Primary Examiner* — Hai V Tran

(57) ABSTRACT

Exemplary methods, systems and components are implemented on a multipassenger transit vehicle to provide passenger access to a pre-assigned interactive electronic media device associated with a passenger identification (ID) code or associated with an on-board situs location. The electronic media device may include a storage component, and a battery module that can periodically be replaced or recharged. Security techniques may provide protection against unauthorized usage of each electronic media device, and also help prevent unauthorized removal of the electronic media device from its approved location in the transit vehicle. Selective content may be accessible or downloaded via a communication node, wherein such content may include application programs or informational data specifically correlated with a media device location or a designated vehicle passenger. Selective content and/or operation capability for the electronic media device may be varied based on predetermined qualifications or passenger request.

51 Claims, 49 Drawing Sheets

(56) References Cited

U.S. PATENT DOCUMENTS

| | | |
|---|---|---|
| 5,610,822 A | 3/1997 | Murphy |
| 5,801,751 A | 9/1998 | Sklar et al. |
| 5,826,043 A | 10/1998 | Smith et al. |
| 6,748,597 B1 | 6/2004 | Frisco et al. |
| 6,775,562 B1 | 8/2004 | Owens et al. |
| 6,813,777 B1 | 11/2004 | Weinberger et al. |
| 7,100,187 B2 | 8/2006 | Pierzga et al. |
| 7,114,171 B2 | 9/2006 | Brady, Jr. et al. |
| 7,119,686 B2 | 10/2006 | Bertness et al. |
| 7,124,426 B1 | 10/2006 | Tsuria et al. |
| 7,342,513 B2 | 3/2008 | Meyer |
| 7,370,831 B2 | 5/2008 | Laib et al. |
| 7,457,647 B2 | 11/2008 | Owens et al. |
| 7,587,733 B2 | 9/2009 | Keen et al. |
| 7,587,734 B2 | 9/2009 | Logan et al. |
| 7,597,286 B2 | 10/2009 | Callahan et al. |
| 7,671,559 B2 | 3/2010 | Ludtke |
| 7,676,225 B2 | 3/2010 | Funderburk et al. |
| 7,750,639 B2 | 7/2010 | Quint et al. |
| 7,777,612 B2 | 8/2010 | Sampson et al. |
| 7,836,472 B2 | 11/2010 | Brady, Jr. et al. |
| 7,853,201 B1 | 12/2010 | Fujisaki |
| 7,888,909 B2 | 2/2011 | Larsen et al. |
| 2001/0044330 A1 | 11/2001 | Arnold |
| 2002/0195992 A1 | 12/2002 | Lee et al. |
| 2003/0084451 A1 | 5/2003 | Pierzga et al. |
| 2005/0256616 A1 | 11/2005 | Rhoads |
| 2005/0267650 A1 | 12/2005 | Carpenter et al. |
| 2006/0095162 A1 | 5/2006 | Schafer, Jr. et al. |
| 2006/0107295 A1 | 5/2006 | Margis et al. |
| 2006/0174285 A1 | 8/2006 | Brady, Jr. et al. |
| 2007/0057576 A1 | 3/2007 | Lee |
| 2007/0120038 A1 | 5/2007 | Wang et al. |
| 2007/0199028 A1 | 8/2007 | Yau |
| 2007/0213009 A1 | 9/2007 | Higashida et al. |
| 2008/0040756 A1 | 2/2008 | Perlman et al. |
| 2008/0062135 A1 | 3/2008 | Meckesheimer et al. |
| 2008/0085691 A1 | 4/2008 | Harvey et al. |
| 2008/0258680 A1 | 10/2008 | Frerking et al. |
| 2008/0309297 A2 | 12/2008 | Brown et al. |
| 2009/0007194 A1 | 1/2009 | Brady, Jr. et al. |
| 2009/0041228 A1 | 2/2009 | Owens et al. |
| 2009/0091422 A1 | 4/2009 | Minoo et al. |
| 2009/0117919 A1 | 5/2009 | Hershenson |
| 2010/0138581 A1 | 6/2010 | Bird et al. |
| 2010/0138582 A1 | 6/2010 | Bird et al. |
| 2010/0138879 A1 | 6/2010 | Bird et al. |
| 2010/0162325 A1* | 6/2010 | Bonar .............................. 725/76 |
| 2010/0167787 A1* | 7/2010 | Weisbrod ...................... 455/566 |
| 2010/0186051 A1 | 7/2010 | vonDoenhoff et al. |
| 2010/0189089 A1 | 7/2010 | Lynch et al. |
| 2010/0205333 A1 | 8/2010 | Francois et al. |
| 2010/0333164 A1 | 12/2010 | Schultz et al. |
| 2011/0004832 A1 | 1/2011 | Canal et al. |
| 2011/0034058 A1 | 2/2011 | Riedel et al. |
| 2011/0219407 A1* | 9/2011 | Margis et al. .................. 725/75 |
| 2012/0057259 A1 | 3/2012 | Yang et al. |
| 2012/0057476 A1* | 3/2012 | Chan et al. .................... 370/252 |

OTHER PUBLICATIONS

"Shiff Reader: The Ultimate E-Reader"; www.thecoolist.com; Jan. 7, 2010; pp. 1-4; located at http://www.thecoolist.com/shiff-reader-the-ultimate-e-reader.

"Fast Battery Charger"; VEX Wiki; printed on Mar. 28, 2012; 1 page.

U.S. Appl. No. 13/458,125, Hyde et al.

U.S. Appl. No. 13/200,101, Hyde et al.

U.S. Appl. No. 13/200,099, Hyde et al.

* cited by examiner

FIG. 3

MATRIX TABLE FOR DEVICE SERVICING & PASSENGER USAGE OF APPLICATIONS / CONTENT

300

| PASSENGER PURCHASES TRAVEL TICKET 305 | PASSENGER BOARDING PASS ISSUED 310 | USER ID CODE FOR ELECTRONIC MEDIA DEVICE IS ENTERED 315 | MEDIA DEVICE DORMANT MODE DURING PRE-FLIGHT TAXI & TAKEOFF 320 | MEDIA DEVICE ACTIVE MODE DURING ASCENT TO CRUISING ALTITUDE 325 |
|---|---|---|---|---|
| CERTAIN CONTENT & OPERATION CAPABILITY ARE SELECTED BASED ON PASSENGER REQUEST AND/OR PASSENGER DEMOGRAPHICS 311 | | ELECTRONIC MEDIA DEVICE IS ACTIVATED BUT REMAINS IN DORMANT MODE 316 | PASSENGER INPUTS REQUEST FOR ADDITIONAL CONTENT AVAILABLE FROM NODE 321 | ADDITIONAL CONTENT DOWNLOADED FROM NODE TO PASSENGER'S ELECTRONIC MEDIA DEVICE 326 |
| PRE-SELECTED CONTENT (APPL'N PROGRAMS AND INFORMATIONAL DATA) IS TRANSFERRED TO STORAGE MODULE FOR PASSENGER'S ASSIGNED ELECTRONIC MEDIA DEVICE 312 | | A SECURITY PROTOCOL CONFIRMS PROPER SITUS LOCATION AND USER ID MATCHUP FOR ELECTRONIC MEDIA DEVICE 317 | USER INPUTS PRE-PAY AUTHORIZATION FOR FOOD & BEVERAGE, AND FOR ANY AUDIO AND/OR VIDEO CONTENT CHARGES 322 | TEXT MESSAGING WITH RELATED ON-BOARD MEDIA DEVICES VIA LOCALIZED TRANSIT NETWORK, ACCESS TO STORED CONTENT 327 |

SECURITY MONITORING 349

| MEDIA DEVICE ACTIVE MODE DURING CRUISING ALTITUDE 330 | MEDIA DEVICE ACTIVE MODE DURING FOOD & BEVERAGE SERVICE 335 | MEDIA DEVICE DORMANT MODE DURING STAFF MESSAGES & BATTERY SERVICING 340 | MEDIA DEVICE ACTIVE MODE DURING DESCENT & LANDING 345 | MEDIA DEVICE DORMANT MODE AFTER PASSENGER EXIT 350 |
|---|---|---|---|---|
| TEXT MESSAGING AND VOICE MESSAGING ALLOWED VIA EXTERNAL SATELLITE OR TOWER TRANSMISSION 331 | FURTHER PASSENGER INPUT REQUESTS FOR ADDITIONAL CONTENT & FOR OTHER PRE-PAY AUTHORIZATIONS 332 | BATTERY STATUS CHECKED, RECHARGED OR REPLACED FROM PORTABLE CART, AND CONTENT DOWNLOADS FROM ON-BOARD NODE 341 | NEW CONTENT DOWNLOADED REGARDING DESTINATION, FLIGHT TRANSFERS & BAGGAGE 346 | CUSTOMIZED CONTENT & DATA PURGED FROM STORAGE MODULE, BATTERY STATUS CHECKED 351 |
| TEXT MESSAGING & VOICE MESSAGING ALLOWED WITH ON-BOARD ELECTRONIC MEDIA DEVICES & STAFF VIA LOCAL NETWORK, ACCESS TO STORED CONTENT 333 | | TEXT MESSAGING WITH STAFF, ACCESS TO STORED CONTENT 342 | ACCESS TO STORED CONTENT 347 | DETECTED LOW OR BAD BATTERY IS RECHARGED OR REPLACED AT ON-BOARD OR OFF-BOARD LOCATION 352 |

349
SECURITY MONITORING FOR CONTENT INTEGRITY & MEDIA DEVICE USAGE & SITUS/USER ID MATCHUP

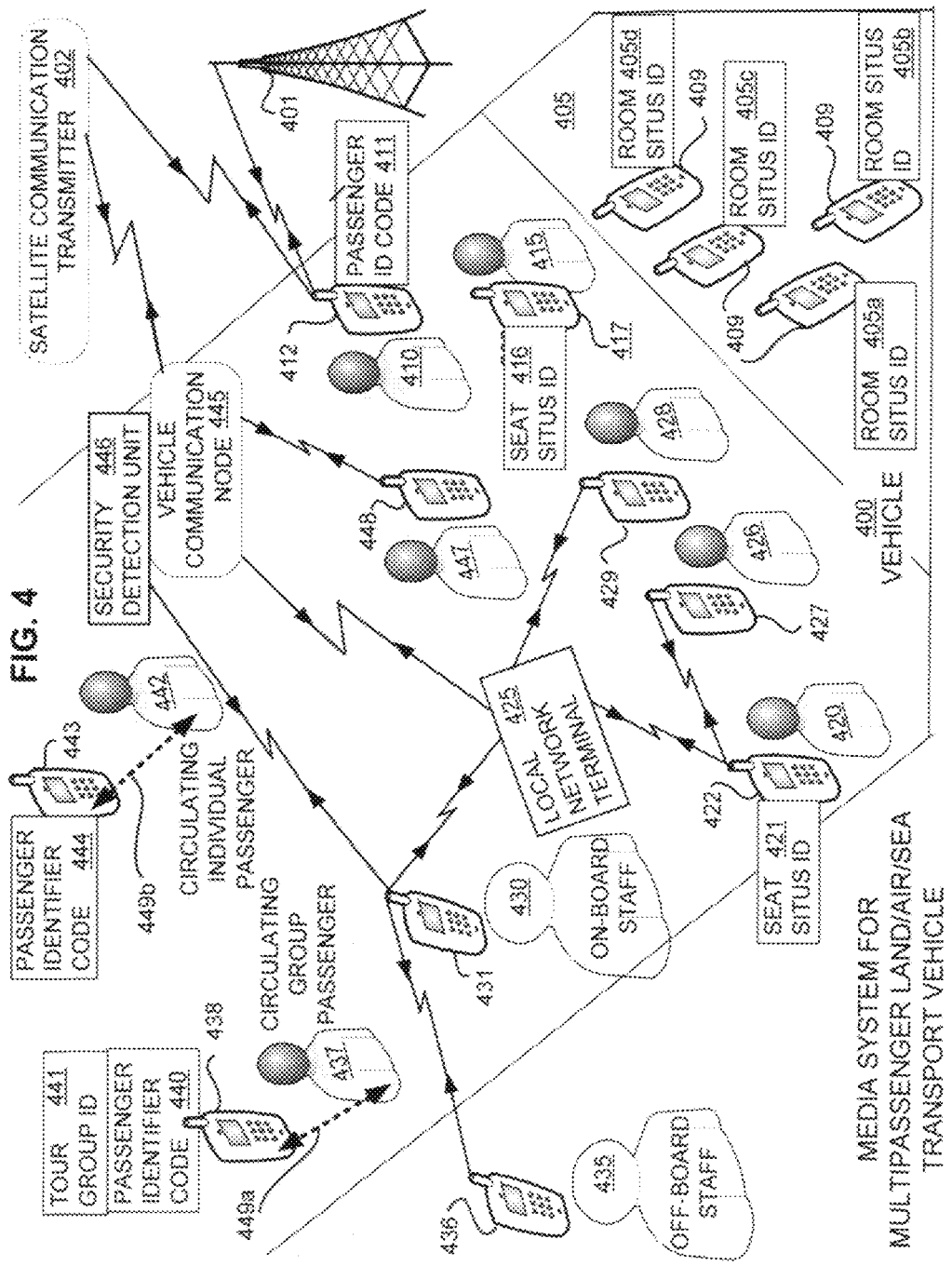

IN-TRANSIT ELECTRONIC MEDIA WITH LOCATION-BASED CONTENT

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. application Ser. No. 13/200,101 entitled IN-TRANSIT ELECTRONIC MEDIA WITH CUSTOMIZED PASSENGER-RELATED CONTENT, naming Roderick A. Hyde, Muriel Y. Ishiwaka, Jordin T. Kare, David B. Tuckerman, Thomas A. Weaver, Lowell L. Wood, Jr. as inventors filed 16 Sep. 2011, which is currently co-pending, or is an application of which a currently co-pending application is entitled to the benefit of the filing date.

For purposes of the USPTO extra-statutory requirements, the present application constitutes a continuation-in-part of U.S. application Ser. No. 13/200,099 entitled SECURE ELECTRONIC MEDIA FOR IN-TRANSIT PASSENGER USAGE, naming Roderick A. Hyde, Muriel Y. Ishiwaka, Jordin T. Kare, David B. Tuckerman, Thomas A. Weaver, Lowell L. Wood, Jr. as inventors filed 16 Sep. 2011, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BACKGROUND

The present application relates to electronic media devices available to individual to individual users in a multipassenger vehicle, including techniques for content management and operational control, and related methods, systems, components, computerized apparatus, software program products, and communication techniques.

SUMMARY

In one aspect, an exemplary method for selective media content available to on-board passengers in a multipassenger transport vehicle may include displaying selected alphanumeric content and/or visual content in an interactive electronic media device that is accessible based on an assigned place or space occupied by an approved passenger in the multipassenger transport vehicle; providing a separate storage component respectively coupled to the interactive electronic media device; and enabling a communication node to install or update or replace or delete content including certain application programs and/or informational data in the separate storage component during a dormant operational mode or during an active operational mode. Additional aspects may include establishing a situs identifier for the assigned place or space in the transport vehicle, wherein the situs identifier determines a category or type of the selected content correlated with the interactive electronic media device accessible to the approved passenger; and operatively connecting an individual battery module with the electronic media device to supply independent electrical power while the multipassenger transport vehicle is in transit.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In another aspect, an exemplary system includes but is not limited to computerized components incorporated with and/or linked to electronic media devices in a multipassenger vehicle, which system has the capability to implement the various process features disclosed herein. Examples of various system aspects are described in the claims, drawings, and text forming a part of the present disclosure.

Some embodiments for a computerized electronic media system for a multipassenger transport vehicle may include an electronic media device located at a specified on-board site and configured for displaying alphanumeric content and/or visual content that is accessible in transit to an approved passenger, wherein the electronic media device is independently powered by its respective battery module; and including a storage component coupled to the electronic media. Further possible aspects may include a communication node configured to install or update or replace or delete certain application programs and/or informational data in the storage component; and a situs identifier correlated with the specified on-board site, wherein the situs identifier determines a category or type of content that is accessible in transit for interactive access by the approved passenger.

In a further aspect, a computer program product may include computer-readable media having encoded instructions that execute a method for facilitating management and control of selective media content to be available in a multipassenger transport vehicle, wherein a possible method embodiment includes providing selected alphanumeric and/or visual content to an interactive display component of an electronic media device that is accessible to an approved in transit passenger located at an assigned place or space; and maintaining such selected content in a separate storage component respectively coupled to the electronic media device. Additional programmed method aspects may include enabling a communication node to install or replace or delete content including certain application programs and/or informational data in the separate storage component during a dormant operational mode or during an active operational mode; confirming a situs identifier for the assigned place or space in the transport vehicle, wherein the situs identifier determines a category or type of the aforesaid content correlated with the electronic media device accessible to the approved passenger; and drawing energy for the electronic media device from an individual battery module that supplies independent electrical power while the multipassenger transport vehicle is in transit.

Additional aspects may be incorporated in an electronic media device intended for on-board use in a multipassenger transport vehicle, including an interactive display component located at a specified on-board site accessible to an individual passenger or group of passengers; and a controller module operatively connected with the interactive display component, wherein the controller module is configured to provide a dormant operational mode during a first time period and to provide an active operational mode during a second time period. Other exemplary aspects may include storage media respectively incorporated with or linked to each electronic media device, and configured to maintain content including one or more application programs and/or various informational data in memory during the dormant and active operational modes, wherein the aforesaid content and/or a functional operation capability available in each electronic media device is at least partially determined by a situs identifier correlated with the specified on-board site; and an individual battery module operatively connected with each electronic media device in a manner to supply independent electrical power to the electronic media device when the multipassenger transport vehicle is in transit.

In addition to the foregoing, various other method and/or system and/or program product aspects are set forth and described in the teachings such as text (e.g., claims and/or detailed description) and/or drawings of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 3 shows an exemplary lookup data table for programmed servicing and usage schedules applicable to the interactive media devices.

FIGS. 4-5 are additional schematic block diagrams depicting exemplary system embodiment features.

DETAILED DESCRIPTION

Figure 1:
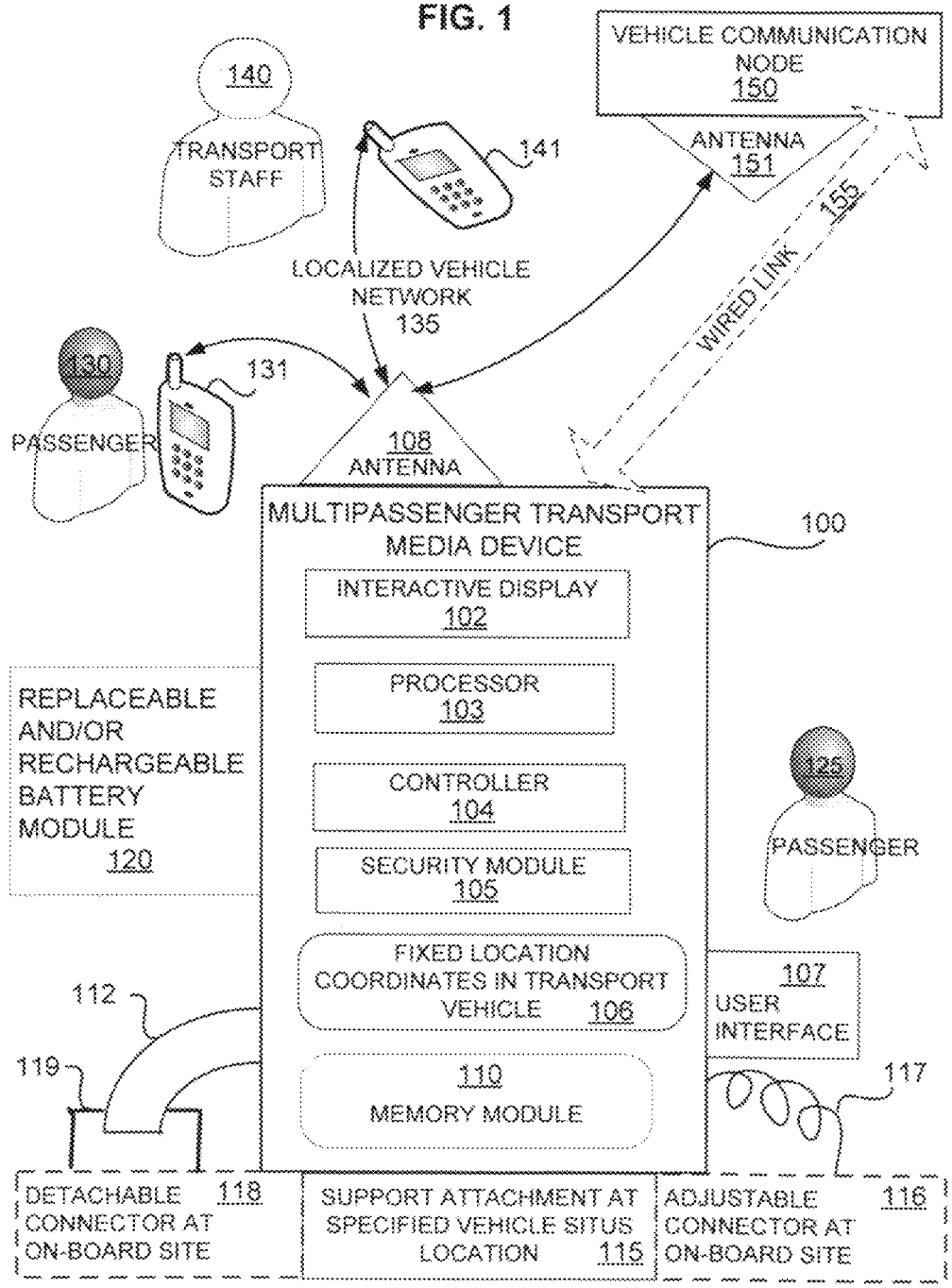
FIG. 1 is a schematic block diagram illustrating exemplary embodiment features for an interactive multipassenger transport media device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences.

In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory or location even if components are located outside the territory or location. For example, in a distributed computing context, use of a distributed computing system may occur in a territory or location even though parts of the system may be located outside of the territory or location (e.g., relay, server, processor, signal-bearing medium, transmitting computer, receiving computer, etc. located outside the territory or location).

A sale of a system or method may likewise occur in a territory even if components of the system or method are located and/or used outside the territory. Further, implementation of at least part of a system for performing a method in one territory does not preclude use of the system in another territory.

As used herein, the term "transport vehicle" encompasses devices for conveying persons or objects, including without limitation automobiles, trucks, motorcycles, buses, trains, and other land conveyances, boats, ferries, ships, submarines, underwater vehicles, and other watergoing vessels, aircraft, spacecraft, and other airborne transports.

FIG. 1 is a schematic block diagram illustrating an exemplary multipassenger transport media device 100 that includes an interactive display 102, processor 103, controller 104, security module 105, fixed location coordinates in transport vehicle 106, and memory module 110. A vehicle passenger 125 is provided access by user interface 107 to the multipassenger transport media device 100 in accordance with various timetable guidelines and security limitations.

Power for the multipassenger transport media device 100 is provided by a replaceable and/or rechargeable battery module 120 that is associated with its respective transport media device. This enables the in-transit operation of the multipassenger transport media device 100 without having to draw power from the centralized electrical bus of the transport vehicle.

As shown in FIG. 1, exemplary security features may include a support attachment 115 at a specified vehicle situs location, which may help prevent unauthorized removal of the media device from its specified vehicle situs location as well as provide a mounting slot or hook or the like during periods of non-use by the passenger. In some instances the support attachment 115 may be configured to include an adjustable connector 116 such as a flex-cord 117 or the like at the on-board site to allow restrictive but user-friendly mobility (e.g., handheld, traytop, standup, sitdown, etc) while in use.

In other instances the support attachment 115 may be configured to include a detachable connector 118 at the on-board site to facilitate greater mobility for the electronic media device while in use or during a servicing task (e.g., authorized on-board circulating passenger, recharging or replacing battery, replacement of defective device, etc.). A possible detachable connector may include a support arm 112 on the media device that engages an electronic latch 119 at the on-board site such that any removal of the electronic media device 100 generates a status signal or warning alarm.

In some embodiments, the electronic media device 100 may be fixedly mounted for better security on the support attachment 115, and user interaction may nevertheless be accomplished by touch-screen or mouse or voice or gesture or the like without having to relocate the electronic media device from its support attachment 115.

It will be understood that electronic media device 100 may be configured for wireless (e.g., see antennas 108 and 151) and/or wired (e.g., see wired link 155) communication channels in order to facilitate various functional operations or messages via a localized vehicle network 135. In that regard, communication links are possible with other on-board persons (e.g., passenger 130 with their respective electronic media device 131, transport staff 140 with their transceiver 141) and/or with on-board or off-board transport vehicle communication node 150. The vehicle communication node 150 may be adapted to provide control functions as well a periodic downloading of selected content that include application programs and/or informational data correlated with individual on-board interactive electronic media devices (e.g., 100, 131) and/or designated in-transit passengers (e.g., 125, 130).

Figure 2:
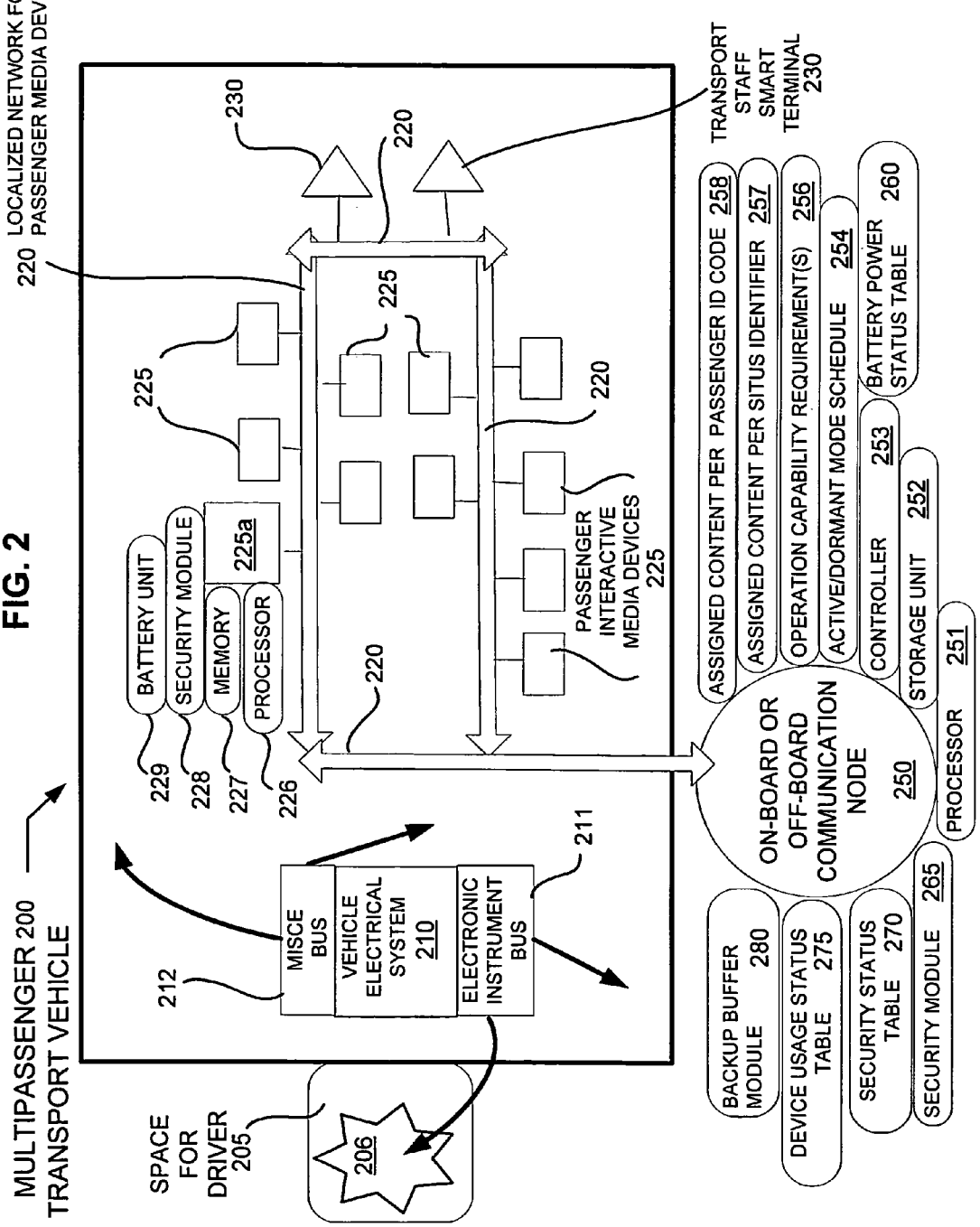
FIG. 2 is a schematic block diagram depicting an exemplary system embodiment for multiple passenger interactive media devices in a transport vehicle.

The schematic block diagram of FIG. 2 illustrates an embodiment for multipassenger transport vehicle 200 which includes various passenger interactive media devices 225 that are linked together via localized network 220, as well as having a further communication channel with an on-board or off-board communication node 250. On-board transport staff 230 may also be linked to the localized network 220.

An electronic interactive media device 225a may include processor 226, memory 227, security module 228, and its individual battery unit 229. This individual battery unit 229 provides an independent power source for electronic interactive media device 225a, and therefore provides additional benefits by eliminating the need for electronic interactive media devices 225, 225a to draw power from the vehicle electrical system 210 during travel from an embarcation point to a destination point. As indicated in FIG. 2, the vehicle electrical system may typically include centralized electrical circuits including miscellaneous bus 212 for conventional vehicle electrical components (not shown) and electronic instrument bus 211 for critical vehicle instrumentation such as navigational and diagnostic electrical components 206 located in a vehicle driver space 205.

The on-board or off-board communication node 250 may include processor 251, storage unit 252, controller 253 to facilitate management and control regarding customized content and operation functionality for individual interactive electronic media devices 225, 225a. In that regard, various lookup data tables or other database-type records applicable to a specific on-board site and/or to a designated passenger must be promptly updated and maintained based on data inputs that are provided directly from individual passengers and/or from transport staff and/or from communication nodes configured with circuitry or programmed algorithms. The illustrated examples shown in FIG. 2 include an active/dormant mode schedule 254, one or more operation capability requirements 256, assigned content per situs identifier 257, assigned content per passenger ID code 258, and battery power status table 260.

Security matters which are monitored and controlled by security module 265 also require maintaining updated lookup data tables or database type records regarding a specific on-board site and/or to a designated passenger including, for example, security status table 270, and device usage status table 275. Also shown in the embodiment of FIG. 2 is a backup buffer module 280 configured to include a data retrieval protocol sufficient to transfer appropriate application programs and/or informational data to a different electronic media device via induction or wired link or wireless link, in response to a detected malfunction of the electronic media device 225.

Even though specified locations are depicted for the various status tables 260, 270, 275 and for communication node 250 (see also FIG. 5), and also for storage unit 252, controller 253, security module 265, and backup buffer module 280, other locations are possible; various types of communication links may be provided to facilitate the efficient content management and control and servicing functions regarding interactive electronic media devices 225, including but not limited to wireless, cable, satellite, Internet, public networks, private networks, and the like.

It will be further understood from the various embodiment features disclosed herein that certain exemplary data processing functions may be provided by a unitary communication unit, and other specified related processing functions may be carried out by separate computerized processing modules.

Referring to the exemplary matrix data table 300 illustrated in FIG. 3, various predetermined time periods may be allocated for device servicing (e.g., security monitoring, battery monitoring or recharging or replacement, content downloading, processing user inputs, etc.). For example, a schedule for a multipassenger air transport vehicle may include the following sequence of events and their time-related tasks to be performed.

During a pre-embarcation period during which a passenger purchases a travel ticket 305 and a passenger boarding pass is issued 310, the following data inputs may be scheduled: certain content and operation capability are selected based on passenger request and/or passenger demographics 311; and the pre-selected content (e.g., application programs and informational data) is transferred to storage module for passenger's assigned electronic media device 312.

Thereafter, when user ID code for the electronic media device is entered 315, the following responses may be scheduled: the electronic media device is activated but remains in dormant mode 316, and a security protocol confirms proper situs location and user ID matchup for electronic media device 317.

While the electronic media device is in dormant mode during pre-flight taxi and takeoff 320, the follow activities may be scheduled: passenger inputs request for additional content available from node 321; and passenger inputs prepay authorization for food and beverage, and for any audio and/or video content charges 322.

Thereafter while the electronic media device is in active mode during ascent to cruising altitude 325, the following activities may be scheduled: additional content is downloaded from node to passenger's electronic media device 326;

text messaging with related on-board media devices via localized transit network; and access to stored content allowed 327.

While the electronic media device is in active mode during cruising altitude 330, the following activities may be scheduled: text messaging and voice messaging allowed via external satellite or tower transmission 331; and text messaging and voice messaging allowed with on-board electronic media devices and staff via local network, and access to stored content allowed 333.

While the electronic media device is in active mode during food and beverage service, the following activities may be allowed: further passenger input requests for additional content and for other pre-pay authorizations 332; text messaging and voice messaging allowed with on-board electronic media devices and staff via local network, and access to stored content allowed 333.

While the electronic media device is in dormant mode during staff messages and battery servicing 340, the following responsive activities may be scheduled: battery status checked, battery recharged or replaced from portable cart, and content downloads made from on-board node 341; text messaging allowed with staff, and access to stored content allowed 342.

While the electronic media device is in active mode during descent and landing, the following activities may be scheduled: new content is downloaded regarding destination, flight transfers, and baggage 346; and access to stored content is allowed 347.

When the electronic media device is in dormant mode after passenger exit, the following responsive activities may be scheduled: customized content and informational data are purged from the storage module, and the battery status is checked 351; and a detected low or bad battery is recharged or replaced at on-board or off-board location 352.

Of course it will be understood that the illustrated chosen time periods for the various servicing or usage activities may be changed based on the circumstances, and the illustrated description of such servicing or usage activities may be changed or deleted in accordance with preferred priorities.

The schematic block diagram of FIG. 4 depicts further possible features to be implemented in a media system for multipassenger land or air or sea transport vehicles. For example a multipassenger vehicle 400 may provide a local network terminal 425 that provides interconnective links with interactive electronic media devices 422, 427, 429 and with smart transceiver 431 for on-board staff 430 and with smart transceiver 436 for off-board staff 435 and with vehicle communication node 445 and with security detection module 446. As further examples, electronic media device 422 may be correlated with a seat situs ID 421 that is occupied by passenger 420; electronic media device 427 may be associated with passenger 426; and electronic media device 429 may be associated with passenger 428.

Some interactive electronic devices (e.g., 417 correlated with seat situs ID 416 that is associated with passenger 415) may not be linked to the local network terminal 425. Also some interactive electronic devices (e.g., 410 correlated with passenger ID code 411 that is associated with passenger 410) may be configured for wireless communication with external cell tower 401 and satellite communication transmitter 402. Another communication link may be implemented between on-board vehicle communication node 445 and satellite communication transmitter 402, and further communication links may be implemented between on-board vehicle communication node 445 and various interactive electronic devices (e.g., 448 associated with passenger 447).

Accordingly various control and management and message functions may be initiated and transmitted via on-board and off-board channels and components, and the specific embodiments illustrated herein are not intended to be limiting.

As further shown in FIG. 4, vehicle 400 may include a separate room location 405 in which some content and/or operational capability for electronic media devices 409 are at least partially collectively correlated with room situs ID 405a, 405b, 405c, 405d. In some instances, removal of an electronic media device 409 from room location 405 may result in a security warning or alarm in addition to causing consequential disablement of function and/or content for the removed device.

Other exemplary features for multipassenger vehicle 400 may provide an electronic media device 438 that is correlated with both an individual passenger identifier (ID) code 440 as well as correlated with a tour group ID 441. In some instances such correlation may entitle the associated passenger (e.g., see circulating group passenger 437) freedom to leave an assigned room or place or seat with their electronic media device for certain in-transit time periods. A related exemplary feature for vehicle 400 may provide an electronic media device 443 that is correlated only with an individual passenger ID code 444, but which nevertheless may entitle the associated passenger (e.g., see circulating individual passenger 442) to carry their electronic media device throughout different portions of vehicle 400 without violating any security guidelines.

Figure 5:
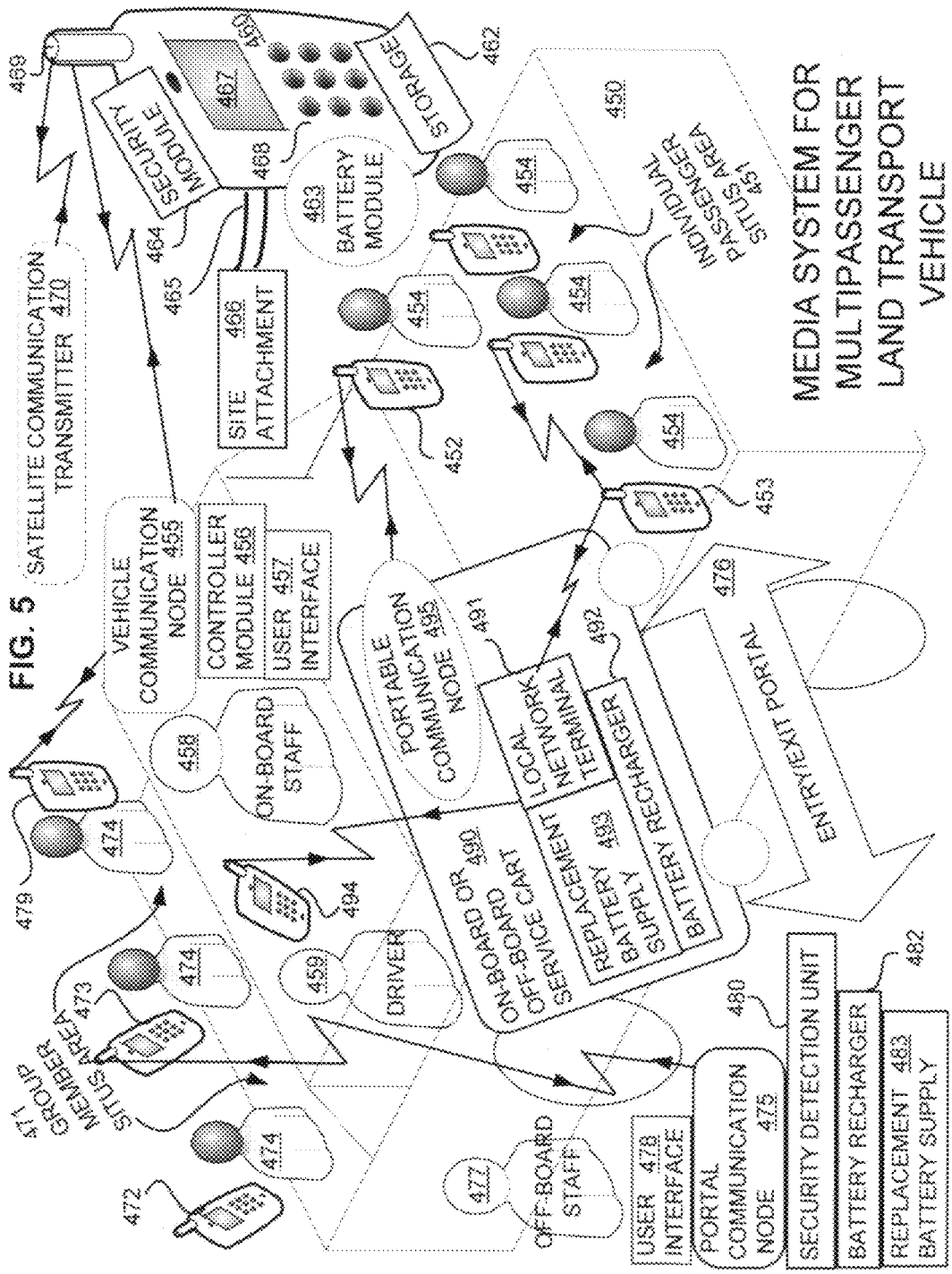

The schematic block diagram of FIG. 5 illustrates additional possible features to be implemented in a media system for multipassenger transport vehicles. For example a multipassenger vehicle 450 may provide an individual passenger situs area 451 for passengers 454 as well as provide a group member situs area 471 (e.g., passengers 474 traveling as part of the same tour group), wherein each different situs area will at least partially determine the content and/or operation capabilities of their assigned electronic media devices (e.g., group media devices 472, 473, 479, individual media devices 452, 453).

In some instances management and/or control and/or servicing functions regarding an individual electronic media device 453 may be accomplished by wireless connection with a local vehicle network terminal 491 for on-board or off-board service cart 490 that can traverse across an entry/exit portal 476 for the multipassenger transit vehicle 450. The service cart 490 may also include battery recharger 492 and a replacement battery supply 493.

The exemplary service cart 490 may also include a portable communication node 495 that may provide content management and control functions via wireless link to an electronic media device 452 in the individual passenger situs area 451. The local network terminal 491 on the service cart 490 may also be connected via wireless link to a smart transceiver 494 accessible to on-board staff 458 and to vehicle driver 459 for bidirectional messaging communications.

It will be understood that an exemplary electronic media device 460, for use in either an individual passenger situs area 450 or a group members situs area 471, may include storage 462, battery module 463, interactive display 467, a user interface (e.g., keyboard 468), security module 464 for its respective device, and a restrictive site attachment 466 that includes a fixed or flexible connector 465 to prevent unauthorized removal of the electronic media device 460 from its assigned on-site location. An antenna 469 may provide a wireless communication link to a satellite communication transmitter 470 and also to an on-board communication node 455. The on-board communication node may include a controller module 456 and user interface 457 for on-board staff 458.

Some system embodiments may further include an off-board portal communication node 475 having a wireless communication link to on-board electronic media devices (e.g. 473). A user interface 478 provides access to the portal communication node 475 by off-board staff 477 for monitoring a security detection unit 480 (e.g., detect unauthorized device removal from vehicle 450). The security detection unit 480 may be configured to implement a security lockout scheme that causes the electronic media device to discontinue some or all operational functions based on detection of its unauthorized removal from the specified on-board site. The portal communication node 475 may also be configured for battery servicing (e.g., battery recharger 482, replacement battery supply 483) regarding electronic media devices that are awaiting installation on vehicle 450.

It will be understood that the exemplary system embodiments disclosed herein facilitate managing content accessability and/or operational capability for an on-board electronic media device based on predetermined selections and qualifications as well as based on real-time supervisory or passenger selections. System components may include proximity determination components for acquiring estimated fixed location parameters for a media device or an identified approved passenger, as well as for monitoring changing location parameters (e.g., authorized circulating passenger, unauthorized removal of an electronic media device from an assigned on-board location).

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Figure 6:
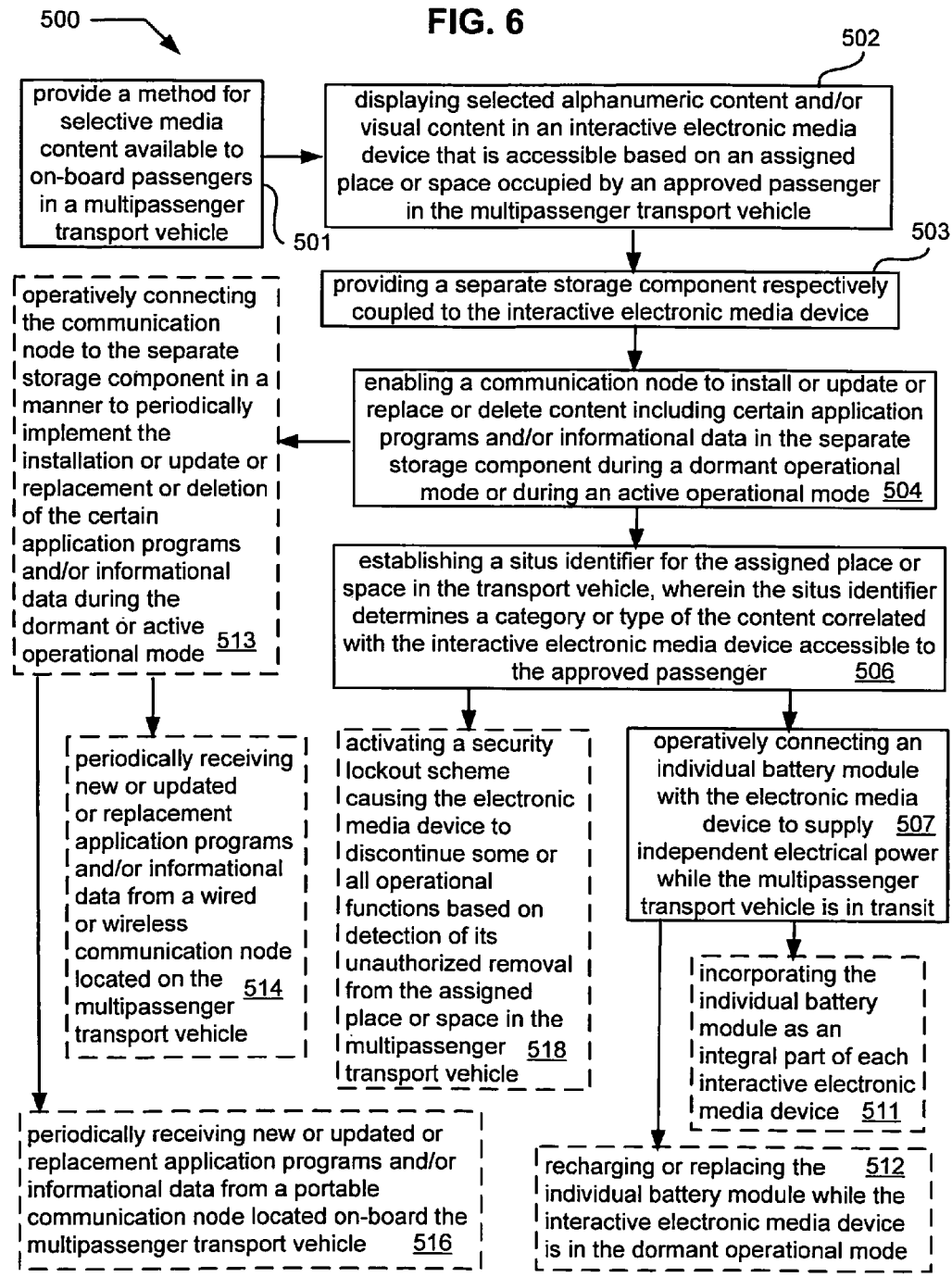
FIG. 6 is a higher level flow chart that illustrates process components for making selective content and/or operational capability available to designated interactive media devices.

Referring to the high level flow chart of FIG. 6, an exemplary process embodiment 500 provides a method for selective media content available to on-board passengers in a multipassenger transport vehicle (block 501), wherein possible method features include displaying selected alphanumeric content and/or visual content in an interactive electronic media device that is accessible based on an assigned place or space occupied by an approved passenger in the multipassenger transport vehicle (block 502); providing a separate storage component respectively coupled to the interactive electronic media device (block 503); and enabling a communication node to install or update or replace or delete content including certain application programs and/or informational data in the separate storage component during a dormant operational mode or during an active operational mode (block 504). Additional possible features include establishing a situs identifier for the assigned place or space in the transport vehicle, wherein the situs identifier determines a category or type of the selected content correlated with the interactive electronic media device accessible to the approved passenger (block 506).

A further possible aspect may include operatively connecting an individual battery module with the electronic media device to supply independent electrical power while the multipassenger transport vehicle is in transit (block 507). Other related possible aspects include incorporating the individual battery module as an integral part of each interactive electronic media device (block 511), and recharging or replacing the individual battery module while the interactive electronic media device is in the dormant operational mode (block 512).

Other exemplary components may include operatively connecting the communication node to the separate storage component in a manner to periodically implement the installation or update or replacement or deletion of the certain application programs and/or informational data during the dormant or active operational mode (block 513). Further related components may include periodically receiving new or updated or replacement application programs and/or informational data from a wired or wireless communication node located on the multipassenger transport vehicle (block 514). Another related component may include periodically receiving new or updated or replacement application programs and/or informational data from a portable communication node located on-board the multipassenger transport vehicle (block 516).

Some embodiments may include activating a security lockout scheme causing the electronic media device to discontinue some or all operational functions based on detection of its unauthorized removal from the assigned place or space in the multipassenger transport vehicle (block 518).

Figure 7:
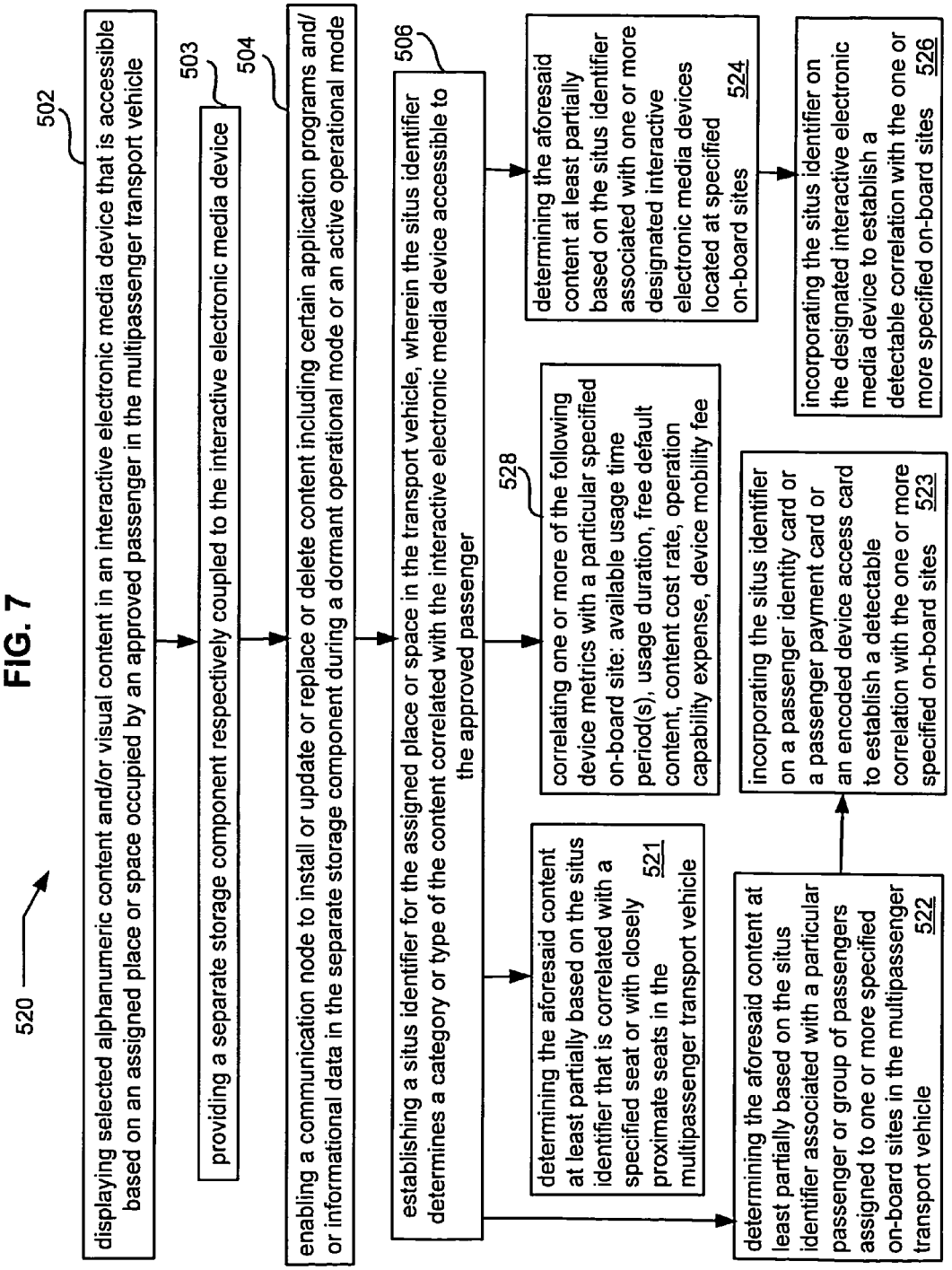
FIGS. 7-17 are detailed flow charts illustrating exemplary process features regarding content and/or operational capability available to specified site-based electronic media devices.

The process embodiment features 520 illustrated in the detailed flow chart of FIG. 7 may include previously described features 502, 503, 504, 506 along with determining the aforesaid content at least partially based on the situs identifier that is correlated with a specified seat or with closely proximate seats in the multipassenger transport vehicle (block 521). A related aspect may include determining the aforesaid content at least partially based on the situs identifier associated with a particular passenger or group of passengers assigned to a specified on-board site in the multipassenger transport vehicle (block 522). A further related aspect may include determining the aforesaid selected content at least partially based on the situs identifier associated with one or more designated interactive electronic media devices located at a specified on-board site (block 524).

In some instances, an embodiment may include incorporating the situs identifier on a passenger identity card or a passenger payment card or an encoded device access card to establish a detectable correlation with the specified on-board site (block 523). Another possibility may include incorporating the situs identifier on the designated interactive electronic media device to establish a detectable correlation with the one or more specified on-board sites (block 526). An additional exemplary aspect may include correlating one or more of the following device metrics with a particular specified on-board site: available usage time period(s), usage duration, free default content, content cost rate, operation capability expense, device mobility fee (block 528).

Figure 8:
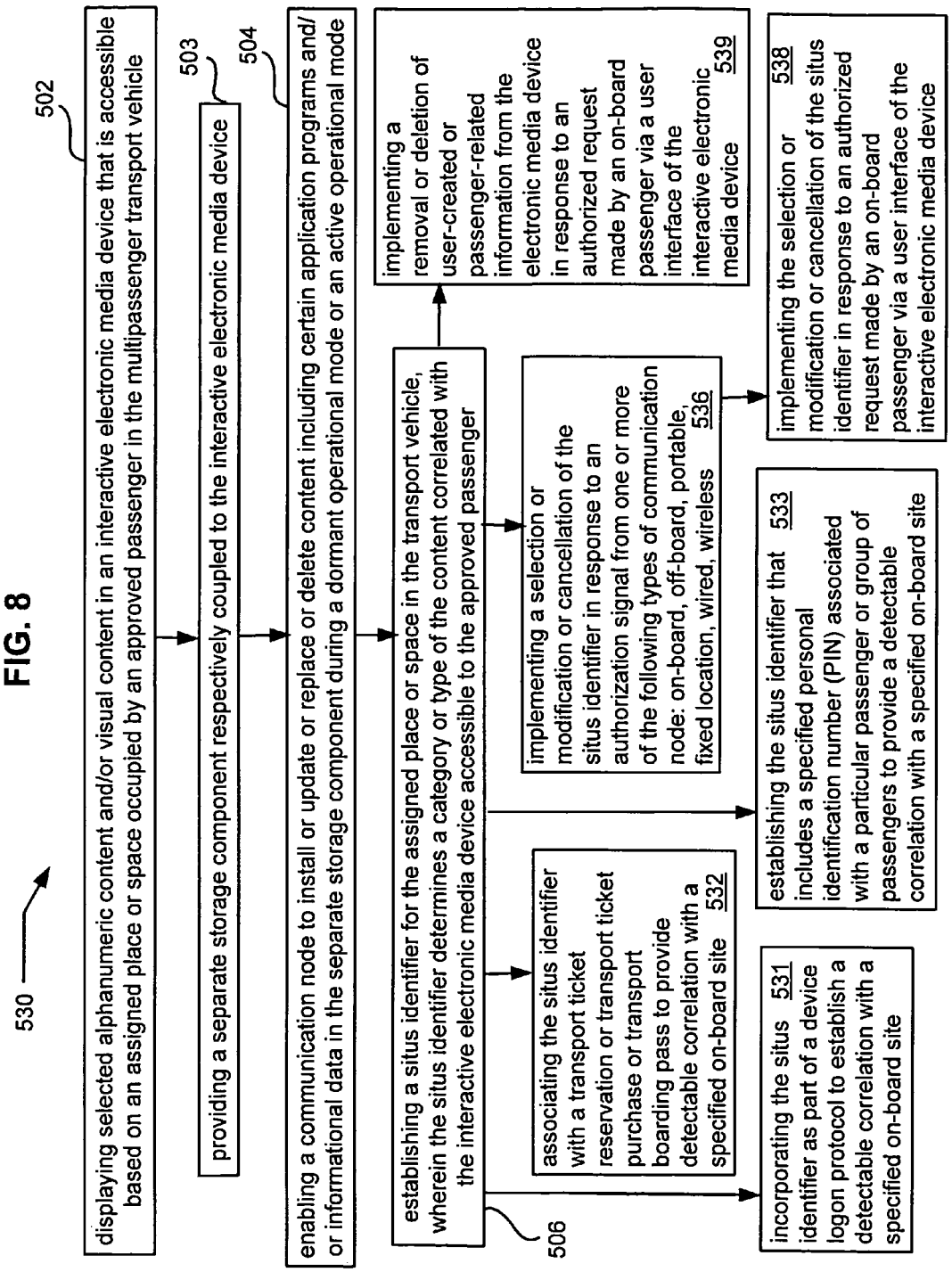

Referring to the various embodiment features 530 illustrated in FIG. 8, an exemplary process implementation may include previously described operations 502, 503, 504, 506 in combination with various aspects relating to the situs identifier. For example, a possible aspect may include incorporating the situs identifier as part of a device logon protocol to establish a detectable correlation with a specified on-board site (block 531). Another possible aspect may include associating the situs identifier with a transport ticket reservation or transport ticket purchase or transport boarding pass to provide detectable correlation with a specified on-board site (block 532). A further aspect may include establishing the situs identifier that includes a specified personal identification number (PIN) associated with a particular passenger or group of passengers to provide a detectable correlation with a specified on-board site (block 533).

Additional exemplary content management and/or control features illustrated in FIG. 8 include implementing a selection or modification or cancellation of the situs identifier in response to an authorization signal from one of the following types of communication node: on-board, off-board, portable, fixed location, wired, wireless (block 536). A further possible process feature includes implementing the selection or modification or cancellation of the situs identifier in response to an authorized request made by an on-board passenger via a user interface of the electronic media device (block 538). Another possible aspect includes implementing a removal or deletion of user-created or passenger-related information from the electronic media device in response to an authorized request made by an on-board passenger via a user interface of the interactive electronic media device (block 539).

Figure 9:
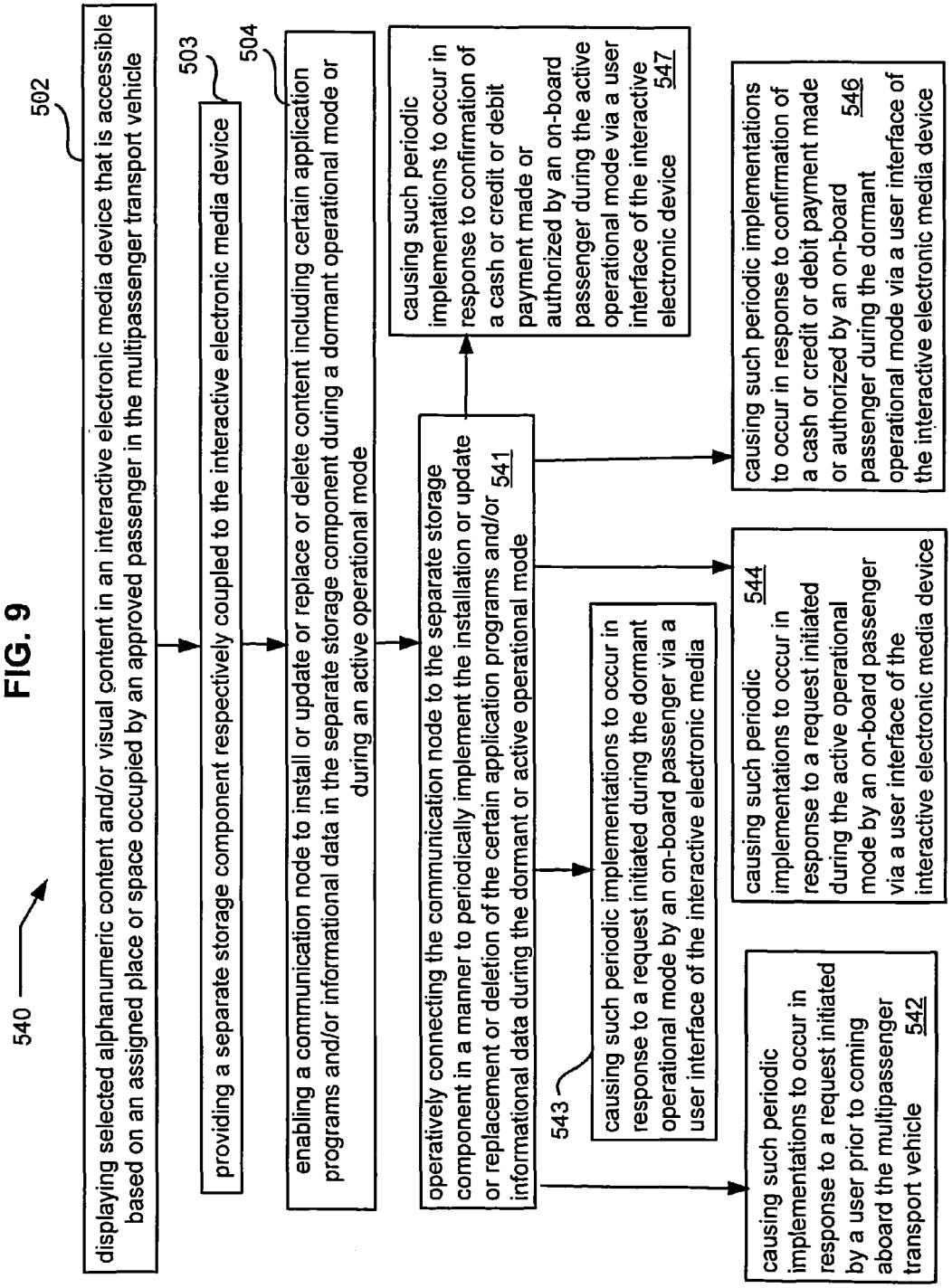

Various exemplary process embodiment features 540 disclosed in the flow chart of FIG. 9 include previously described components 502, 503, 504 in combination with operatively connecting the communication node to the separate storage component in a manner to periodically implement the installation or update or replacement or deletion of certain application programs and/or informational data during the dormant or active operational mode (block 541). As related examples, a process feature may include causing such periodic implementations to occur in response to a request initiated by a user prior to coming aboard the multipassenger transport vehicle (block 542), or may further include causing such periodic implementations to occur in response to a request initiated during the dormant operational mode by an on-board passenger via a user interface of the interactive electronic media device (block 543). Another possible related example may include causing such periodic implementations to occur in response to a request initiated during the active operational mode by an on-board passenger via a user interface of the interactive electronic media device (block 544).

Additional process examples may include causing such periodic implementations to occur in response to confirmation of a cash or credit or debit payment made or authorized by an on-board passenger during the dormant operational mode (block 546) or during the active operational mode (block 547), via a user interface of the interactive electronic media device.

Figure 10:
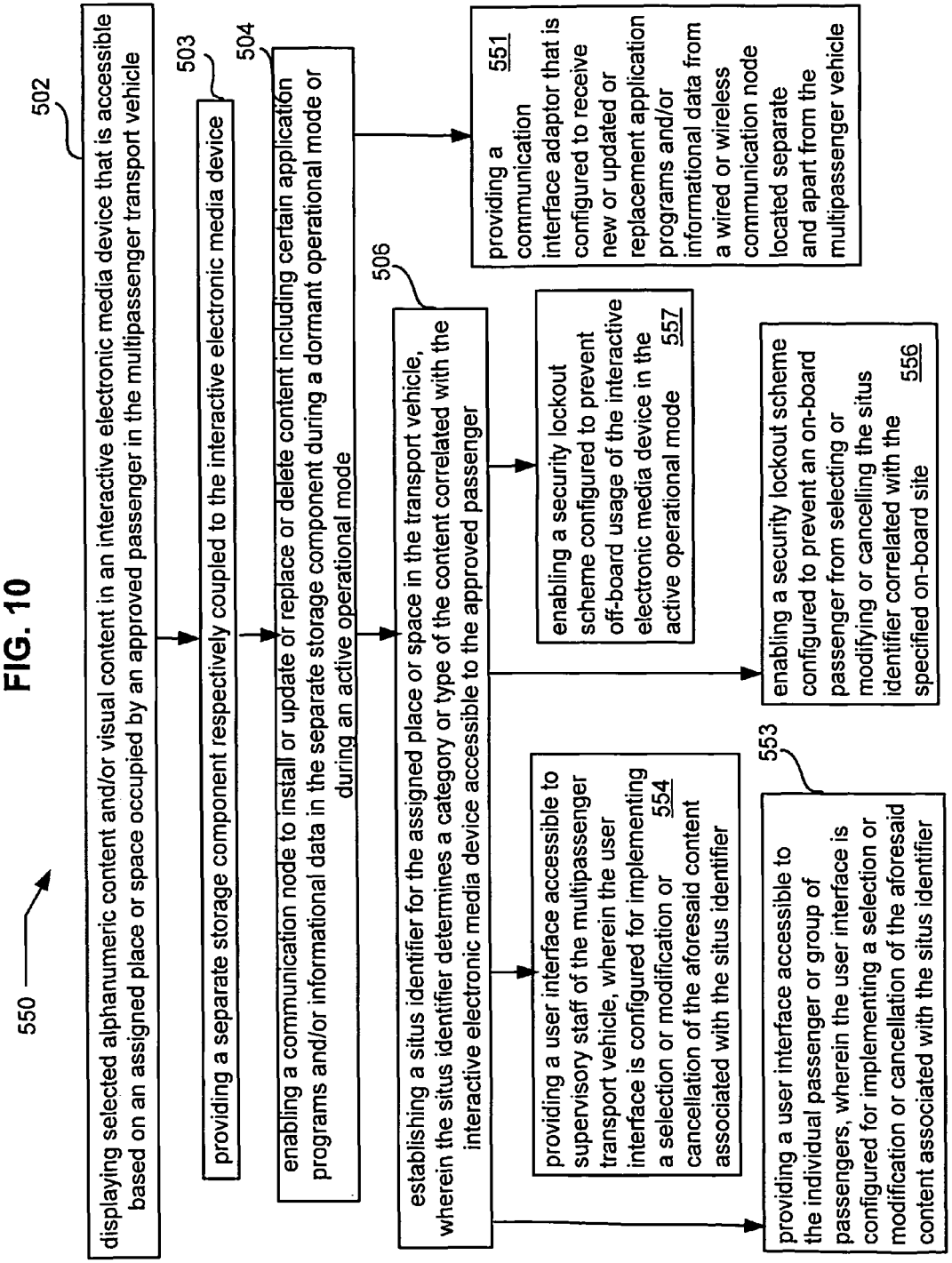

Referring to the detailed flow chart of FIG. 10, exemplary process features 550 may include previously described aspects 502, 503, 504, 506 along with providing a communication interface adaptor that is configured to receive new or updated or replacement application programs and/or informational data from a wired or wireless communication node located separate and apart from the multipassenger vehicle (block 551).

Another possible process feature includes providing a user interface accessible to the individual passenger or group of passengers, wherein the user interface is configured for implementing a selection or modification or cancellation of the media content associated with the situs identifier (block 553). A further aspect may include providing a user interface accessible to supervisory staff of the multipassenger transport vehicle, wherein the user interface is configured for implementing a selection or modification or cancellation of the aforesaid content associated with the situs identifier (block 554).

Further exemplary process features may include enabling a security lockout scheme configured to prevent an on-board passenger from selecting or modifying or cancelling the situs identifier correlated with the specified on-board site (block 556). An additional possible process feature includes enabling a security lockout scheme configured to prevent off-board usage of the interactive electronic media device in the active operational mode (block 557).

Figure 11:
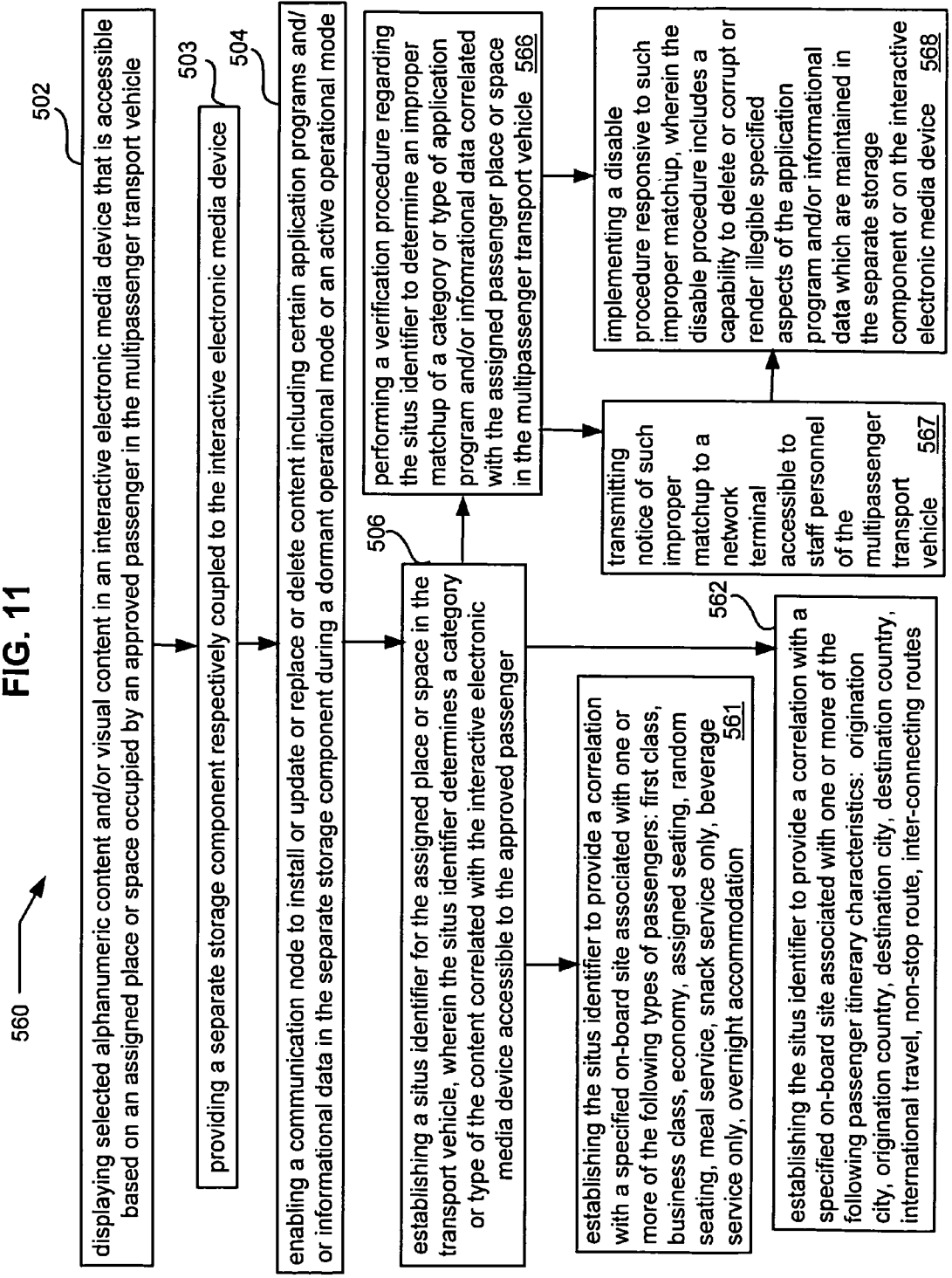

The detailed flow chart of FIG. 11 depicts various possible embodiment aspects 560 including previously described components 502, 503, 504, 506 in combination with various content management and/or control aspects including establishing the situs identifier to provide a correlation with a specified on-board site associated with one or more of the following types of passengers: first class, business class, economy, assigned seating, random seating, meal service, snack service only, beverage service only, overnight accommodation (block 561). Other possible media content management and/or control aspects may include establishing the situs identifier to provide a correlation with a specified on-board site associated with one or more of the following passenger itinerary characteristics: origination city, origination country, destination city, destination country, international travel, non-stop route, inter-connecting routes (block 562).

Additional process components may include performing a verification procedure regarding the situs identifier to determine an improper matchup of a category or type of application program and/or informational data correlated with the assigned passenger place or space in the multipassenger transport vehicle (block 566). A related aspect may include transmitting notice of such improper matchup to a network terminal accessible to staff personnel of the multipassenger transport vehicle (block 567). A further possible aspect includes implementing a disable procedure responsive to such improper matchup, wherein the disable procedure includes a capability to delete or corrupt or render illegible specified aspects of the application program and/or informational data which are maintained in the separate storage component or on the interactive electronic media device (block 568).

Figure 12:
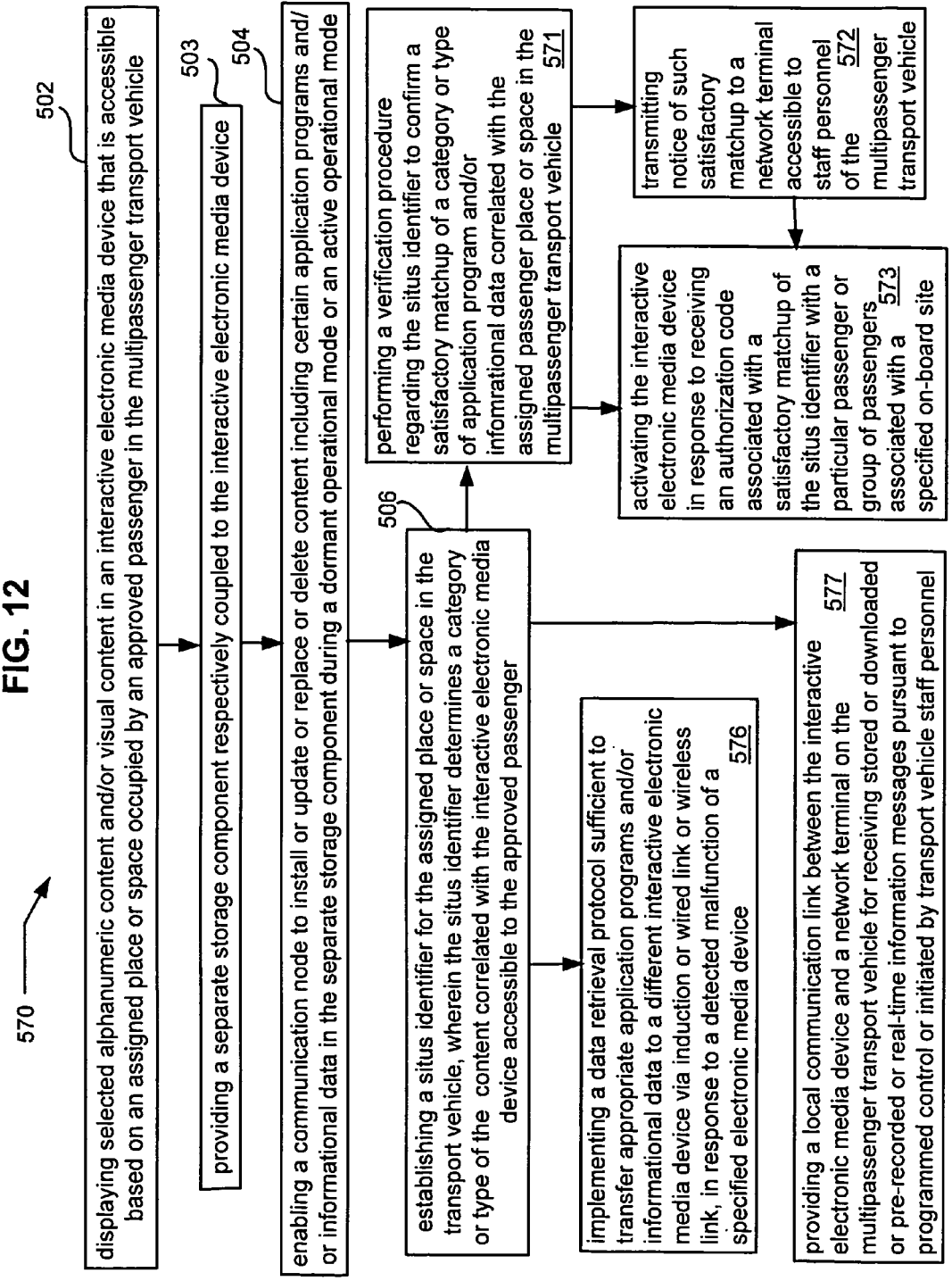

FIG. 12 illustrates various exemplary embodiment features 570, including previously described aspects 502, 503, 504, 506 as well as performing a verification procedure to confirm a satisfactory matchup of a category or type of application program and/or informational data with the assigned passenger place or space in the multipassenger transport vehicle (block 571): A related aspect may further include transmitting notice of such satisfactory matchup to a network terminal accessible to staff personnel of the multipassenger vehicle (block 572). Yet another exemplary aspect includes activating the interactive electronic media device in response to receiving an authorization code associated with a satisfactory matchup of the situs identifier with a particular passenger or group of passengers associated with a specified on-board site (block 573).

A further possible embodiment feature may include implementing a data retrieval protocol sufficient to transfer appropriate application programs and/or informational data to a different interactive electronic media device via induction or wired link or wireless link, in response to a detected malfunction of a specified electronic media device (block 576). Other exemplary aspects may include providing a local communication link between the interactive electronic media device and a network terminal on the multipassenger transport vehicle for receiving stored or downloaded or pre-recorded or real-time information messages pursuant to programmed control or initiated by transport vehicle staff personnel (block 577).

Figure 13:
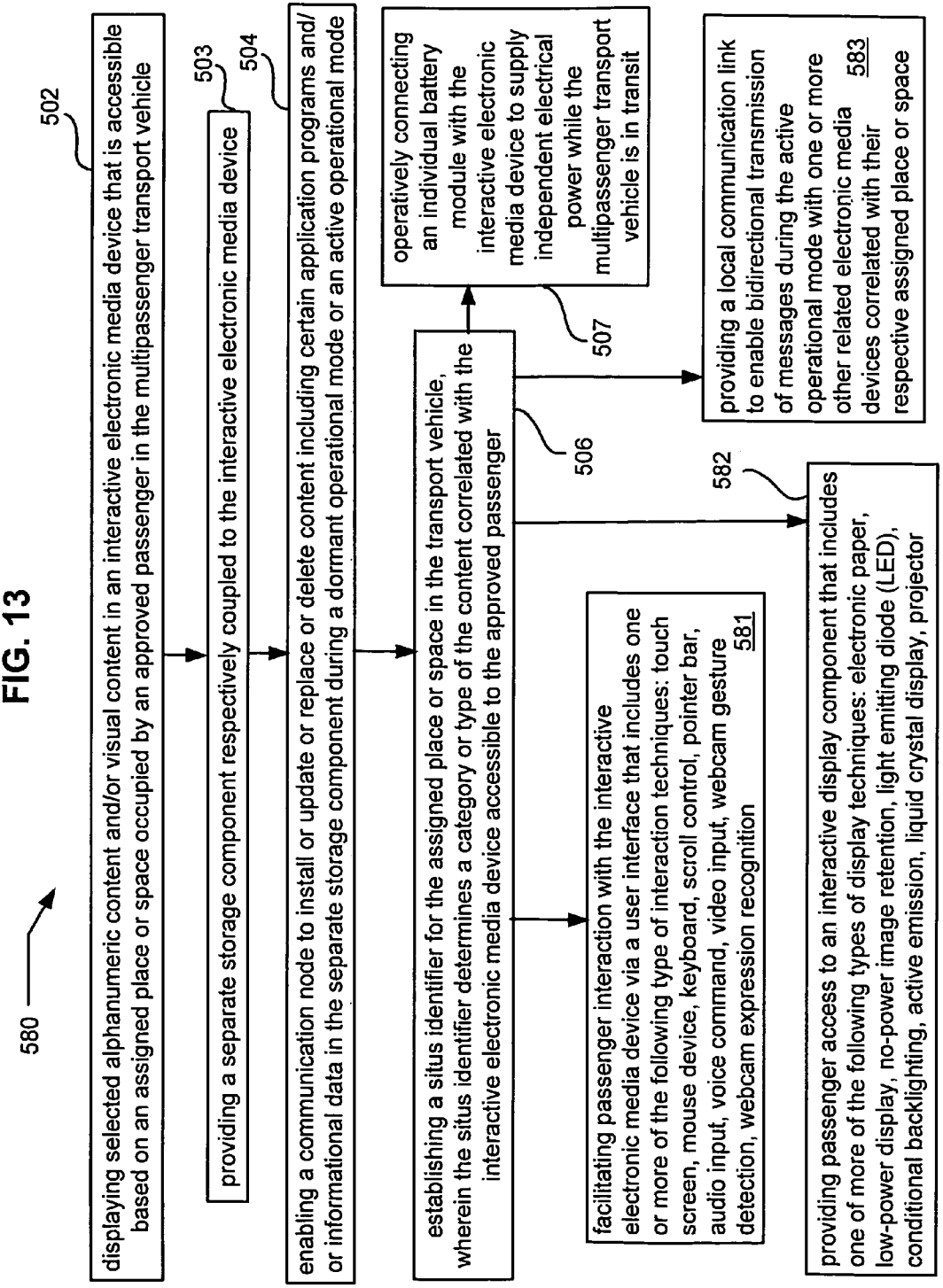

Referring to the detailed flow chart of FIG. 13, some exemplary embodiment features 580 include previously described process components 502, 503, 504, 506, 507 in combination with facilitating passenger interaction with the interactive electronic media device via a user interface that includes one or more of the following type of interaction techniques: touch screen, mouse device, keyboard, scroll control, pointer bar, audio input, voice command, video input, webcam gesture detection, webcam expression recognition (block 581). Additional process components may include providing passenger access to an interactive display component that includes one of more of the following types of display techniques: electronic paper, low-power display, no-power image retention, light emitting diode (LED), conditional backlighting, active emission, liquid crystal display, projector (block 582).

In some instances a further process component may include providing a local communication link to enable bidirectional transmission of messages during the active operational mode with one or more other related electronic media devices correlated with their respective assigned place or space (block 583).

Figure 14:
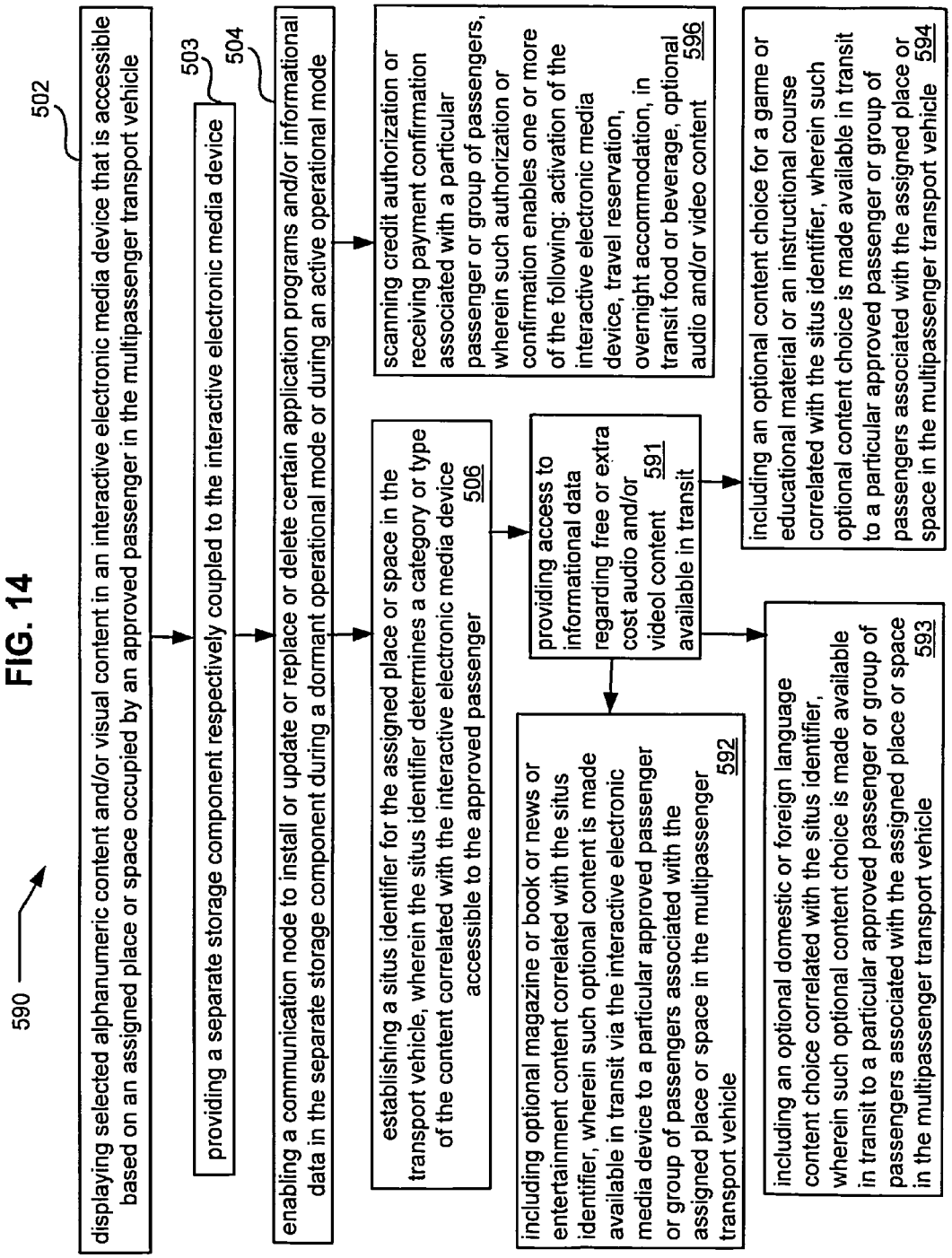

The exemplary process embodiment features 590 shown in FIG. 14 include previously described operations 502, 503, 504, 506 as well as an operation that includes providing access to informational data regarding free or extra cost audio and/or video content available in transit at one or more specified on-board sites (block 591). For example, the content may include optional magazine or book or news or entertainment content correlated with the situs identifier, wherein such optional content is made available via the interactive electronic media device to a particular approved passenger or group of passengers associated with the assigned place or space in the multipassenger transport vehicle (block 592).

As a further example, the content may include an optional domestic or foreign language content choice which is correlated with the situs identifier, wherein such optional content choice is made available in transit to a particular approved passenger or group of passengers associated with the assigned place or space in the multipassenger transport vehicle (block 593). As another example, the content may include an optional content choice for a game or educational material or an instructional course which is correlated with the situs identifier, wherein such optional content choice is made available in transit to a particular approved passenger or group of passengers associated with the assigned place or space in the multipassenger transport vehicle (block 594).

Additional exemplary process operations may include scanning credit authorization or receiving payment confirmation associated with a particular approved passenger or group of passengers, wherein such authorization or confirmation enables one or more of the following: activation of the interactive electronic media device, travel reservation, overnight accommodation, in transit food or beverage, optional audio and/or video content (block 596).

Figure 15:
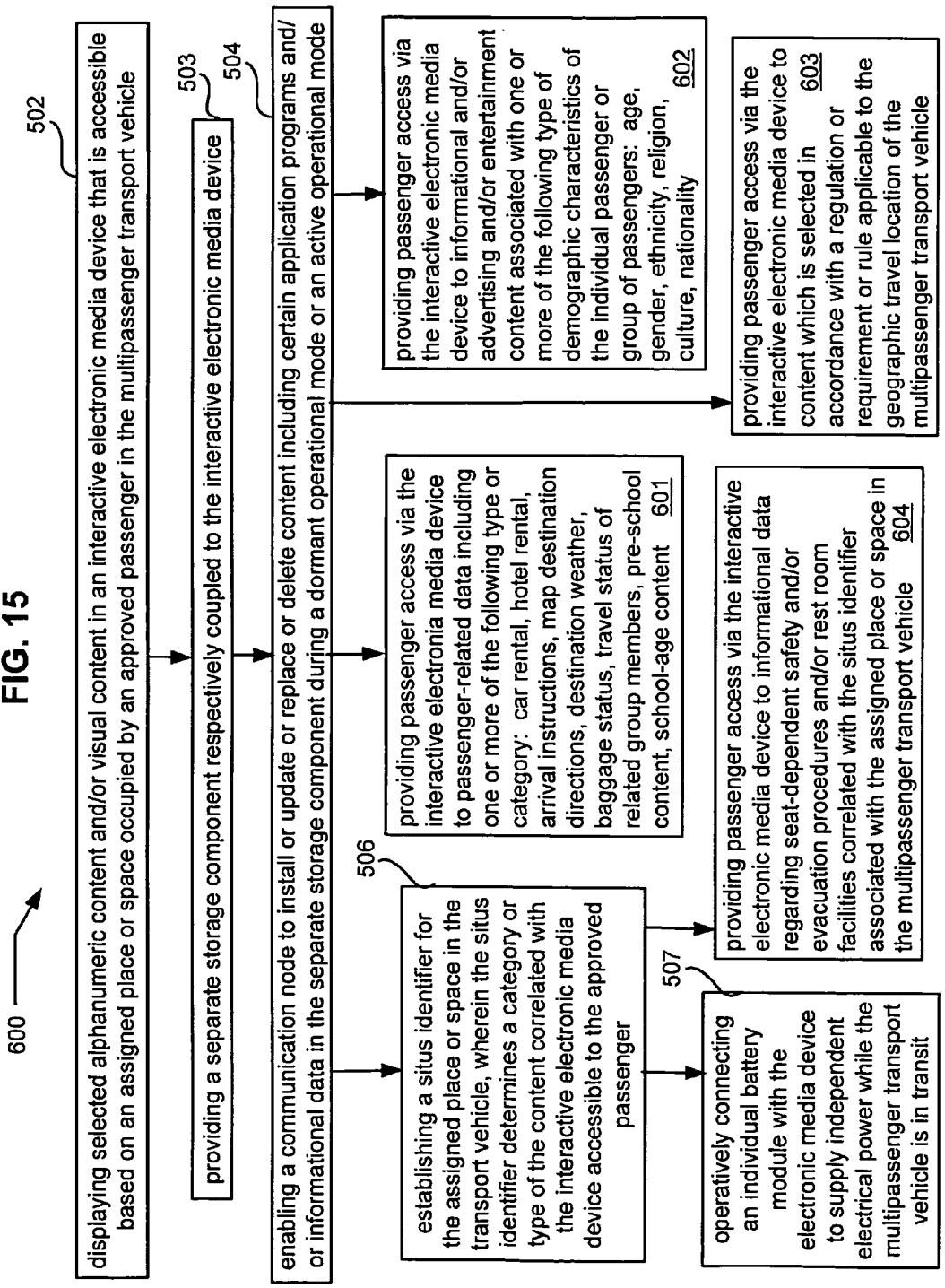

Referring to the detailed flow chart of FIG. 15, various illustrated embodiment features 600 include previously described process aspects 502, 503, 504, 506, 507 in combination with providing passenger access via the interactive electronic media device to informational and/or advertising and/or entertainment content associated with one or more of the following type of demographic characteristics of the individual passenger or group of passengers: age, gender, ethnicity, religion, culture, nationality (block 602). Additional aspects may include providing passenger access via the electronic media device to passenger-related data including one or more of the following type or category: car rental, hotel rental, arrival instructions, map destination directions, destination weather, baggage status, travel status of related group members, pre-school content, school-age content (block 601).

A further exemplary feature may include providing passenger access via the interactive electronic media device to content which is selected in accordance with a regulation or requirement or rule applicable to the geographic travel location of the multipassenger transport vehicle (block 603). Other possible features may include providing passenger access via the electronic media device to informational data regarding seat-dependent safety and/or evacuation procedures and/or rest room facilities correlated with the situs identifier associated with the assigned place or space in the multipassenger transport vehicle (block 604).

Figure 16:
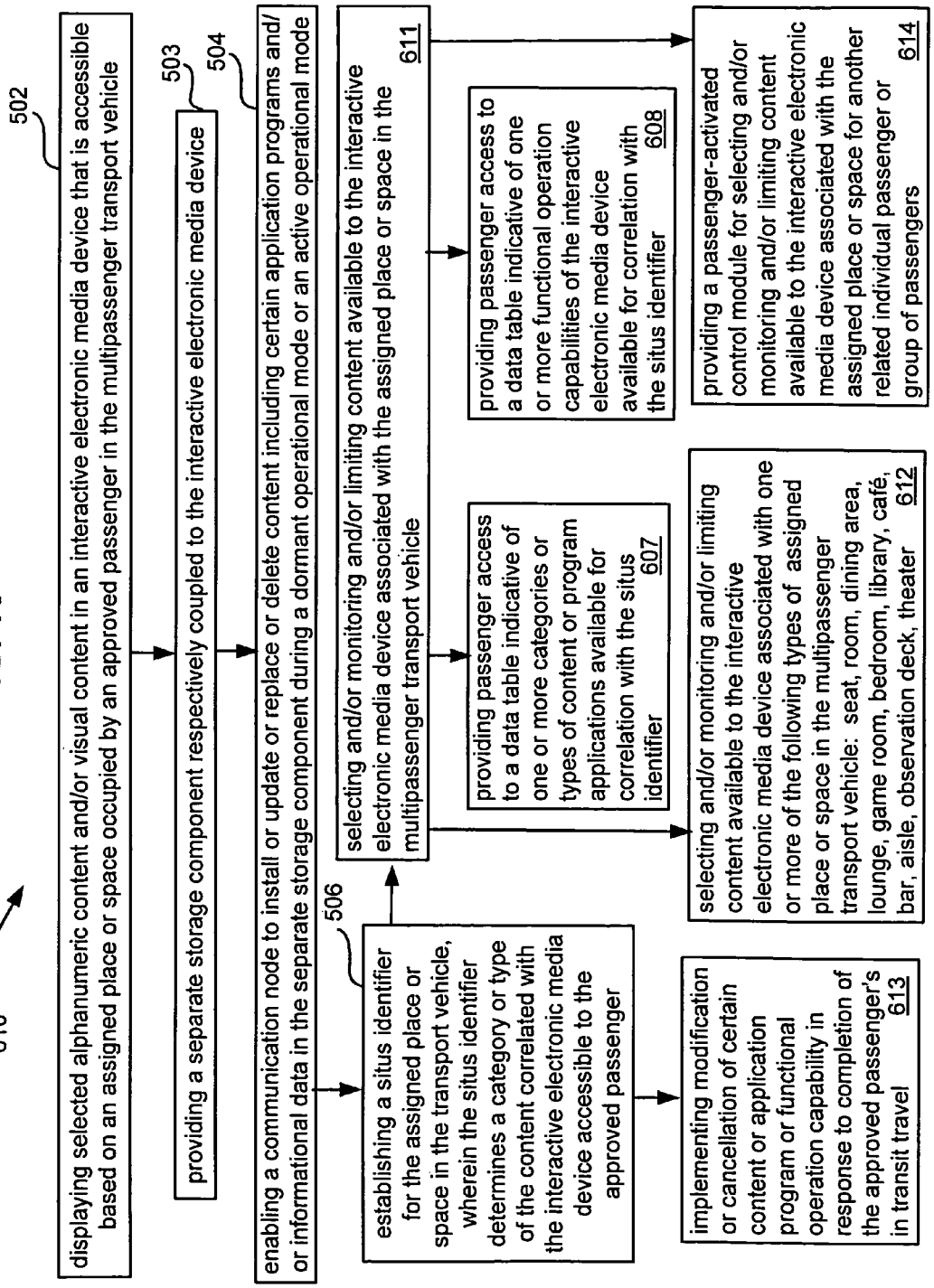

Various possible process features 610 depicted in FIG. 16 include previously described process operations 502, 503, 504, 506, 507 as well as selecting and/or monitoring and/or limiting content available to the interactive electronic media device associated with the assigned place or space in the multipassenger transport vehicle (block 611). Further possible enhancements include selecting and/or monitoring and/or limiting content available to the interactive electronic media device associated with one or more of the following types of assigned place or space in the multipassenger transport vehicle: seat, room, dining area, lounge, game room, bedroom, library, café, bar, aisle, observation deck, theater (block 612).

Other illustrated embodiment features include providing passenger access to a data table indicative of one or more categories or types of content or program applications available for correlation with the situs identifier (block 607). Another process feature may include providing passenger access to a data table indicative of one or more functional operation capabilities of the interactive electronic media device available for correlation with the situs identifier (block 608).

In some instances a process feature may include implementing modification or cancellation of certain content or application program or functional operation capability in response to completion of the approved passenger's in transit travel (block 613). Further aspects may include providing a passenger-activated control module for selecting and/or monitoring and/or limiting content available to the interactive electronic media device associated with the assigned place or space for another related individual passenger or group of passengers (block 614).

Figure 17:
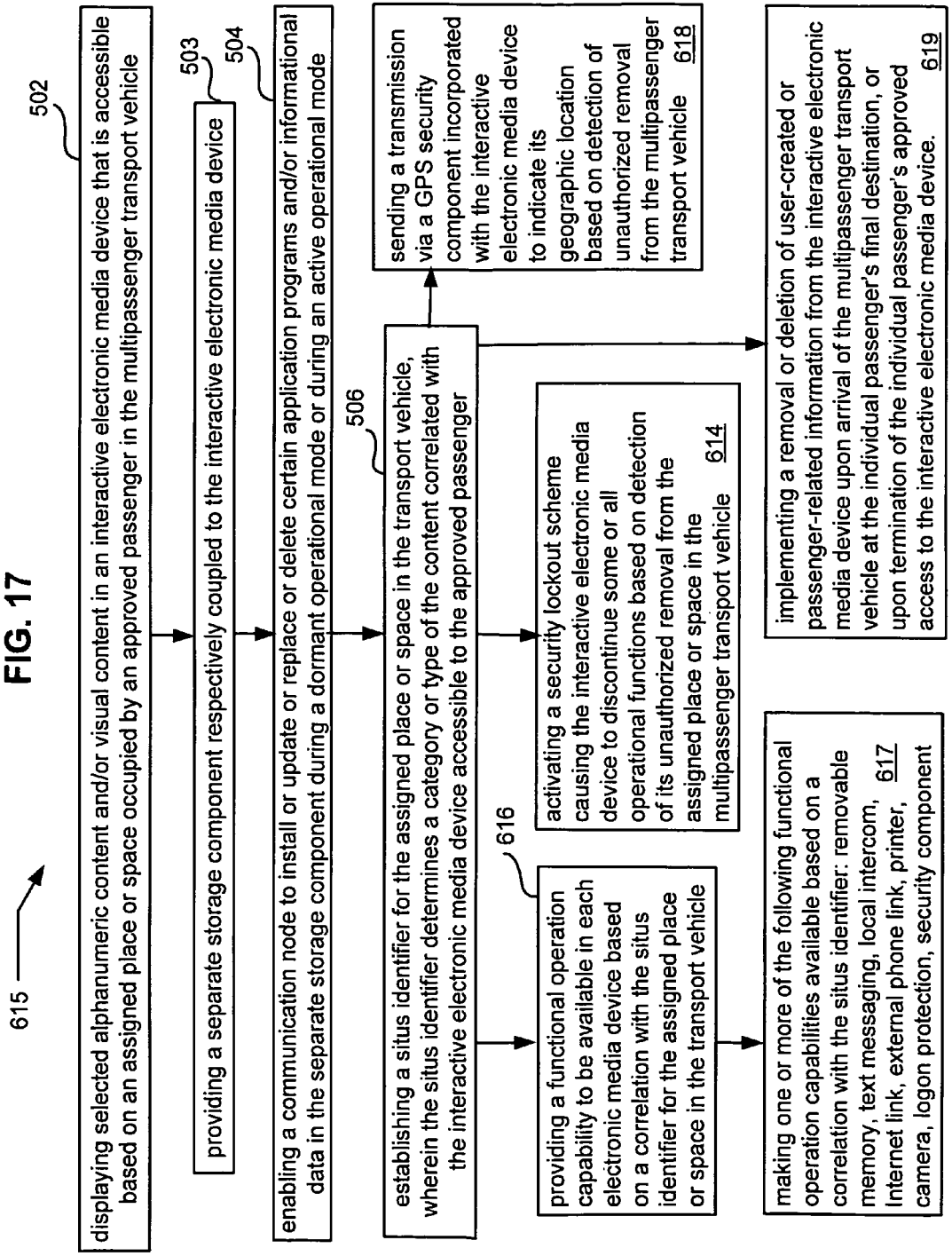

The exemplary flow chart of FIG. 17 depicts various possible embodiment features 615 including previously described operational components 502, 503, 504, 506 along with providing a functional operation capability to be available in each electronic media device based on a correlation with the situs identifier for the assigned place or space in the transport vehicle (block 616). A related example of a process aspect includes making one or more of the following functional operation capabilities available based on a correlation with the situs identifier: removable memory, text messaging, local intercom, Internet link, external phone link, printer, camera, logon protection, security component (block 617).

Additional process aspects may include activating a security lockout scheme causing the interactive electronic media device to discontinue some or all operational functions based on detection of its unauthorized removal from the assigned place or space in the multipassenger transport vehicle (block 614). Some embodiments may include sending a transmission via a GPS security component incorporated with the interactive electronic media device to indicate its geographic location based on detection of unauthorized removal from the multipassenger transport vehicle (block 618). Further possible process enhancements include implementing a removal or deletion of user-created or passenger-related information from the interactive electronic media device upon arrival of the multipassenger transport vehicle at the individual passenger's final destination, or upon termination of the individual passenger's approved access to the interactive electronic media device (block 619).

Figure 18:
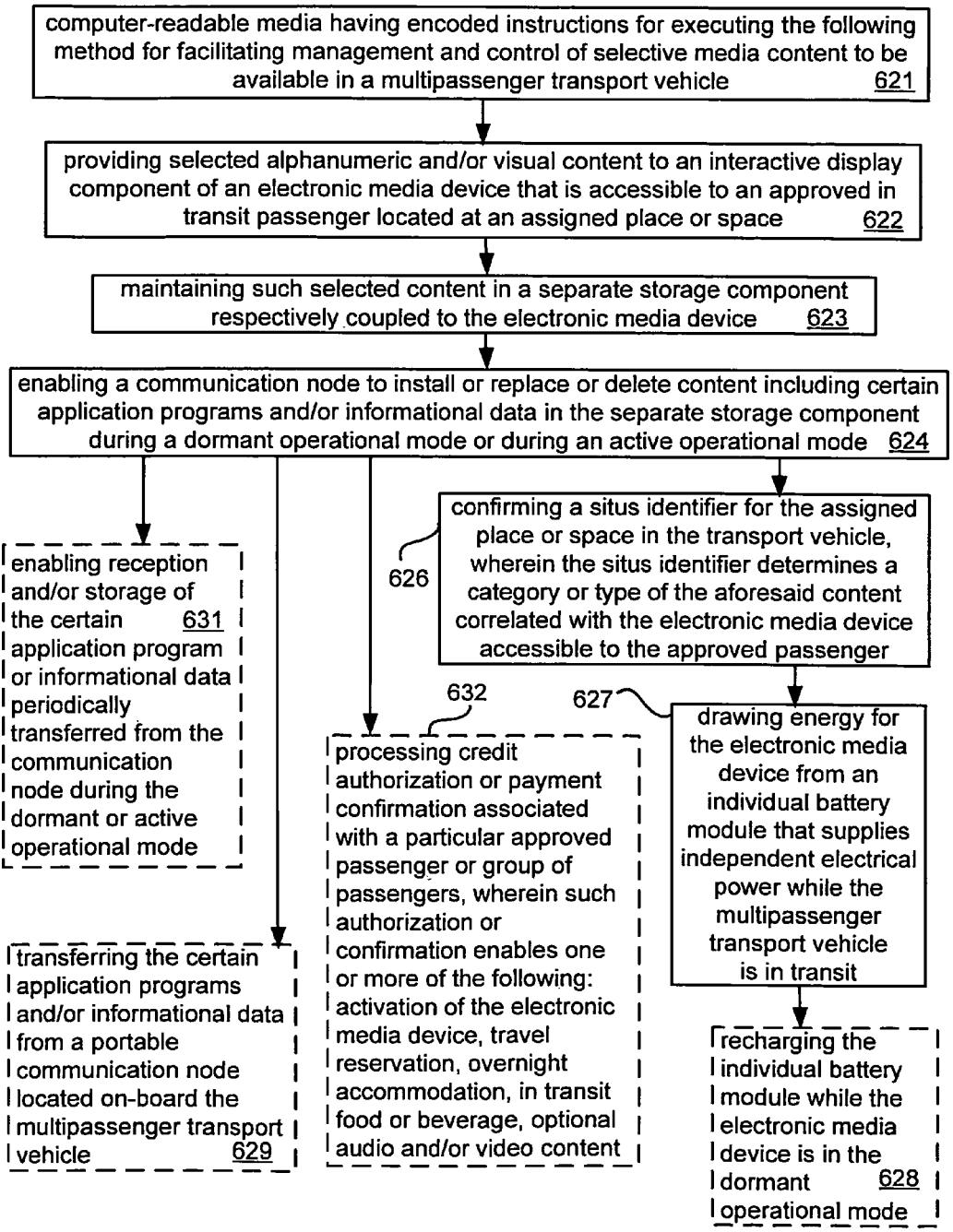
FIG. 18 is a diagrammatic flow chart for exemplary computer-readable media embodiment features.

FIG. 18 is a diagrammatic flow chart exemplified in an article of manufacture embodiment wherein computer readable media have encoded instructions for executing a method for facilitating management and control of selective media content to be available in a multipassenger transport vehicle (block 621). A possible exemplary method may include providing selected alphanumeric and/or visual content to an interactive display component of an electronic media device that is accessible to an approved in transit passenger located at an assigned place or space (block 622); maintaining such selected content in a separate storage component respectively coupled to the electronic media device (block 623); and enabling a communication node to install or replace or delete content including certain application programs and/or informational data in the separate storage component during a dormant operational mode or during an active operational mode (block 624).

Other possible programmed method operations may include confirming a situs identifier for the assigned place or space in the transport vehicle, wherein the situs identifier determines a category or type of the aforesaid content correlated with the electronic media device accessible to the approved passenger (block 626); and drawing energy for the electronic media device from an individual battery module that supplies independent electrical power while the multipassenger transport vehicle is in transit (block 627). A related programmed aspect may include recharging the individual battery module while the electronic media device is in the dormant operational mode (block 628).

Additional examples of illustrated programmed operations include enabling reception and/or storage of the certain application programs or informational data periodically transferred from the communication node during the dormant or active operational mode (block 631), and transferring the certain application programs and/or informational data from a portable communication node located on-board the multipassenger transport vehicle (block 629). In some instances a further programmed aspect may include processing credit authorization or payment confirmation associated with a particular approved passenger or group of passengers, wherein such authorization or confirmation enables one or more of the following: activation of the electronic media device, travel reservation, overnight accommodation, in transit food or beverage, optional audio and/or video content (block 632).

Additional process features disclosed herein may include transferring or making accessible the certain application programs and/or informational data from a wired or wireless communication node located on the multipassenger transport vehicle. Related process aspects may further include transferring or making accessible the certain application programs and/or informational data from a portable communication node located on-board the multipassenger transport vehicle. Another related process operation may include transferring or making accessible the certain application programs and/or informational data from a wired or wireless communication node located separate and apart from the multipassenger vehicle.

It will be understood that numerous other individual method operations depicted in the flow charts of FIGS. 6-17 can be incorporated as encoded instructions in computer readable media in order to obtain enhanced benefits and advantages.

Figure 19:
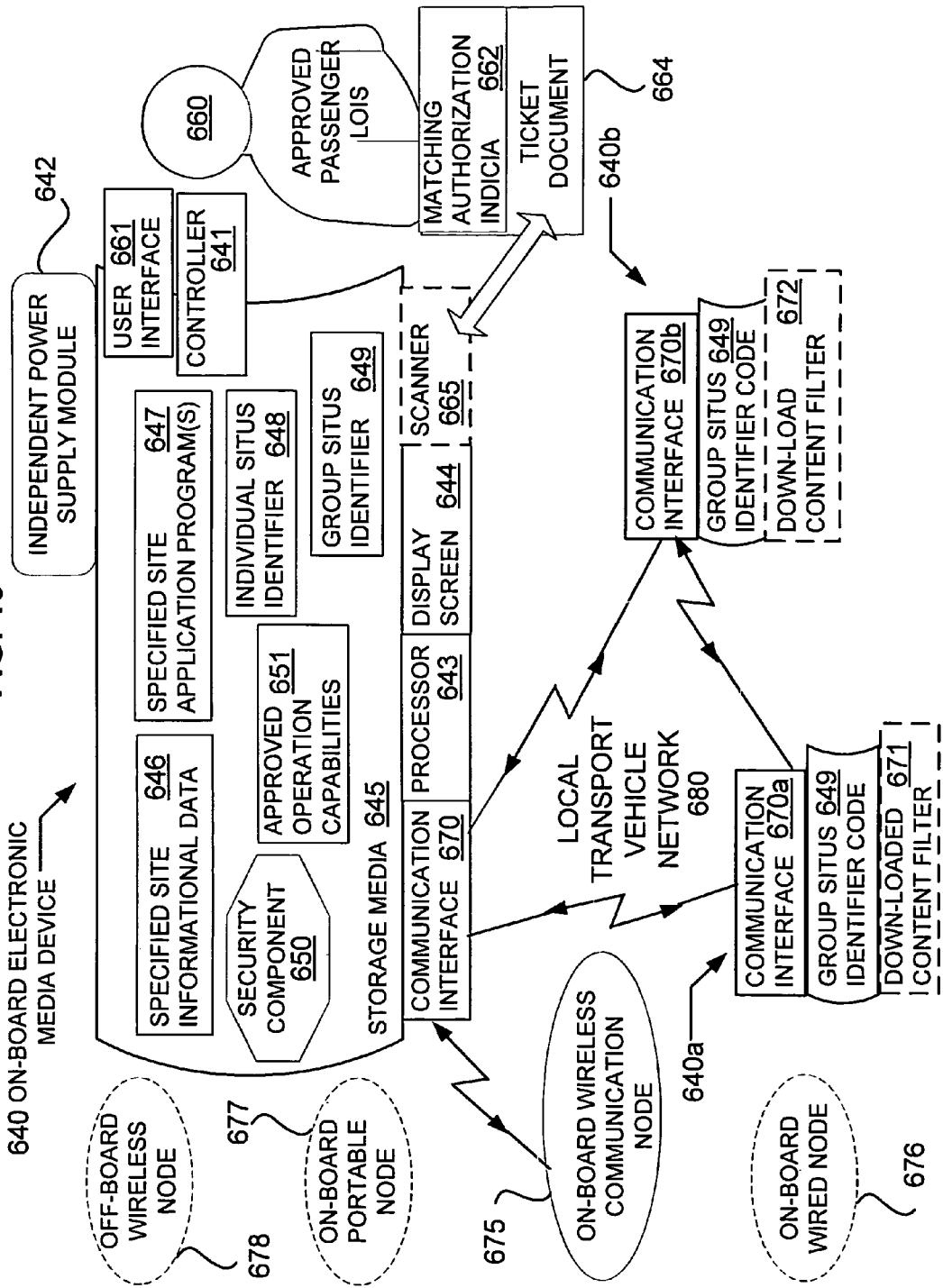
FIG. 19 is a schematic block diagram depicting exemplary system features for providing selective content and/or operational capability that is correlated with specified on-board sites.

The schematic block diagram of FIG. 19 depicts various aspects of an exemplary embodiment for an on-board electronic media device 640 that includes a controller 641, independent power supply module 642, processor 643, display screen 644, storage media 645, and security component 650. The storage media may include an individual situs identifier 648 as well as in some instances a group situs identifier 649 which are correlated with one or more specified on-board sites (e.g., space, seat, location, etc.) that will help determine a type or category of content to be available in transit to the electronic media device installed for use at the specified on-board site. Such content may include various specified site informational data 646 (e.g., customized for individual situs identifier 648, customized for group situs identifier 649) and/or specified site application programs 647 (e.g., customized for individual situs identifier 648, customized for group situs identifier 649) which are periodically transmitted from one or more external communication nodes 675, 676, 677, 678 to the appropriate secure storage media 645 respectively associated with the particular electronic media device 640.

The individual situs identifier 648 and the group situs identifier 649 may also determine various operation capabilities that will be available for usage on the on-board electronic media device 640. Some of these operation capabilities may be determined by passenger request or in some instances by a passenger payment status.

It will be understood that the security component 650 is adapted to provide protection against unauthorized on-board or off-board activity regarding the electronic media device 640 (e.g., limiting access and usage of the stored content in accordance with predetermined guidelines). In that regard the security component 650 of the on-board electronic media device may be linked to scanner 665 for verification of a matching authorization indicia 662 incorporated on a ticket document 664 of the approved passenger Lois 660. Based on confirmation of such verification, the on-board electronic media device 640 may be activated for usage of approved device capabilities 651 and to allow interactive engagement through user interface 661 by approved passenger Lois with the stored content (e.g., 646, 647) maintained in the storage media 645.

Depending on the circumstances, various management and/or control functions for an external communication node may be accomplished with an on-board wireless communication node 675 via a local transport network 680 linked with a communication interface 670 of the on-board electronic media device 640. Various other types of possible communication nodes may be provided, including for example an on-board wired node 676, an on-board portable node 677, and an off-board wireless node 678.

A further possible system feature may enable multiple on-board electronic media devices 640, 640a, 640b which are related (e.g., have the same group situs identifier code 648) to be inter-connected through their respective communication interfaces 670, 670a, 670b via the local transport network 680. The local network interconnection may enable in-transit bidirectional message exchanges, as well as in some instances further enabling a supervisory passenger (e.g., Lois 660) to limit or otherwise control content (e.g., see down-load content filters 671, 672) available at other related on-board electronic devices 675a, 675b. It will be understood that such content filters 671, 672 and other management and/or control functions may also be managed by transit vehicle staff via the local transport network 680.

In some circumstances it may be desirable to have a dedicated local transport vehicle network 680 (e.g., wired) to provide a connective link between related electronic media devices. Another possible embodiment feature may provide a dedicated link between a communication node and certain electronic devices. In some instances an implementation may enable on-board electronic devices to periodically have access to a centralized transport network as well as to the Internet and other off-board networks.

Figure 20:
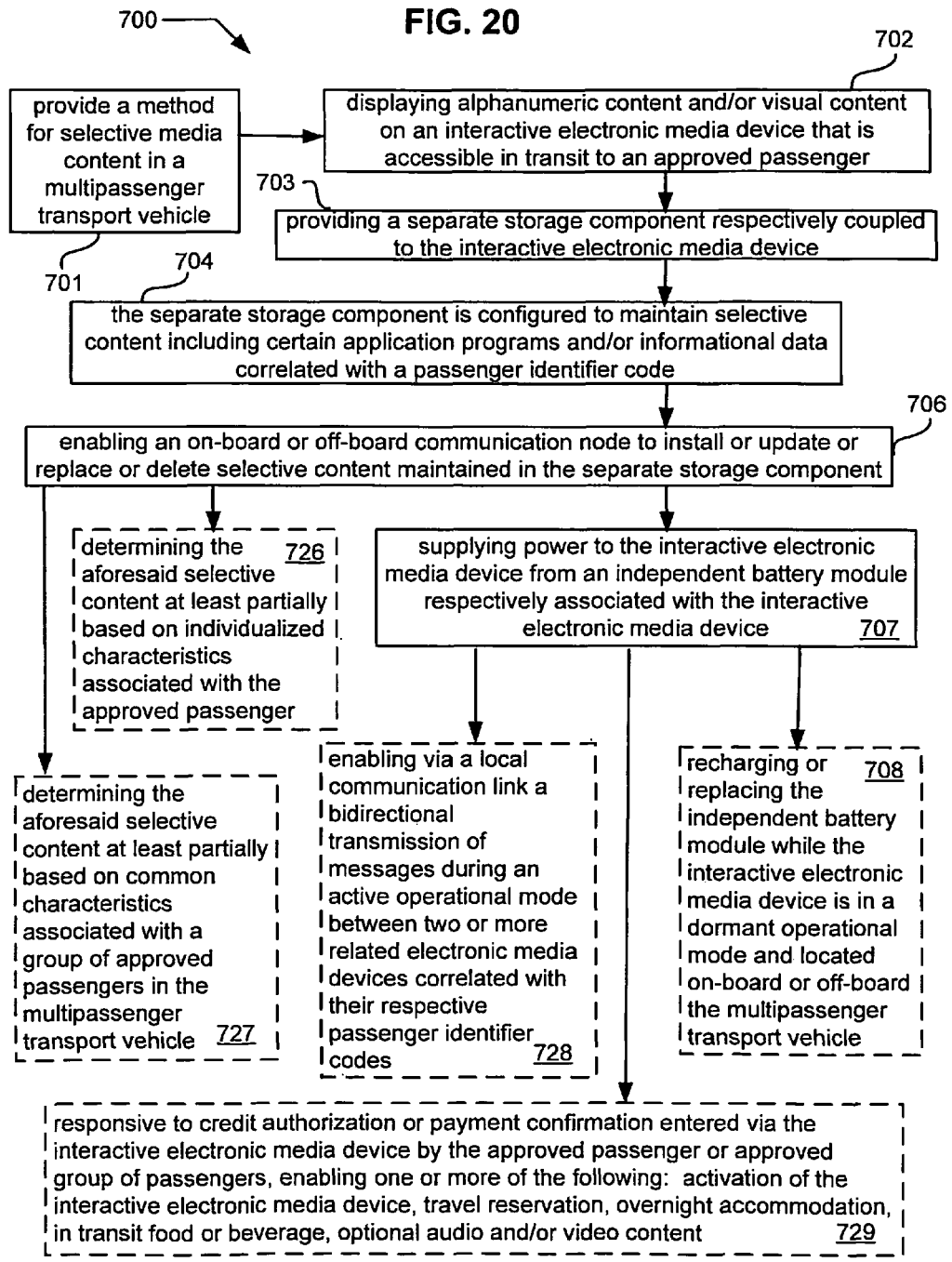
FIG. 20 is another higher level flow chart that illustrates process components for making certain content and/or operational capability available to particular identified passengers.

The flow chart of FIG. 20 illustrates various embodiment features 700 that may be incorporated in a method for selective media content in a multipassenger transport vehicle (block 701), including displaying alphanumeric content and/or visual content on an interactive electronic media device that is accessible in transit to an approved passenger (block 702); and providing a separate storage component respectively coupled to the interactive electronic media device (block 703), wherein the separate storage component is configured to maintain selective content including certain application programs and/or informational data correlated with a passenger identifier code (block 704). Further illustrated process examples include enabling an on-board or off-board communication node to install or update or replace or delete selective content maintained in the separate storage component (block 706), and supplying power to the interactive electronic media device from an independent battery module respectively associated with the interactive electronic media device block (707).

Some exemplary embodiment features relating to media device management and/or servicing may include recharging or replacing the independent battery module while the interactive electronic media device is in a dormant operational mode and located on-board or off-board the multipassenger transport vehicle (block 708). Other possible content management aspects may include determining the aforesaid selective content at least partially based on individualized characteristics associated with the approved passenger (block 726), as well as determining the aforesaid selective content at least partially based on common characteristics associated with a group of approved passengers in the multipassenger transport vehicle (block 727).

Additional process features may include enabling via a local communication link a bidirectional transmission of messages during an active operational mode between two or more related electronic media devices correlated with their respective passenger identifier codes (block 728). In some instances a further operation sequence may include responsive to credit authorization or payment confirmation entered via the interactive electronic media device by the approved passenger or approved group of passengers, enabling one or more of the following: activation of the interactive electronic media device, travel reservation, overnight accommodation, in transit food or beverage, optional audio and/or video content (block 729).

Figure 21:
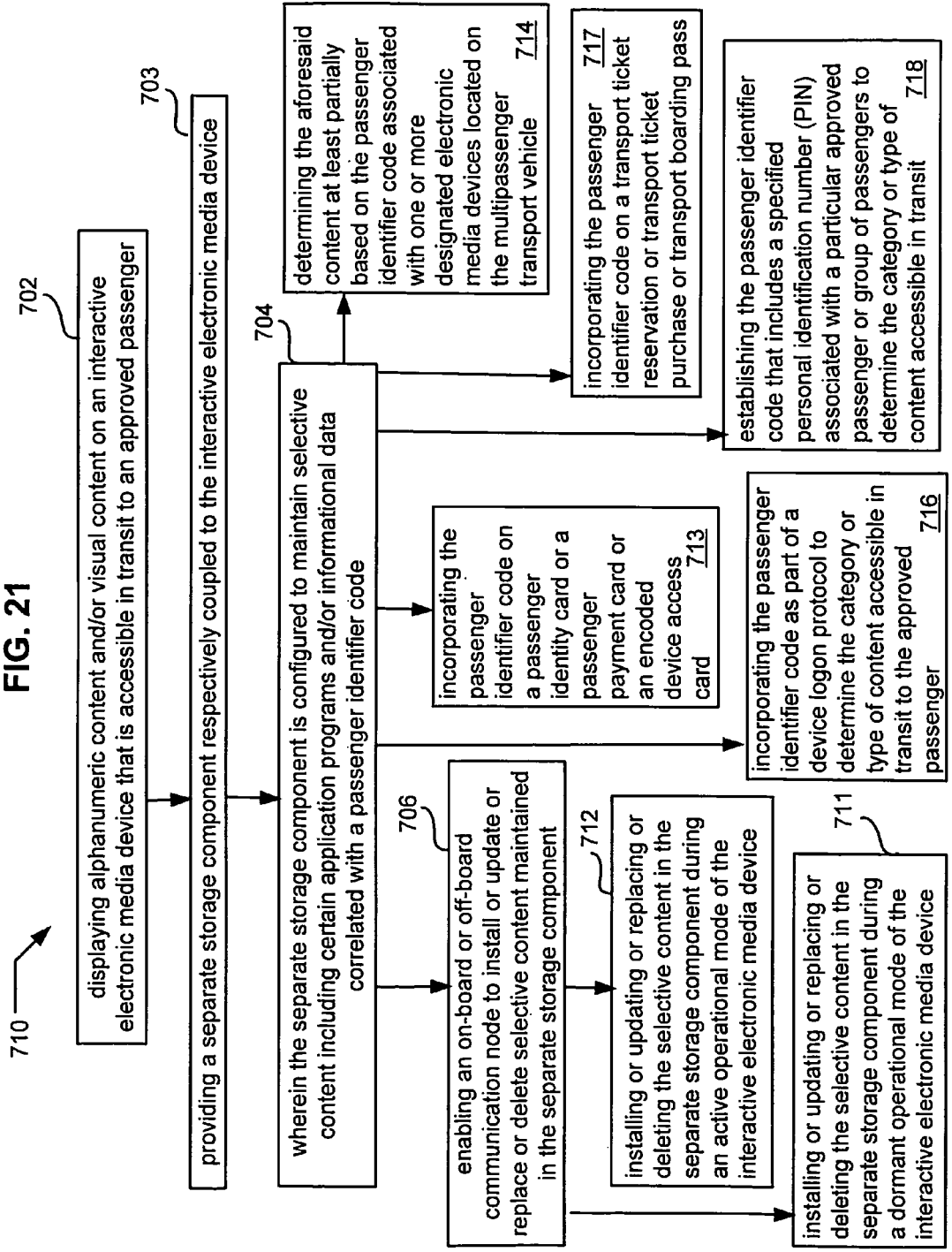
FIGS. 21-31 are detailed flow charts illustrating other exemplary process aspects regarding content and/or operational capability for different identified passengers.

Referring to various process features 710 depicted in FIG. 21, an exemplary embodiment may include previously described process components 702, 703, 704, 706 along with installing or updating or replacing or deleting the selective content in the separate storage component during a dormant operational mode of the interactive electronic media device (block 711), and in some instances during an active operational mode of the interactive electronic media device (block 712). Further aspects may include determining the media content at least partially based on the passenger identifier code associated with one or more designated electronic media devices located on the multipassenger transport vehicle (block 714).

Additional possible variations relating to the passenger identifier code may include incorporating the passenger identifier code on a passenger identity card or a passenger payment card or an encoded device access card (block 713). Another possible variation may include incorporating the passenger identifier code as part of a device logon protocol to determine the category or type of content accessible in transit to the approved passenger (block 716). Some embodiment aspects may further include incorporating the passenger identifier code on a transport ticket reservation or transport ticket purchase or transport boarding pass (block 717). A further possible aspect may include establishing the passenger identifier code that includes a specified personal identification number (PIN) associated with a particular approved passenger or group of passengers to determine the category or type of content accessible in transit (block 718).

Figure 22:
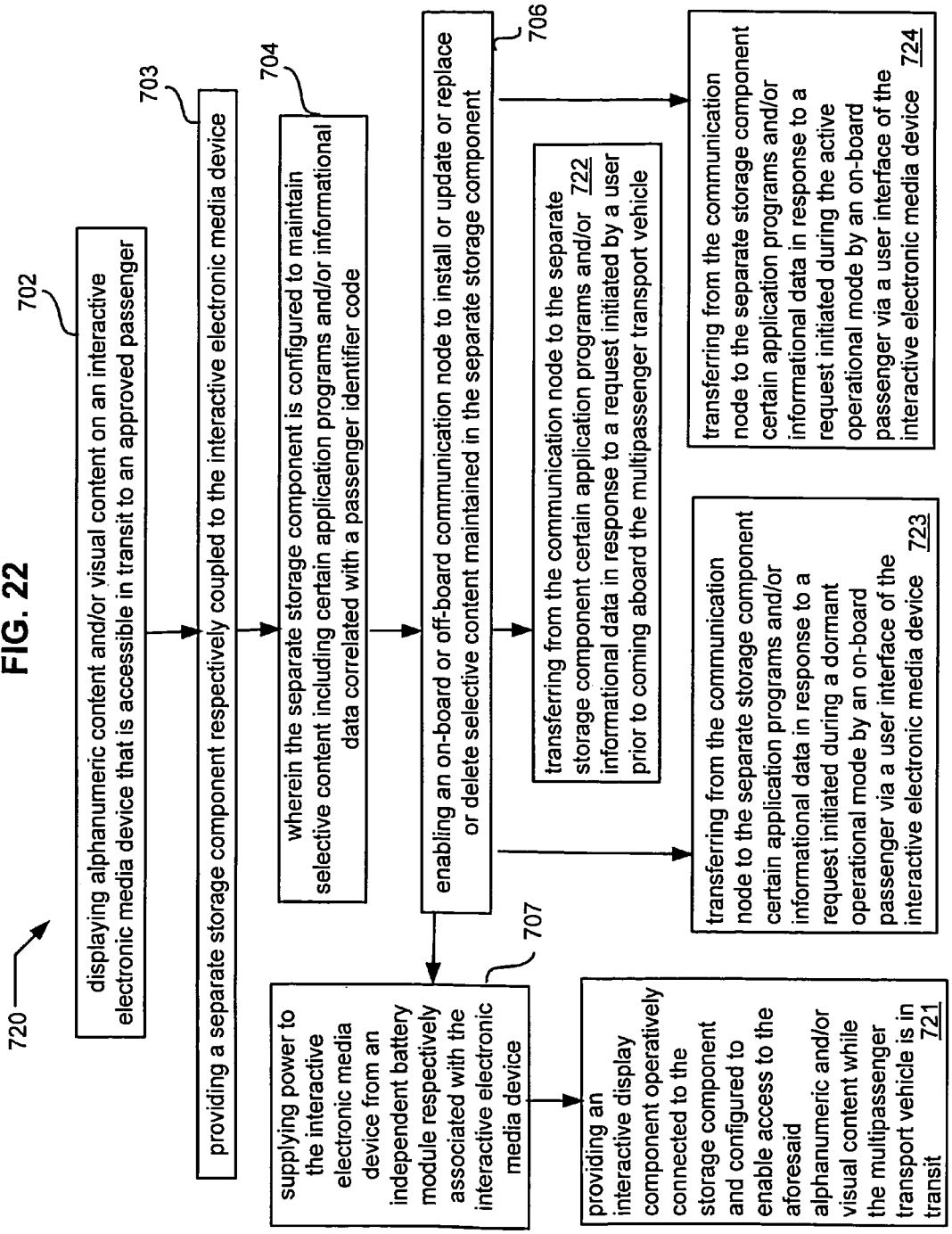

The flow chart of FIG. 22 shows some exemplary embodiment features 720 that include previously described process aspects 702, 703, 704, 706, 707 in combination with providing an interactive display component operatively connected to the storage component and configured to enable access to the aforesaid alphanumeric and/or visual content while the multipassenger transport vehicle is in transit (block 721). Another process feature may include transferring from the communication node to the separate storage component certain application programs and/or informational data in response to a request initiated by a user prior to coming aboard the multipassenger transport vehicle (block 722).

Additional illustrated aspects may further include transferring from the communication node to the separate storage component certain application programs and/or informational data in response to a request initiated during a dormant operational mode by an on-board passenger via a user interface of the interactive electronic media device (block 723). In some instances such content management may include transferring from the communication node to the separate storage component certain application programs and/or informational data in response to a request initiated during the active operational mode by an on-board passenger via a user interface of the interactive electronic media device (block 724).

Figure 23:
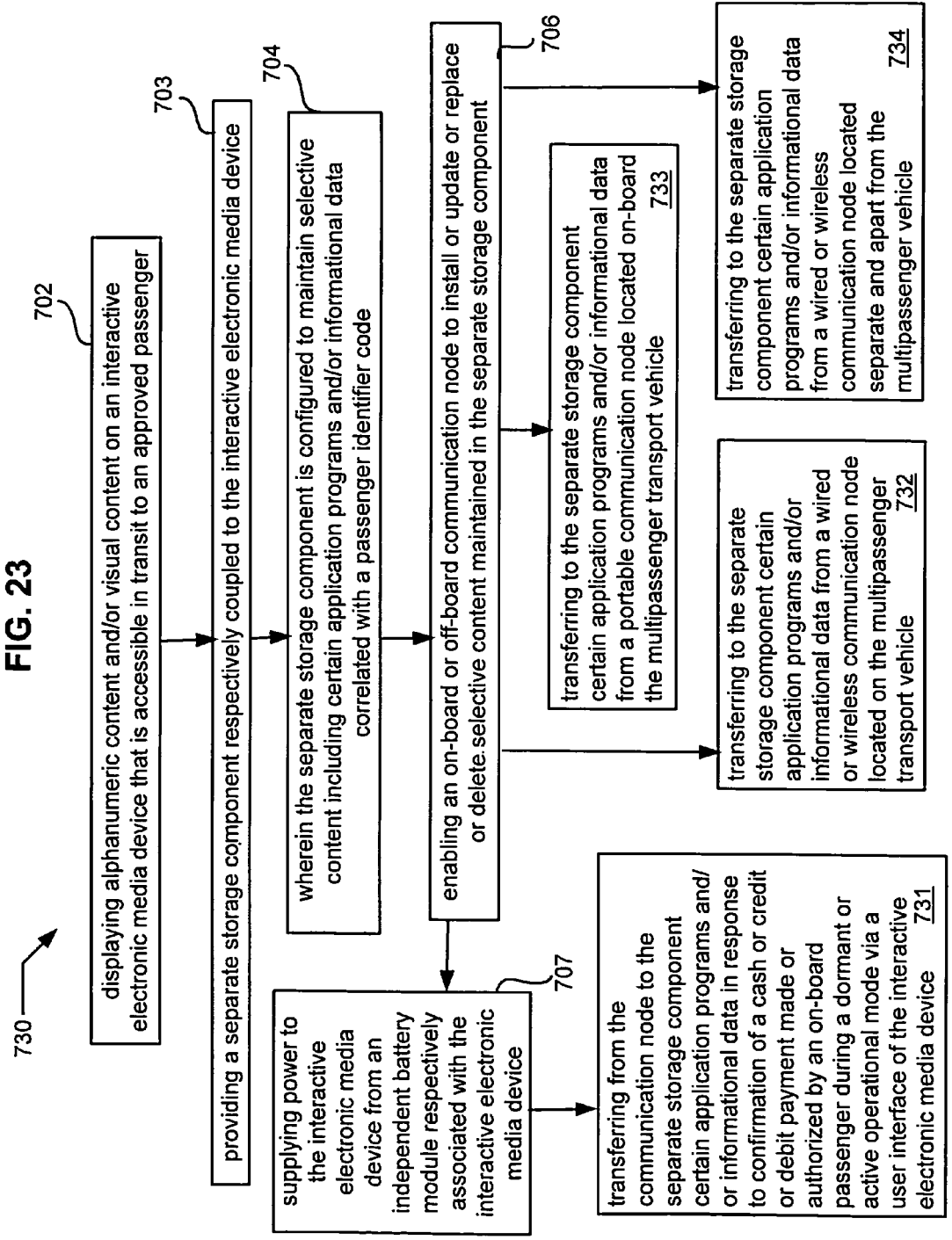

Referring to FIG. 23 which illustrates further possible embodiment features 730, examples of process aspects may include previously described features 702, 703, 704, 706, 707 as well as transferring from the communication node to the separate storage component certain application programs and/or informational data in response to confirmation of a cash or credit or debit payment made or authorized by an on-board passenger during a dormant or active operational mode via a user interface of the interactive electronic media device (block 731). Other possible media content aspects may include transferring to the separate storage component certain application programs and/or informational data from a wired or wireless communication node located on the multipassenger transport vehicle (block 732).

Additional possible media content aspects may include transferring to the separate storage component certain application programs and/or informational data from a portable communication node located on-board the multipassenger transport vehicle (block 733). Further process aspects may include transferring to the separate storage component certain application programs and/or informational data from a wired or wireless communication node located separate and apart from the multipassenger vehicle (block 734).

Figure 24:
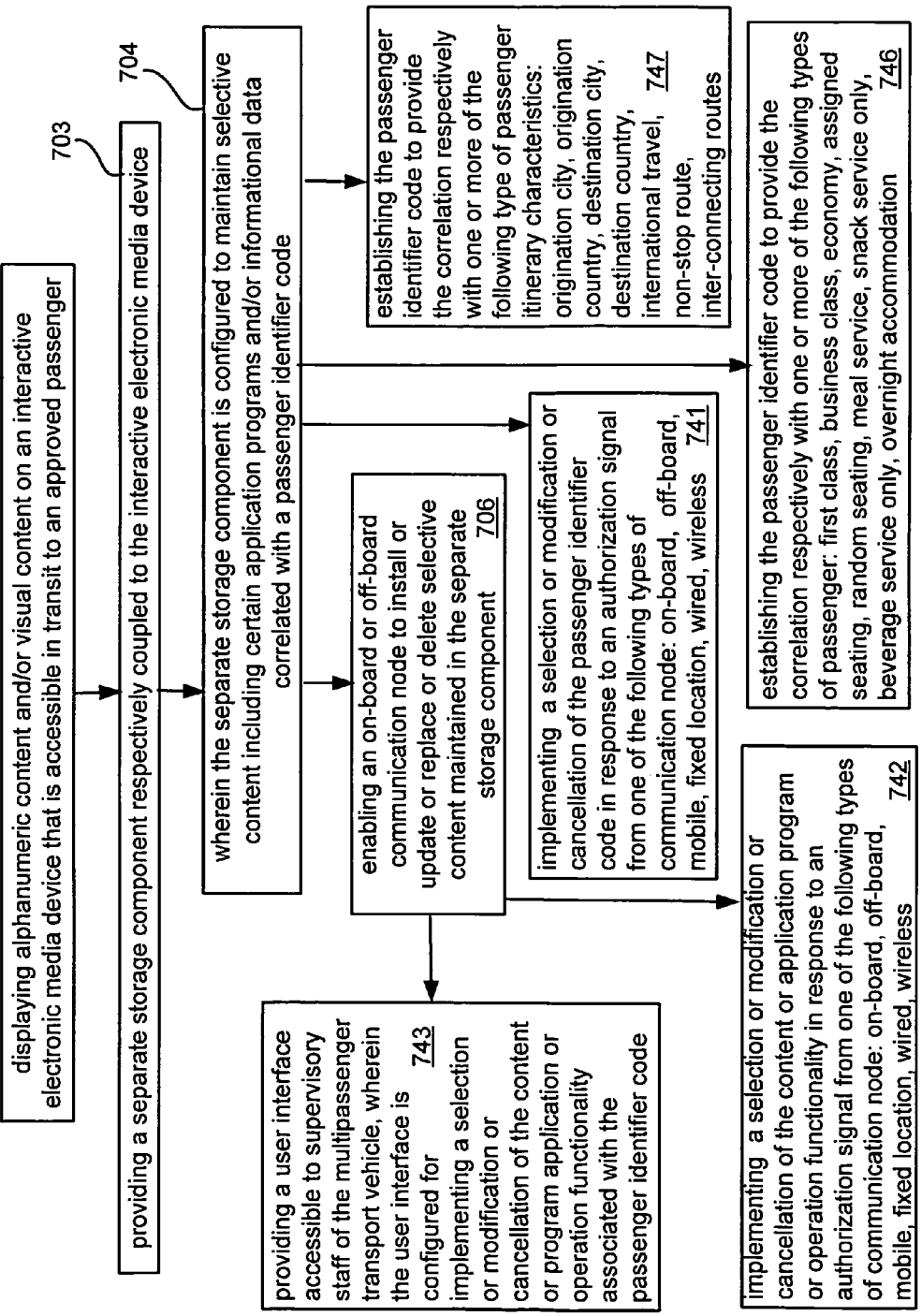

The detailed flow chart of FIG. 24 provides additional examples of process embodiment features 740, including previously described components 702, 703, 704, 706 in combination with implementing a selection or modification or cancellation of the passenger identifier code in response to an authorization signal from one of the following types of communication node: on-board, off-board, mobile, fixed location, wired, wireless (block 741). Another possible process feature includes implementing a selection or modification or cancellation of various media content in response to an authorization signal from one of the following types of communication node: on-board, off-board, mobile, fixed location, wired, wireless (block 742).

Further illustrated process examples include providing a user interface accessible to supervisory staff of the multipassenger transport vehicle, wherein the user interface is configured for implementing a selection or modification or cancellation of the media content associated with the passenger identifier code (block 743). Some illustrated process examples include establishing the passenger identifier code to provide the correlation respectively with one or more of the following types of passenger: first class, business class, economy, assigned seating, random seating, meal service, snack service only, beverage service only, overnight accommodation (block 746). Other illustrated process examples include establishing the passenger identifier code to provide the correlation respectively with one or more of the following type of passenger itinerary characteristics: origination city, origination country, destination city, destination country, international travel, non-stop route, inter-connecting routes (block 747).

Figure 25:
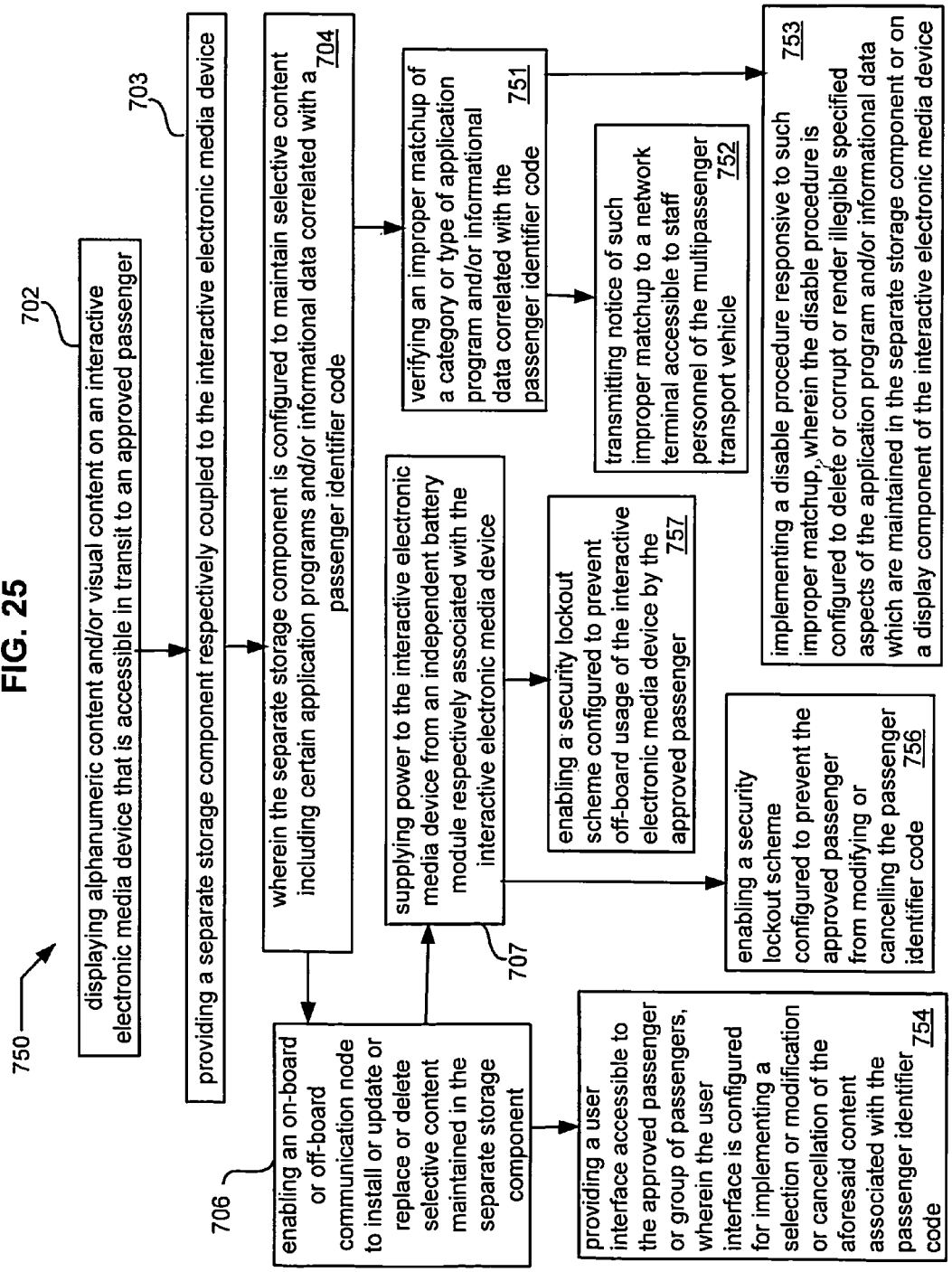

The flow chart of FIG. 25 shows various possible process features 750 including previously described aspects 702, 703, 704, 706, 707 as well as verifying an improper matchup of a category or type of application program and/or informational data correlated with the passenger identifier code (block 751). Related aspects may include transmitting notice of such improper matchup to a network terminal accessible to staff personnel of the multipassenger transport vehicle (block 752). A further related aspect may include implementing a disable procedure responsive to such improper matchup, wherein the disable procedure is configured to delete or corrupt or render illegible specified aspects of the application program and/or informational data which are maintained in the separate storage component or on a display component of the interactive electronic media device (block 753).

Additional exemplary process features are illustrated in FIG. 25, including providing a user interface accessible to the approved passenger or group of passengers, wherein the user interface is configured for implementing a selection or modification or cancellation of the aforesaid content associated with the passenger identifier code (block 754). In some instances a possible process features includes enabling a security lockout scheme configured to prevent the approved passenger from modifying or cancelling the passenger identifier code (block 756). A related security feature may include enabling a security lockout scheme configured to prevent off-board usage of the interactive electronic media device by the approved passenger (block 757).

Figure 26:
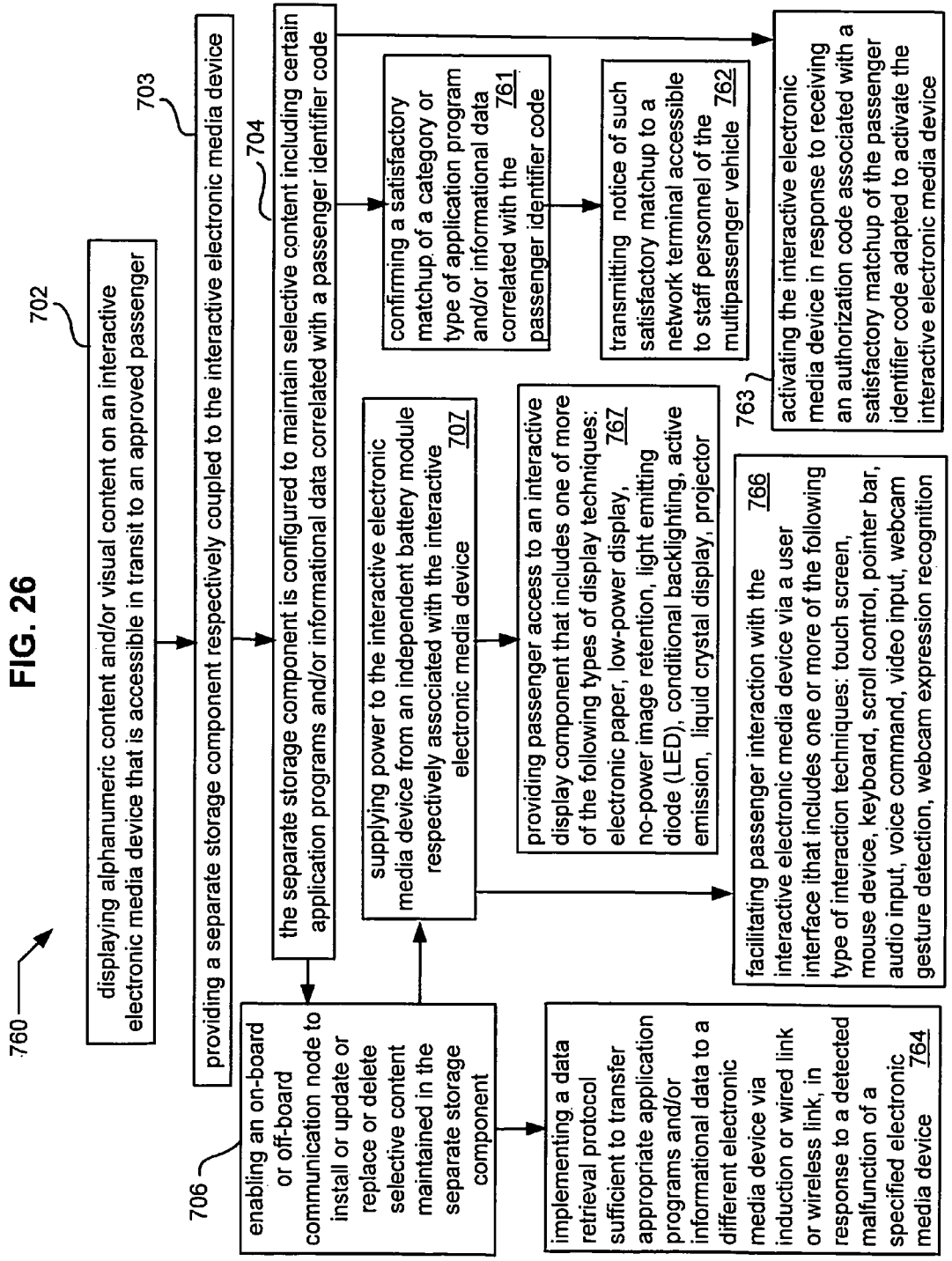

The exemplary process features 760 shown in the flow chart of FIG. 26 include previously described aspects 702, 703, 704, 706, 707 in combination with confirming a satisfactory matchup of a category or type of application program and/or informational data correlated with the passenger identifier code (block 761). Related possible process features include transmitting notice of such satisfactory matchup to a network terminal accessible to staff personnel of the multipassenger vehicle (block 762), and in some instances activating the interactive electronic media device in response to receiving an authorization code associated with a satisfactory matchup of the passenger identifier code adapted to activate the interactive electronic media device (block 763).

A further enhancement in some embodiments may include implementing a data retrieval protocol sufficient to transfer appropriate application programs and/or informational data to a different electronic media device via induction or wired link or wireless link, in response to a detected malfunction of a specified electronic media device (block 764).

Additional process aspects incorporated in some embodiments may also include facilitating passenger interaction with the interactive electronic media device via a user interface that includes one or more of the following type of interaction techniques: touch screen, mouse device, keyboard, scroll control, pointer bar, audio input, voice command, video input, webcam gesture detection, webcam expression recognition (block 766). Other possible process aspects include providing passenger access to an interactive display component that includes one of more of the following types of display techniques: electronic paper, low-power display, no-power image retention, light emitting diode (LED), conditional backlighting, active emission, liquid crystal display, projector (block 767).

Figure 27:
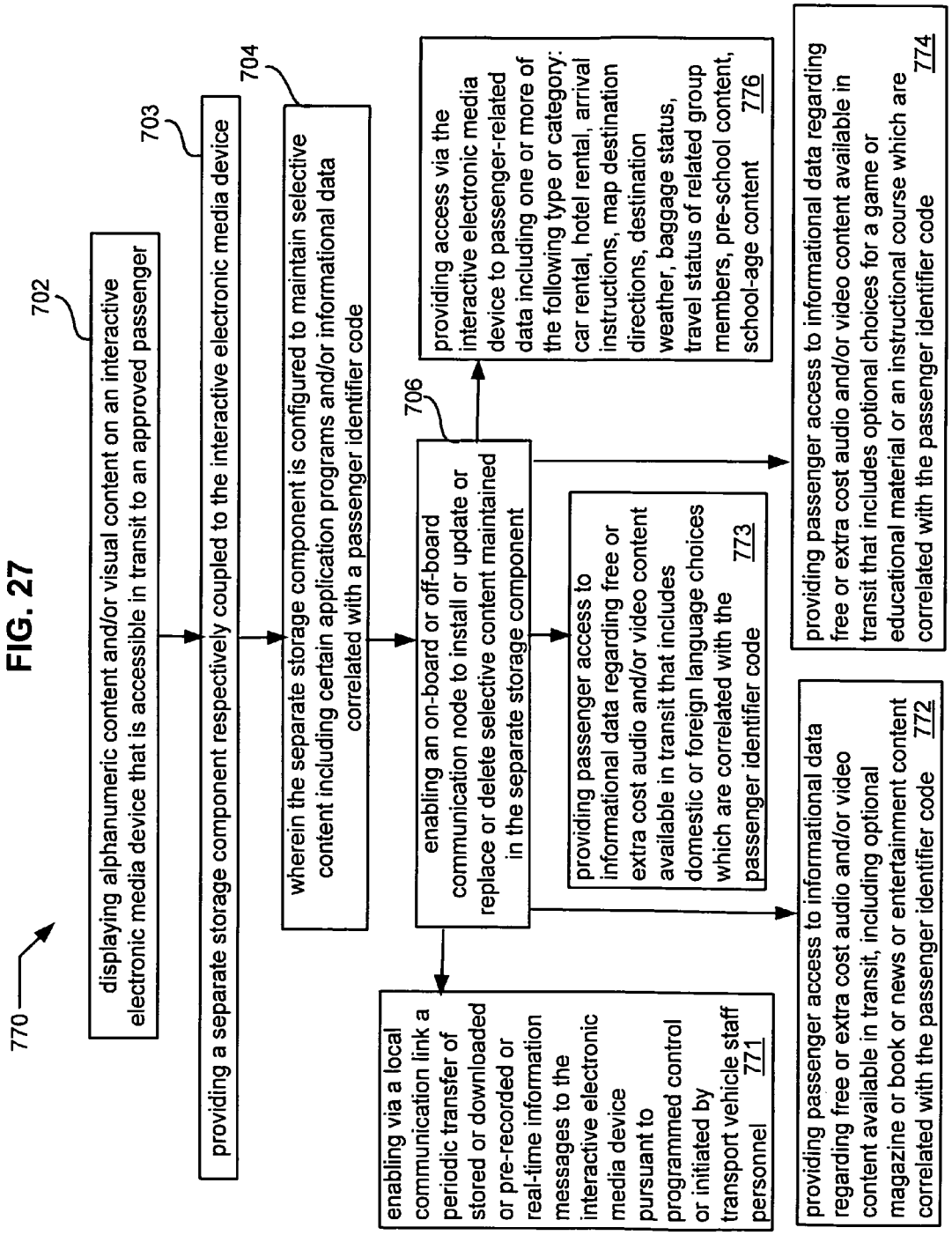

The flow chart of FIG. 27 depicts various exemplary process features 770 that include previously described process components 702, 703, 704, 706 as well as enabling via a local communication link a periodic transfer of stored or downloaded or pre-recorded or real-time information messages to the interactive electronic media device pursuant to programmed control or initiated by transport vehicle staff personnel (block 771). Further process possibilities regarding media content may include providing passenger access to informational data regarding free or extra cost audio and/or video content available in transit, including optional magazine or book or news or entertainment content correlated with the passenger identifier code (block 772). Other process examples may include providing passenger access to informational data regarding free or extra cost audio and/or video content available in transit that includes domestic or foreign language choices which are correlated with the passenger identifier code (block 773).

Additional illustrated process features include providing passenger access to informational data regarding free or extra cost audio and/or video content available in transit that includes optional choices for a game or educational material or an instructional course which are correlated with the passenger identifier code (block 774). Some embodiments may include providing access via the interactive electronic media device to passenger-related data including one or more of the following type or category: car rental, hotel rental, arrival instructions, map destination directions, destination weather, baggage status, travel status of related group members, pre-school content, school-age content (block 776).

Figure 28:
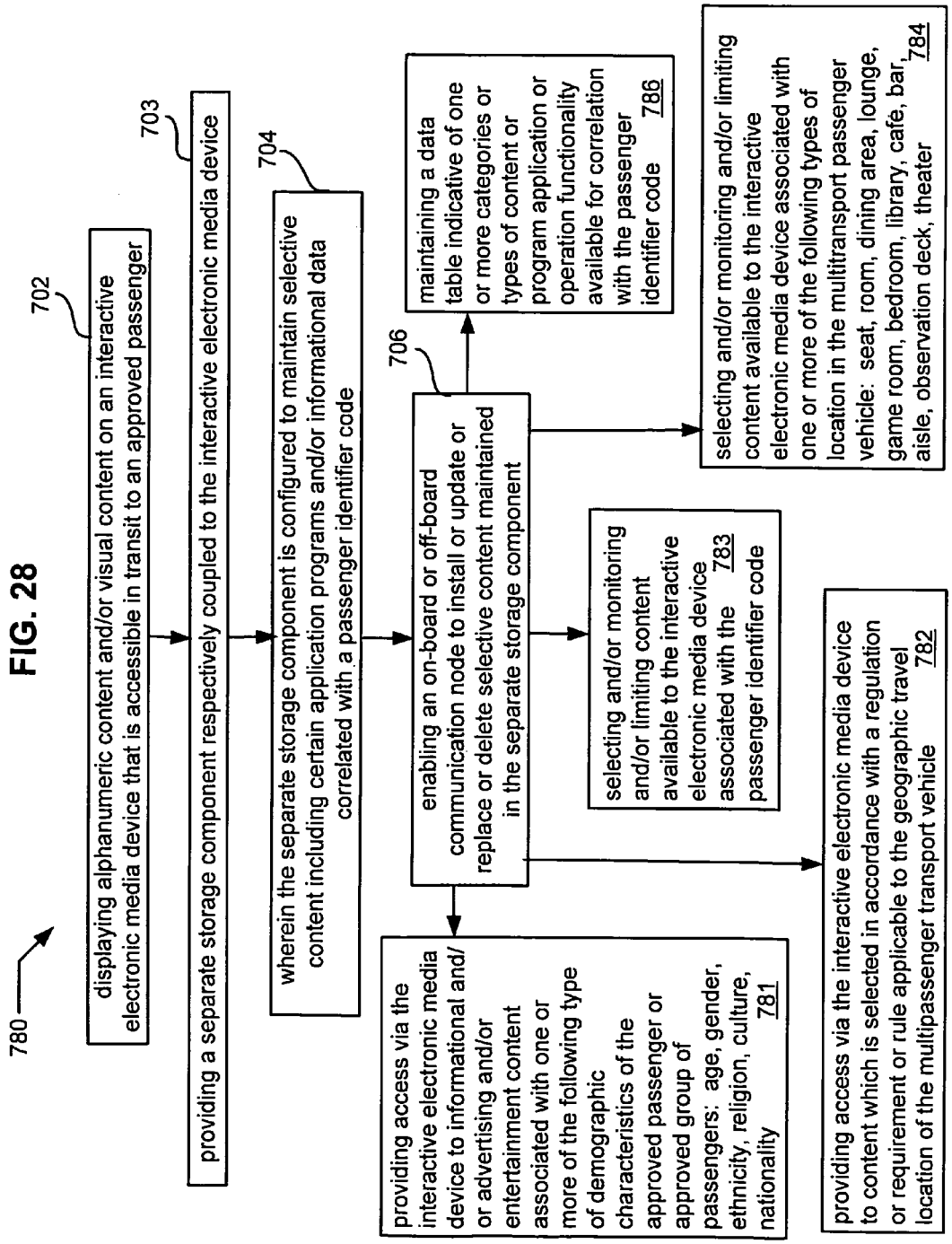

Referring to exemplary process features 780 shown in the flow chart of FIG. 28, a possible embodiment may include previously described aspects 702, 703, 704, 706 in combination with providing access via the interactive electronic media device to informational and/or advertising and/or entertainment content associated with one or more of the following type of demographic characteristics of the approved passenger or approved group of passengers: age, gender, ethnicity, religion, culture, nationality (block 781). Other process possibilities include providing access via the interactive electronic media device to content which is selected in accordance with a regulation or requirement or rule applicable to the geographic travel location of the multipassenger transport vehicle (block 782).

In some instances an embodiment may further include selecting and/or monitoring and/or limiting content available to the interactive electronic media device associated with the passenger identifier code (block 783). A related aspect may include selecting and/or monitoring and/or limiting content available to the interactive electronic media device associated with one or more of the following types of location in the multitransport passenger vehicle: seat, room, dining area, lounge, game room, bedroom, library, café, bar, aisle, observation deck, theater (block 784). Further related aspects may include maintaining a data table indicative of one or more categories or types of content or program application or operation functionality available for correlation with the passenger identifier code (block 786).

Figure 29:
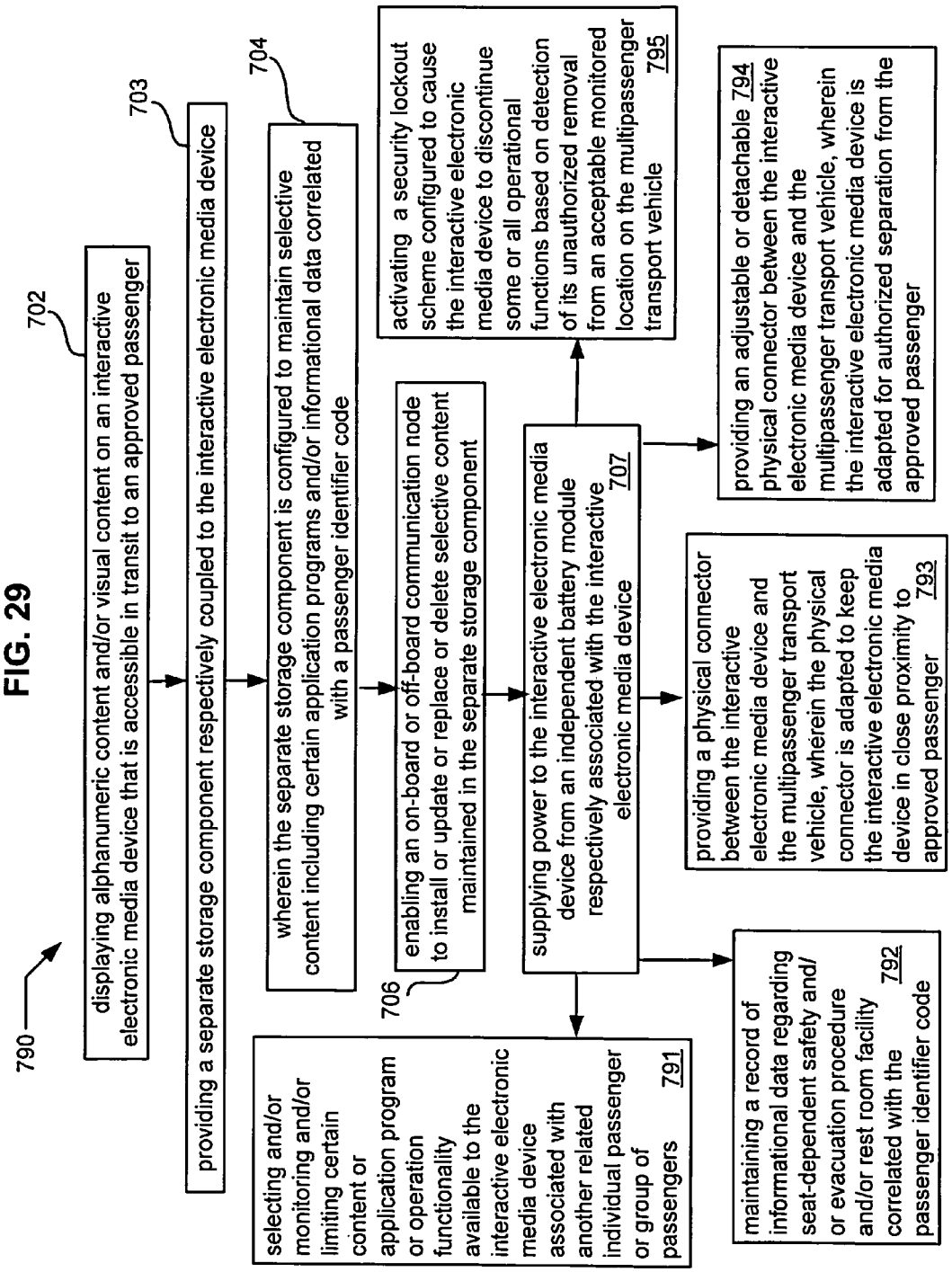

Referring to FIG. 29, various possible method aspects 790 are illustrated including previously described features 702, 703, 704, 706, 707 as well as selecting and/or monitoring and/or limiting content available to the interactive electronic media device associated with another related individual passenger or group of passengers (block 791). Further method aspects may be included, such as maintaining a record of informational data regarding seat-dependent safety and/or evacuation procedure and/or rest room facility correlated with the passenger identifier code (block 792).

Additional possibilities include providing a physical connector between the interactive electronic media device and the multipassenger transport vehicle, wherein the physical connector is adapted to keep the interactive electronic media device in close proximity to approved passenger (block 793). In some instances it may be desirable to include providing an adjustable or detachable physical connector between the interactive electronic media device and the multipassenger transport vehicle, wherein the interactive electronic media device is adapted for authorized separation from the approved passenger (block 794).

Another exemplary process feature includes activating a security lockout scheme configured to cause the interactive electronic media device to discontinue some or all operational functions based on detection of its unauthorized removal from an acceptable monitored location on the multipassenger transport vehicle (block 796).

Figure 30:
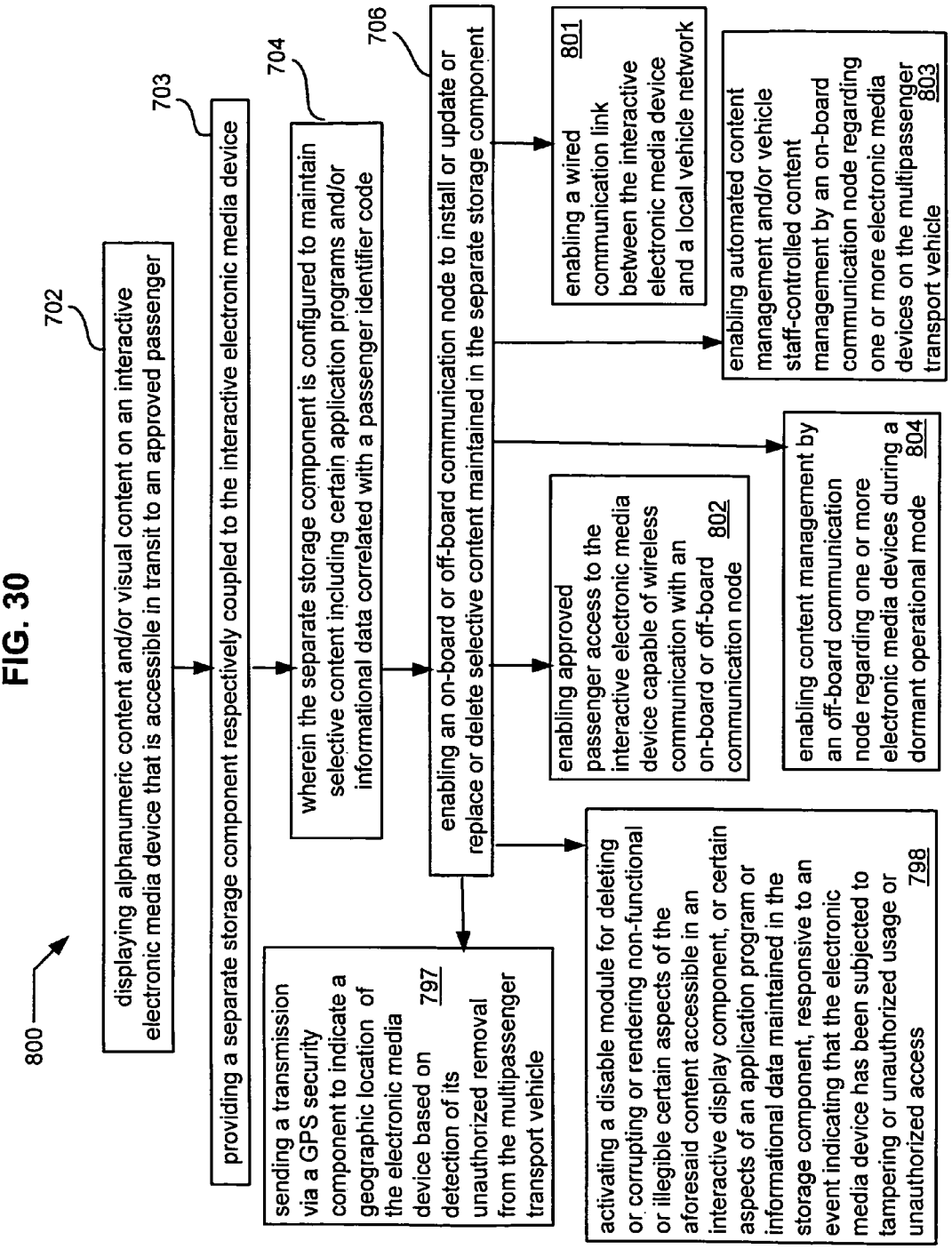

The flow chart of FIG. 30 illustrates different exemplary process features 800 that include previously described process operations 702, 703, 704, 706 along with enabling a wired communication link between the interactive electronic media device and a local vehicle network (block 801). Another process feature may include enabling approved passenger access to the interactive electronic media device capable of wireless communication with an on-board or off-board communication node (block 802).

Additional illustrated aspects include enabling automated content management and/or vehicle staff-controlled content management by an on-board communication node regarding one or more electronic media devices on the multipassenger transport vehicle (block 803). A further possible aspect includes enabling content management by an off-board communication node regarding one or more electronic media devices during a dormant operational mode (block 804).

Some embodiments may include sending a transmission via a GPS security component to indicate a geographic location of the electronic media device based on detection of its unauthorized removal from the multipassenger transport vehicle (block 797). In some instances a further process aspect may include activating a disable module for deleting or corrupting or rendering non-functional or illegible certain aspects of the aforesaid content accessible in an interactive display component, or certain aspects of an application program or informational data maintained in the storage component, responsive to an event indicating that the electronic media device has been subjected to tampering or unauthorized usage or unauthorized access (block 798).

Figure 31:
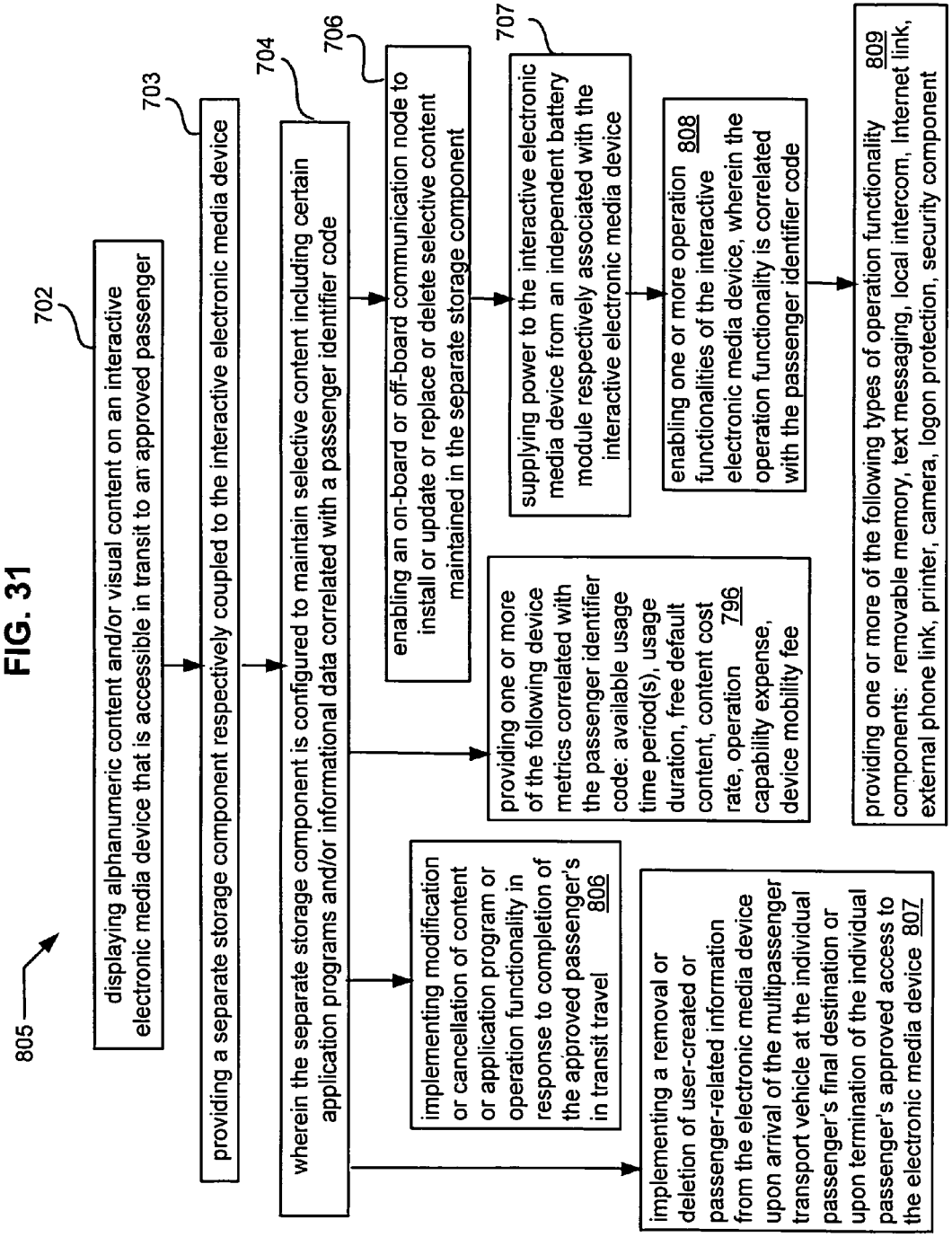

Referring to the flow chart of FIG. 31, possible embodiment aspects 805 may include previously described process components 702, 703, 704, 706, 707 in combination with enabling one or more operation functionalities of the interactive electronic media device, wherein the operation functionality is correlated with the passenger identifier code (block 808). A related process component may include providing one or more of the following types of operation functionality components: removable memory, text messaging, local intercom, Internet link, external phone link, printer, camera, logon protection, security component (block 809).

Further possible process features depicted in FIG. 31 may include providing one or more of the following device metrics correlated with the passenger identifier code: available usage time period(s), usage duration, free default content, content cost rate, operation capability expense, device mobility fee (block 796). Another example of a process aspect includes implementing modification or cancellation of certain content or application program or operation functionality in response to completion of the approved passenger's in transit travel (block 806). A further possible example includes implementing a removal or deletion of user-created or passenger-related information from the electronic media device upon arrival of the multipassenger transport vehicle at the individual passenger's final destination or upon termination of the individual passenger's approved access to the electronic media device (block 807).

Figure 32:
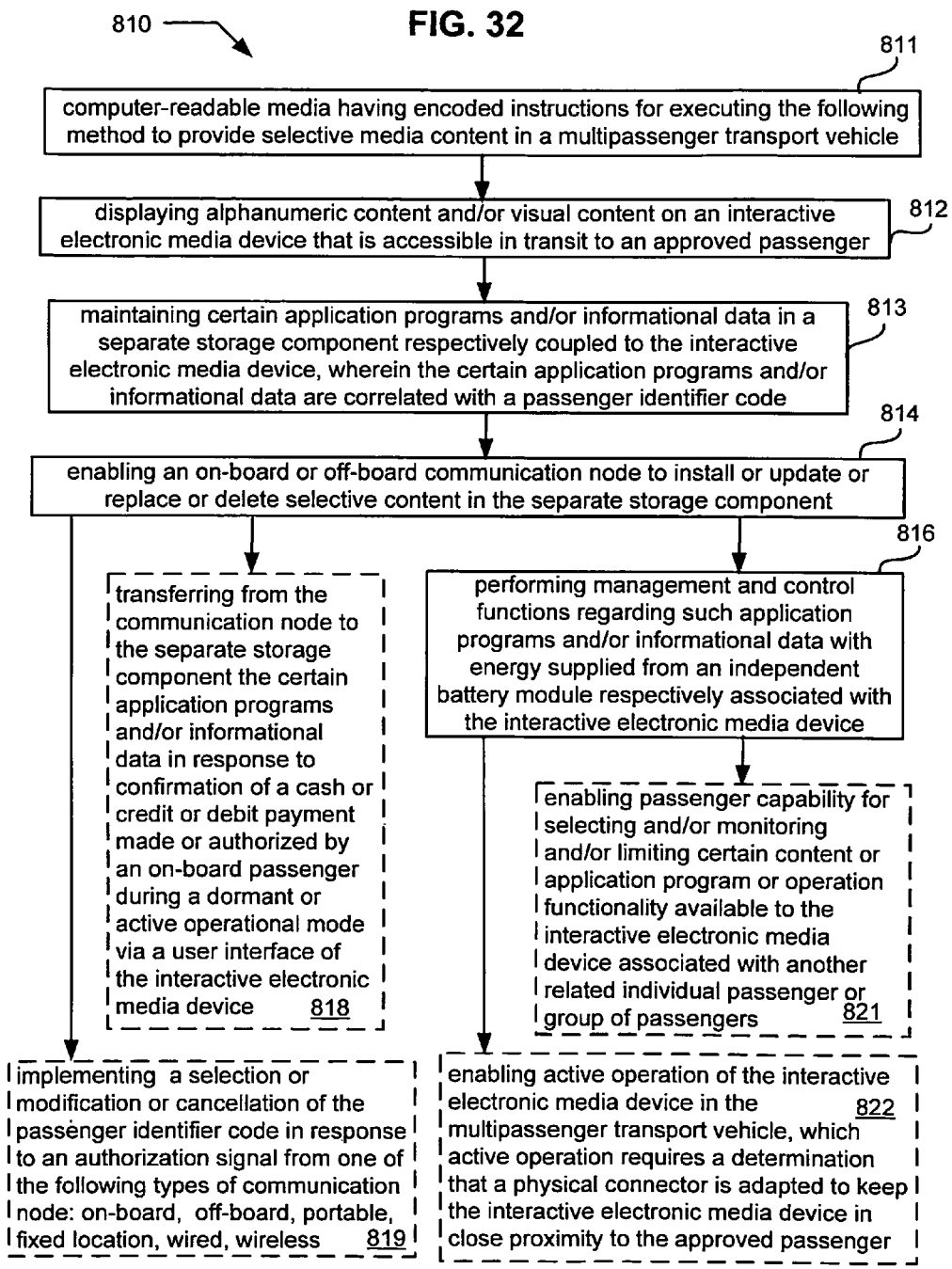
FIG. 32 is diagrammatic flow chart for additional exemplary computer-readable media embodiment features.

FIG. 32 is a diagrammatic flow chart exemplified in an article of manufacture embodiment 810 wherein computer readable media have encoded instructions for executing a method for providing selective media content in a multipassenger transport vehicle (block 811). A possible exemplary programmed method may include displaying alphanumeric content and/or visual content on an interactive electronic media device that is accessible in transit to an approved passenger (block 812); maintaining certain application programs and/or informational data in a separate storage component respectively coupled to the interactive electronic media device, wherein the certain application programs and/or informational data are correlated with a passenger identifier code (block 813); and enabling an on-board or off-board communication node to install or update or replace or delete selective content in the separate storage component (block 814). Other possible programmed method operations may include performing management and control functions regarding such application programs and/or informational data with energy supplied from an independent battery module respectively associated with the interactive electronic media device (block 816).

Further exemplary programmed methods depicted in FIG. 32 include transferring from the communication node to the separate storage component the certain application programs and/or informational data in response to confirmation of a cash or credit or debit payment made or authorized by an on-board passenger during a dormant or active operational mode via a user interface of the interactive electronic media device (block 818). In some instances a programmed method may include implementing a selection or modification or cancellation of the passenger identifier code in response to an authorization signal from one of the following types of communication node: on-board, off-board, portable, fixed location, wired, wireless (block 819).

Additional illustrated examples of programmed method aspects include enabling passenger capability for selecting and/or monitoring and/or limiting content available to the interactive electronic media device associated with another related individual passenger or group of passengers (block 821), as well as enabling active operation of the interactive electronic media device in the multipassenger transport vehicle, wherein the active operation requires a determination that a physical connector is adapted to keep the interactive electronic media device in close proximity to the approved passenger (block 822).

It will be understood that numerous other individual method operations depicted in the flow charts of FIGS. 20-31 can be incorporated as encoded instructions in computer readable media in order to obtain enhanced benefits and advantages.

Figure 33:
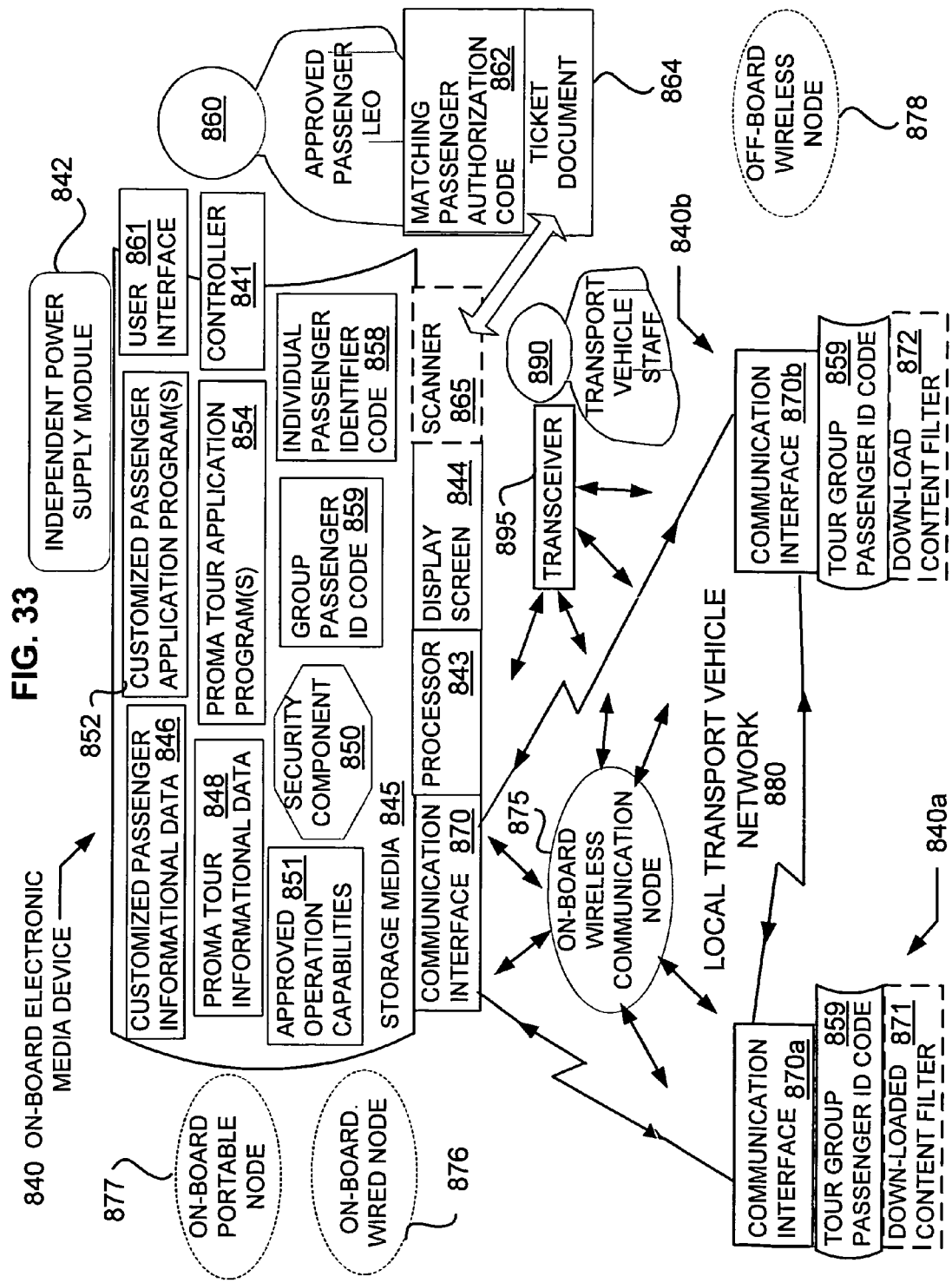
FIG. 33 is a schematic block diagram depicting exemplary system features for providing selective content and/or operational capability that is correlated with particular passenger identifier codes.

The schematic block diagram of FIG. 33 depicts various aspects of another exemplary embodiment for an on-board electronic media device 840 that includes a controller 841, independent power supply module 842, processor 843, display screen 844, storage media 845, and security component 850. The storage media may include an individual passenger identifier code 858 as well as in some instances a tour group passenger identifier code 859 which are correlated with one or more specified approved passengers that will help determine a type or category of content to be available in transit on their respective electronic media devices. Such content may include customized passenger informational data and application programs 846, 852 (e.g., correlated with individual passenger ID code 858) as well as Proma Tour informational data and application programs 848, 854 (correlated with group passenger ID code 859) which are periodically transmitted from one or more external communication nodes (e.g., see 875, 876, 877, 878) to the appropriate secure storage media 845 for a particular electronic media device.

The individual passenger identifier code 858 and the group situs identifier 859 may also determine various approved operation capabilities 851 that will be available for usage on the on-board electronic media device 840. Some of these operation capabilities may be determined by passenger request or in some instances by a passenger payment status.

It will be understood that the security component 850 is adapted to provide protection against unauthorized on-board or off-board activity regarding the electronic media device 840 (e.g., limiting access and usage of the stored content in accordance with predetermined guidelines). In that regard the security component 850 of the on-board electronic media device 840 may be linked to scanner 865 for verification of a matching passenger authorization code 862 incorporated on a ticket document 864 of an approved passenger Leo 860. Based on confirmation of such verification, the on-board electronic media device 840 may be activated for usage of approved device capabilities 851 and to allow interactive engagement through user interface 861 by approved passenger Leo with the stored data (e.g., 846, 848) and application programs (e.g., 852, 854) maintained in the storage media 845.

Depending on the circumstances, various management and/or control functions may be facilitated by various types of external communication nodes. For example, some management and/or control functions may be accomplished with an on-board wireless communication node 875 via a local transport network 880 linked with a communication interface 870 of the on-board electronic media device 840. As disclosed herein, various other types of possible communication nodes may be provided, including for example an on-board wired node 876, an on-board portable node 877, and an off-board wireless node 878.

As disclosed herein an exemplary computerized system embodiment may include a communication node that is configured to download or provide access to the content or application program or operation functionality in response to a request initiated by a user prior to coming aboard the multipassenger transport vehicle. In some instances the communication nodes may be configured to download or provide access to the content or application program or operation functionality in response to a request initiated during a dormant or active operational mode by an on-board passenger via a user interface of the electronic media device.

Another possible system feature may include a communication node configured to download or provide access to the content or application program or operation functionality in response to confirmation of a cash or credit or debit payment made or authorized by an on-board passenger during a dormant or active operational mode via a user interface of the electronic media device.

A further possible system feature may enable multiple on-board electronic media devices 840, 840a, 840b which are related (e.g., have the same tour group passenger identifier code 859) to be inter-connected through their respective communication interfaces 870, 870a, 870b via local transport network 880. Such interconnection may enable in-transit bidirectional message exchanges, as well as in some instances further enabling a leadership passenger (e.g., Leo 860) to limit or otherwise control content (e.g. see down-load content filters 871, 872) available at other related on-board electronic devices 875a, 875b. It will be understood that such content filters 871, 872 and other management and/or control functions may in some embodiments be accomplished by transit vehicle staff 890 having access via transceiver 895 with the local transport network 880.

In some circumstances it may be desirable to have a dedicated local transport vehicle network 880 (e.g., wired) to provide a connective link between related electronic media devices. Another possible embodiment feature may provide a dedicated link between a communication node and certain electronic devices. In some instances an implementation may enable on-board electronic devices to periodically have access to a centralized transport network as well as to the Internet and other off-board networks.

As disclosed herein, an exemplary computerized electronic media system embodiment for a multipassenger transport vehicle includes an electronic media device independently powered by its respective battery module and configured for displaying alphanumeric content and/or visual content that is accessible in transit to an approved passenger; a storage component coupled to the electronic media; and a passenger identifier code correlated with individualized characteristics associated with the approved passenger, wherein the passenger identifier code determines a category or type of content or application program or operation functionality that is accessible in transit to the approved passenger. Related system aspects include a communication node configured to install or update or replace or delete such content or application program or operation functionality that is accessible in transit to the approved passenger.

Additional system embodiments may further include a controller module operatively connected to the electronic media device, wherein the control module is configured to provide a dormant operational mode during a first time period and an active operational mode during a second time period.

The controller module may be configured to correlate one or more of the following device metrics with the passenger identifier code: available usage time period(s), usage duration, free default content, content cost rate, operation capability expense, device mobility fee.

A system embodiment may also one or more of the following operation functionality components: removable memory, text messaging, local intercom, Internet link, external phone link, printer, camera, logon protection, security module. A further system component may include an individual battery module operatively connected with it respective electronic media device in a manner to supply independent electrical power when the multipassenger transport vehicle is in transit.

Additional system features may include a passenger identifier code is incorporated as part of a device logon protocol to determine the content or application program or operation functionality accessible in transit to the approved passenger. Related system aspects may provide a passenger identifier code incorporated on a transport ticket reservation or transport ticket purchase or transport boarding pass. Further system features may include a passenger identifier code having a specified personal identification number (PIN) associated with a particular approved passenger or group of passengers to determine the content or application program or operation functionality accessible in transit.

As further disclosed herein, a system embodiment may include an interactive display component operatively connected to the storage component and configured to enable access to the alphanumeric and/or visual content while the multipassenger transport vehicle is in transit. A further system feature may include a communication node configured to provide the content or application program or operation functionality in response to a request initiated by a user prior to or after coming aboard the multipassenger transport vehicle.

Additional system components may include a controller configured to implement a selection or modification or cancellation of the passenger identifier code or its related content in response to an authorization signal from one of the following types of communication node: on-board, off-board, portable, fixed location, wired, wireless. Another computerized system feature may include a security lockout scheme to prevent the approved passenger from modifying or cancelling the passenger identifier code.

A further system embodiment feature may provide a verification module operably linked to the communication node to determine and/or transmit notice of either a satisfactory or an improper matchup of content or application program or operation functionality correlated with the passenger identifier code. The verification module may also be configured to transmit an authorization code adapted to activate the electronic media device.

The system embodiments disclosed herein also provide a user interface that may include one or more of the following type of interaction techniques: touch screen, mouse device, keyboard, scroll control, pointer bar, audio input, voice command, video input, webcam gesture detection, webcam expression recognition. A further system component may include an interactive display that includes one of more of the following types of display techniques: electronic paper, low-power display, no-power image retention, light emitting diode (LED), conditional backlighting, active emission, liquid crystal display, projector.

Additional system features may include a local communication link between the electronic media device and a network terminal on the multipassenger transport vehicle, for transmitting stored or downloaded or pre-recorded or real-time informational messages pursuant to programmed control or initiated by transport vehicle staff. The local communication link may also be configured to enable bidirectional transmission of messages during an active operational mode with one or more other related electronic media devices correlated with their respective passenger identifier codes.

The system components may further include an input device for scanning credit authorization or receiving payment confirmation associated with the approved passenger or approved group of passengers, wherein the payment confirmation enables one or more of the following: activation of the electronic media device, travel reservation, overnight accommodation, in transit food or beverage, optional audio and/or video content.

Further system security components may include a physical connector between the electronic media device and the multipassenger transport vehicle, wherein the physical connector is adapted to keep the electronic media device in close proximity to an assigned place or space associated with the approved passenger. The physical connector may be adapted to be adjustable or detachable depending on the applicable security guidelines. In that regard the system may further include a proximity sensor incorporated on the electronic media device and configured to provide a limitation for such authorized mobile use based on an acceptable monitored location of the electronic media device on the multipassenger transport vehicle.

A further security system component may include a GPS unit configured to send a transmission indicating a geographic location of the electronic media device based on detection of its unauthorized removal from the multipassenger transport vehicle. Another system security aspect may include a controller configured to implement a removal or deletion of user-created or passenger-related information from the electronic media device upon arrival of the multipassenger transport vehicle at the individual passenger's final destination or upon termination of the individual passenger's approved access to the electronic media device. The controller may also be configured to implement modification or cancellation of certain content or application program or operation functionality in response to completion of the approved passenger's in transit travel.

Figure 34:
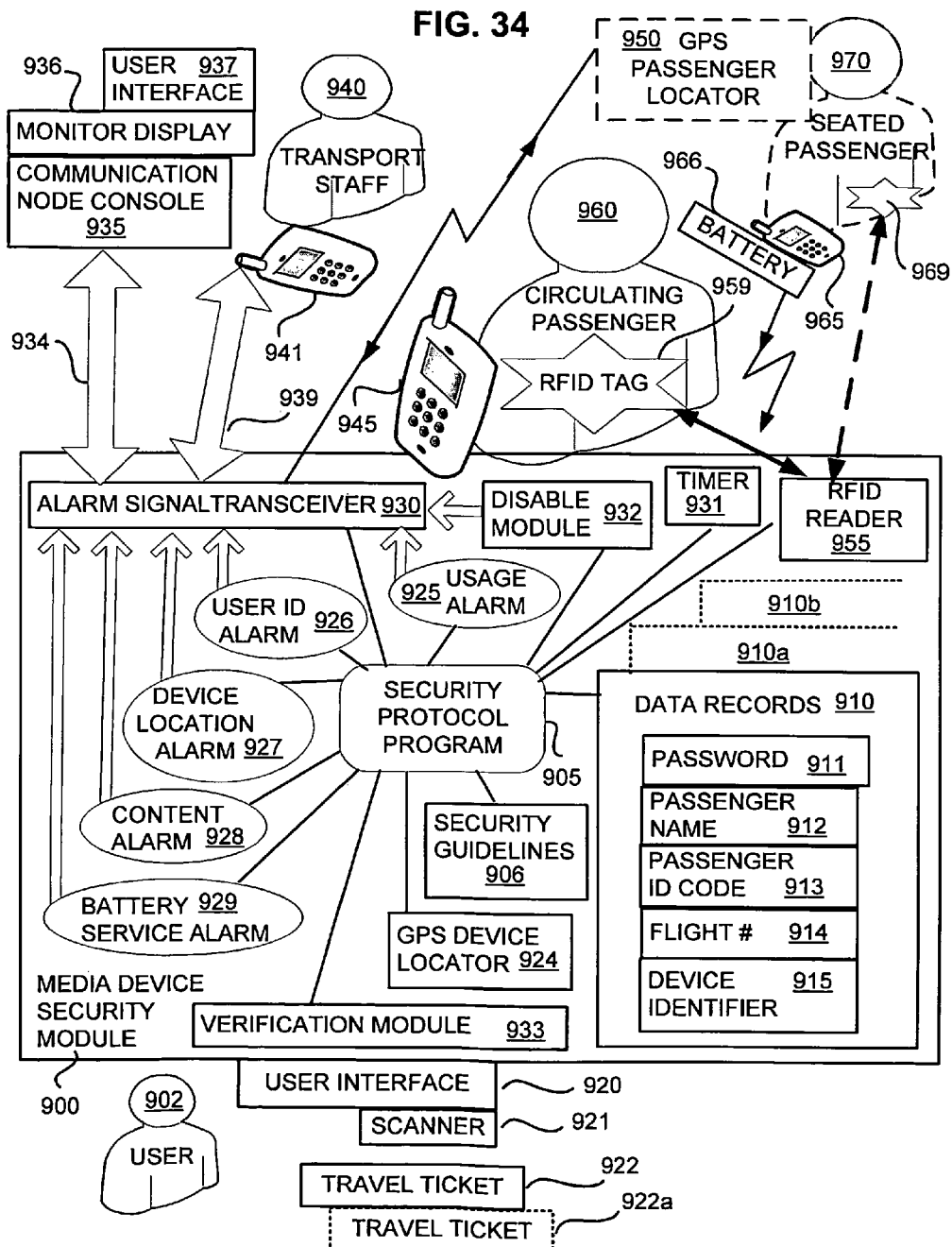
FIG. 34 is a schematic block diagram depicting exemplary aspects of a security scheme for the interactive media devices.

Referring to the schematic block diagram of FIG. 34, various aspects of an exemplary media device protection scheme may be incorporated in a media device security module 900 having passenger-related data records 910, user interface 920, scanner 921, and a security protocol program 905. Access may be provided to a user 902 via user interface 920, as well as via the scanner 921 that may enable confirming a situs identifier and/or passenger ID code on a passenger travel ticket 922. In some embodiments the media device security module 900 may be operatively coupled with or incorporated as part of electronic media device 945 that is approved for use by circulating passenger 960. The data records 910 may include password 911, passenger name 912, passenger ID code 913, flight number 914, and device identifier 915.

The exemplary security protocol program 905 may be implemented in circuitry and/or computer-readable media to provide protection against unauthorized activities pursuant to security guidelines 906 as well as helping prevent removal of the electronic media device 945 from one or more of its designated on-site locations in a multipassenger transport vehicle. A GPS device locator 924 incorporated with the electronic media device 945 can provide geographic coordinates indicating a present device location, and a timer may help monitor appropriate timetable restrictions (see FIGS. 3, 47-48).

In some instances it may be desirable to provide a radio frequency identification (RFID) reader 955 to monitor a current circulating location of passenger 960 as indicated for example by an on-person RFID tag 959. It will be understood that some security embodiments may include a media security module 900 that is centrally located and/or separated from one or more associated passengers (e.g., seated passenger 970) and/or one or more electronic media devices (e.g. 965). Accordingly additional passenger/device data records 910*a*, 910*b* etc. may be provided to be accessible to the media device security module 900. Similarly such a central or separately located media device security module 900 may be configured in a manner for enabling additional passenger travel tickets (e.g., 922*a*) to be processed by scanner 921 during pre-boarding as well as during an onboard travel period.

The power status of a remotely located device battery 966 may be monitored by the media device security module 900. Also a monitored location of a remotely seated passenger 970 subject to a somewhat fixed position for usage of their assigned electronic media device 965 may be detected by RFID reader 955 based on a response signal from on-person RFID tag 969. Of course other location detection techniques for a designated passenger and/or for an assigned electronic media device may be provided (e.g., GPS passenger locator 950) in order to assure compliance with applicable provisions of the security guidelines 906. It will be understood that the illustrated location detection components are provided by way of example and are not intended to be limiting.

Various types of alarm outputs may be generated in accordance with security guidelines 906, including usage alarm 925 (e.g., payment declined), user ID alarm 926 (e.g., improper user matchup), device location alarm 927 (e.g., unauthorized device location), content alarm 928 (e.g., content rejected), and battery service alarm 929 (battery low or dead) which may be linked to an alarm signal transceiver 930 for appropriate distribution.

A further possible alarm output may be generated by disable module 932 which is configured for deleting or corrupting or rendering non-functional or illegible certain aspects of content accessible in an interactive display component, or certain aspects of the application programs or informational data maintained in the storage component, responsive to an event indicating that the electronic media device has been subjected to tampering or unauthorized usage or unauthorized access.

Another possible security component may include a verification module 933 which is configured to determine a satisfactory or improper matchup of a category or type of informational content that is correlated with an assigned passenger place or space in the multipassenger transport vehicle, or that is correlated with a designated passenger ID code.

Bidirectional data and message transmission may be enabled via wired or wireless link 934 between alarm signal transceiver 930 and a communication node console 935 that includes a monitor display 936 and user interface 937 accessible to transport staff 940. Also in some instances transport staff may prefer a more direct communication link 939 between their smart phone 941 and alarm signal transceiver 930. It will be understood that communication signals received from alarm signal transceiver 930 may be processed by circuitry and/or program algorithms without need for direct involvement by transport staff, depending on the circumstances.

As disclosed herein, an exemplary computerized electronic media system embodiment for a multipassenger transport vehicle includes an electronic media device independently powered by its respective battery module and configured for displaying alphanumeric content and/or visual content that is accessible in transit to an approved passenger; and a storage component coupled to the electronic media and configured to maintain in memory certain application programs and/or informational data. Further security components may include an external communication node having a controller module adapted to determine various categories or type of content that are transferred to the storage component for access by the approved passenger, wherein such categories or type of content are correlated with a passenger identifier code and/or a situs identifier associated with the electronic media device. Further system features may include a security component associated with each electronic media device to provide protection against unauthorized on-board or off-board activity regarding the electronic media device or regarding the storage component.

Other system features may include a controller configured to implement a selection or monitoring or modification or cancellation of the aforesaid content in response to an authorization signal from one of the following types of external communication node: on-board, off-board, portable, fixed location, wired, wireless. Additional system features may include a security lockout scheme configured to cause the electronic media device to discontinue some or all operational functions based on detection of its unauthorized removal from a specified on-board site.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Figure 35:
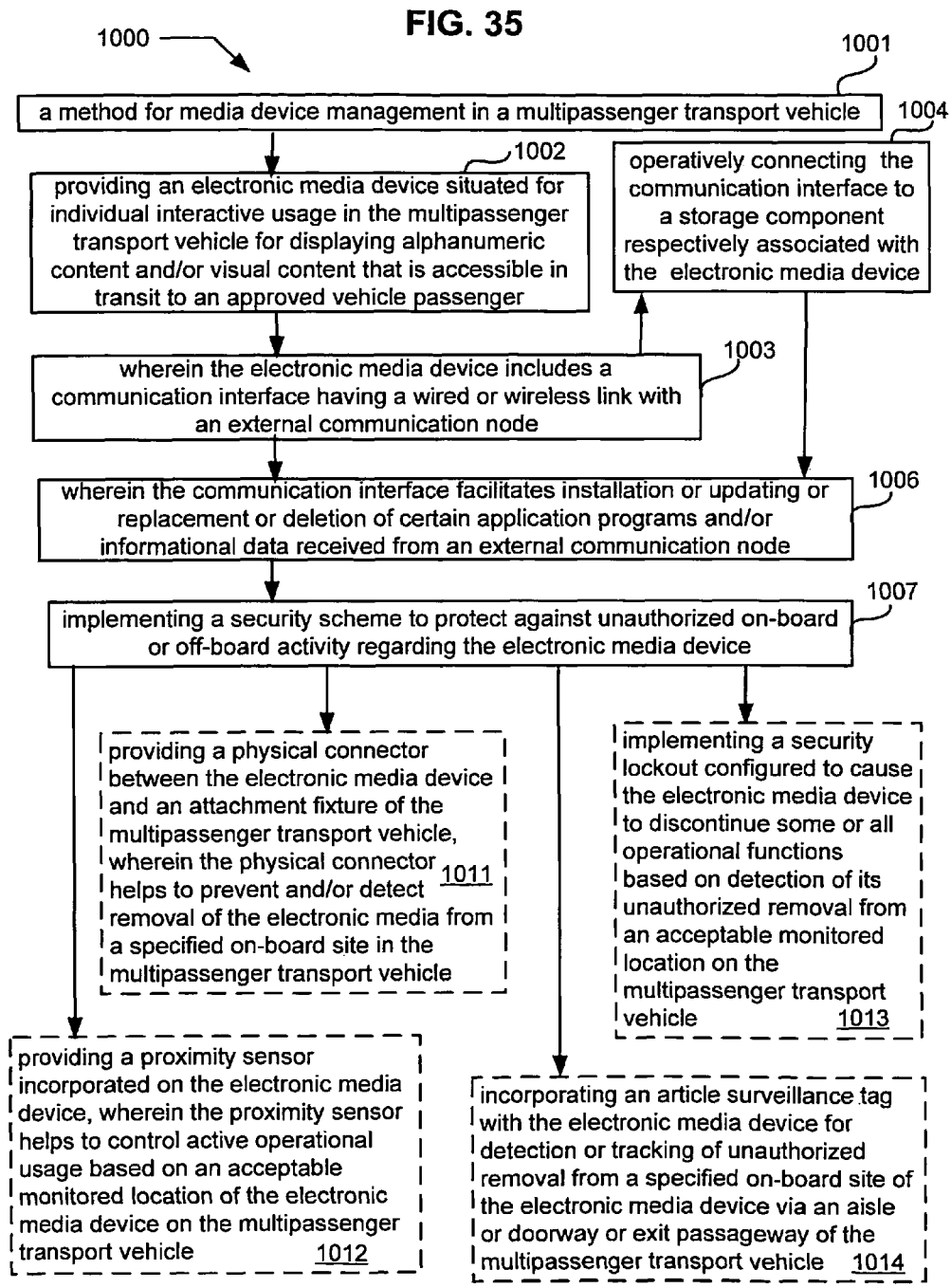
FIG. 35 is a further higher level flow chart that illustrates exemplary security process aspects for the interactive media devices.

The high level flow chart of FIG. 35 depicts various exemplary method features 1000 for media device management in a multipassenger transport vehicle (block 1001), including providing an electronic media device situated for individual interactive usage in the multipassenger transport vehicle for displaying alphanumeric content and/or visual content that is accessible in transit to an approved vehicle passenger (block 1002), wherein the electronic media device includes a communication interface having a wired or wireless link with an external communication node (block 1003). Additional possible features include operatively connecting the communication interface to a storage component respectively associated with the electronic media device (block 1004), wherein the communication interface facilitates installation or updating or replacement or deletion of certain application programs and/or informational data received from an external communication node (block 1006); and implementing a security scheme to protect against unauthorized on-board or off-board activity regarding the electronic media device (block 1007).

Other possible security enhancements include providing a physical connector between the electronic media device and an attachment fixture of the multipassenger transport vehicle, wherein the physical connector helps to prevent and/or detect removal of the electronic media from a specified on-board site in the multipassenger transport vehicle (block 1011). A further exemplary method features may include providing a proximity sensor incorporated on the electronic media device, wherein the proximity sensor helps to control active operational usage based on an acceptable monitored location of the electronic media device on the multipassenger transport vehicle (block 1012).

Some embodiment security aspects may include implementing a security lockout configured to cause the electronic media device to discontinue some or all operational functions based on detection of its unauthorized removal from an acceptable monitored location on the multipassenger transport vehicle (block 1013). Additional security possibilities include incorporating an article surveillance tag with the electronic media device for detection or tracking of unauthorized removal from a specified on-board site of the electronic media device via an aisle or doorway or exit passageway of the multipassenger transport vehicle (block 1014).

Figure 36:
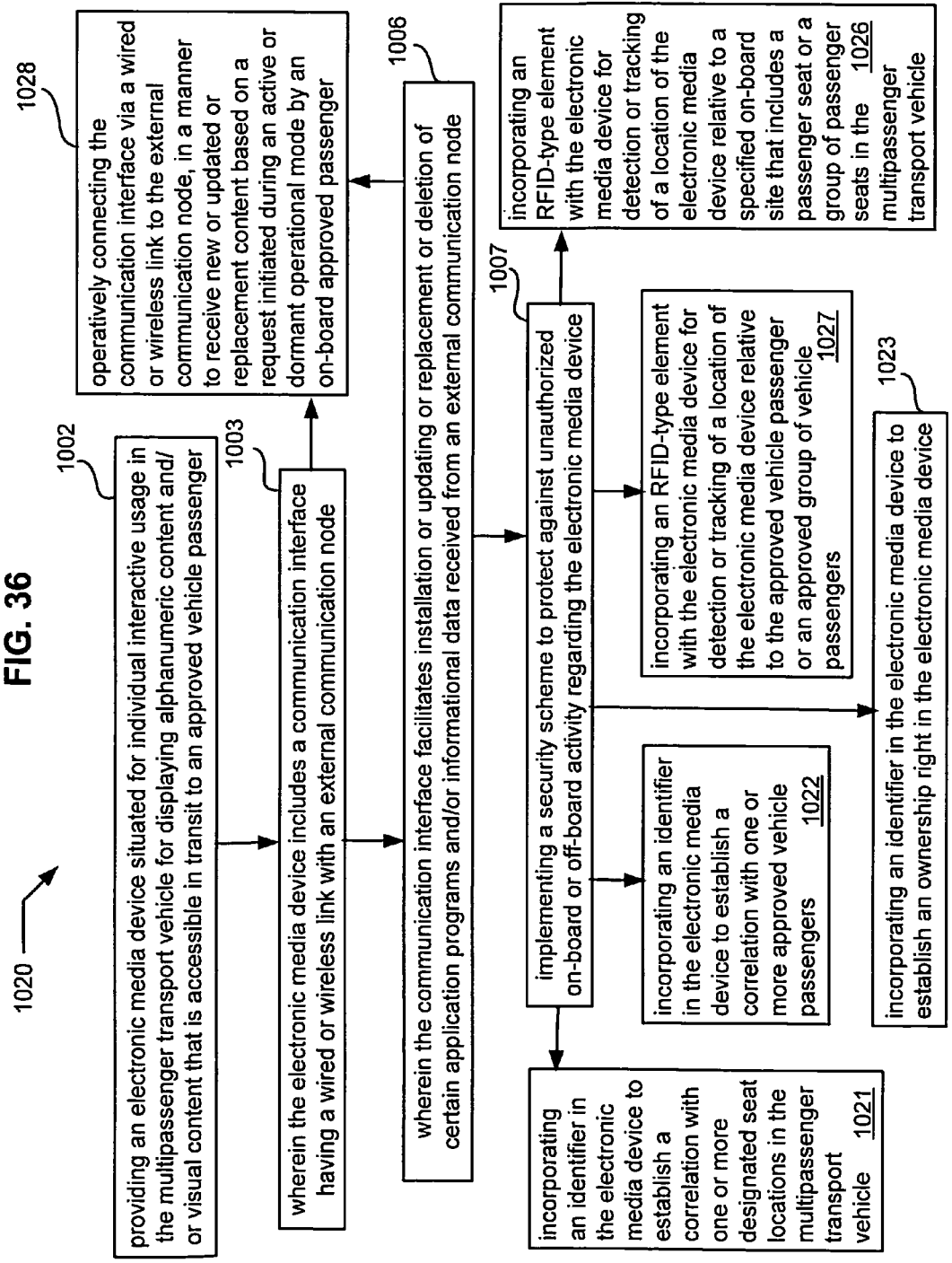
FIGS. 36-44 are detailed flow charts illustrating additional exemplary process aspects for protection against unauthorized activity regarding the interactive media devices.

Referring to the illustrated process features 1020 shown in FIG. 36, an exemplary method may include previously described components 1002, 1003, 1006, 10007 along with incorporating an identifier in the electronic media device to establish a correlation with one or more designated seat locations in the multipassenger transport vehicle (block 1021). In some instances a method feature may include incorporating an identifier in the electronic media device to establish a correlation with one or more approved vehicle passengers (block 1022). As a further example, an embodiment may include incorporating an identifier in the electronic media device to establish an ownership right in the electronic media device (block 1023).

Additional security enhancements may include incorporating an RFID-type element with the electronic media device for detection or tracking of a location of the electronic media device relative to a specified on-board site that includes a passenger seat or a group of passenger seats in the multipassenger transport vehicle (block 1026). Other security possibilities may include incorporating an RFID-type element with the electronic media device for detection or tracking of a location of the electronic media device relative to the approved vehicle passenger or an approved group of vehicle passengers (block 1027).

Another possibility shown in FIG. 36 includes operatively connecting the communication interface via a wired or wireless link to the external communication node, in a manner to receive new or updated or replacement content based on a request initiated during an active or dormant operational mode by an on-board approved passenger (block 1028).

Figure 37:
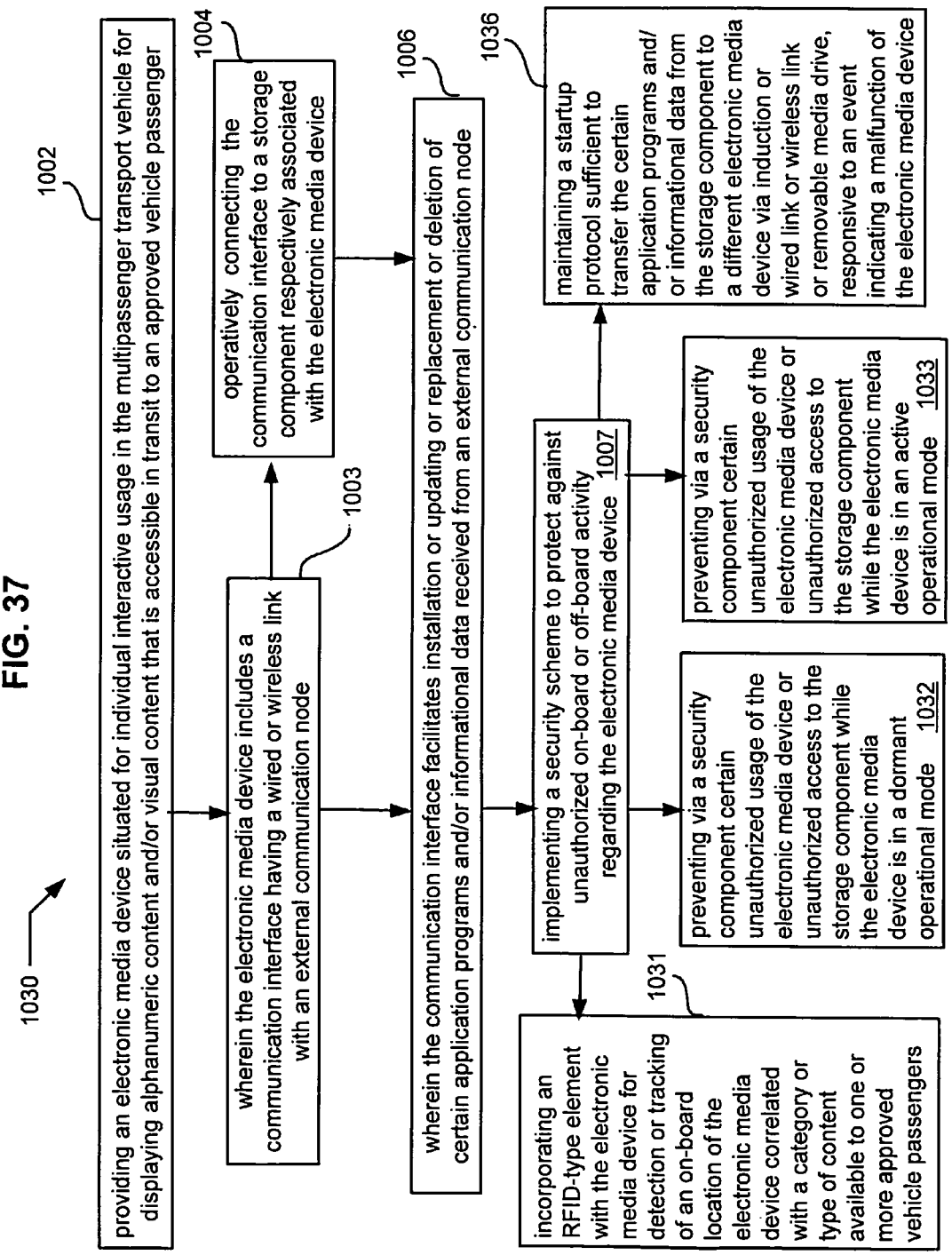

Various additional process aspects 1030 are illustrated in FIG. 37, including previously described elements 1002, 1003, 1004, 1006, 1007 along with possible security features that include incorporating an RFID-type element with the electronic media device for detection or tracking of an on-board location of the electronic media device correlated with a category or type of content available to one or more approved vehicle passengers (block 1031). Other exemplary embodiments may include preventing via a security component certain unauthorized usage of the electronic media device or unauthorized access to the storage component while the electronic media device is in a dormant operational mode (block 1032), or in some instances while the electronic media device is in an active operational mode (block 1033).

A further possible process aspect includes maintaining a startup protocol sufficient to transfer the certain application programs and/or informational data from the storage component to a different electronic media device via induction or wired link or wireless link or removable media drive, responsive to an event indicating a malfunction of the electronic media device (block 1036).

Figure 38:
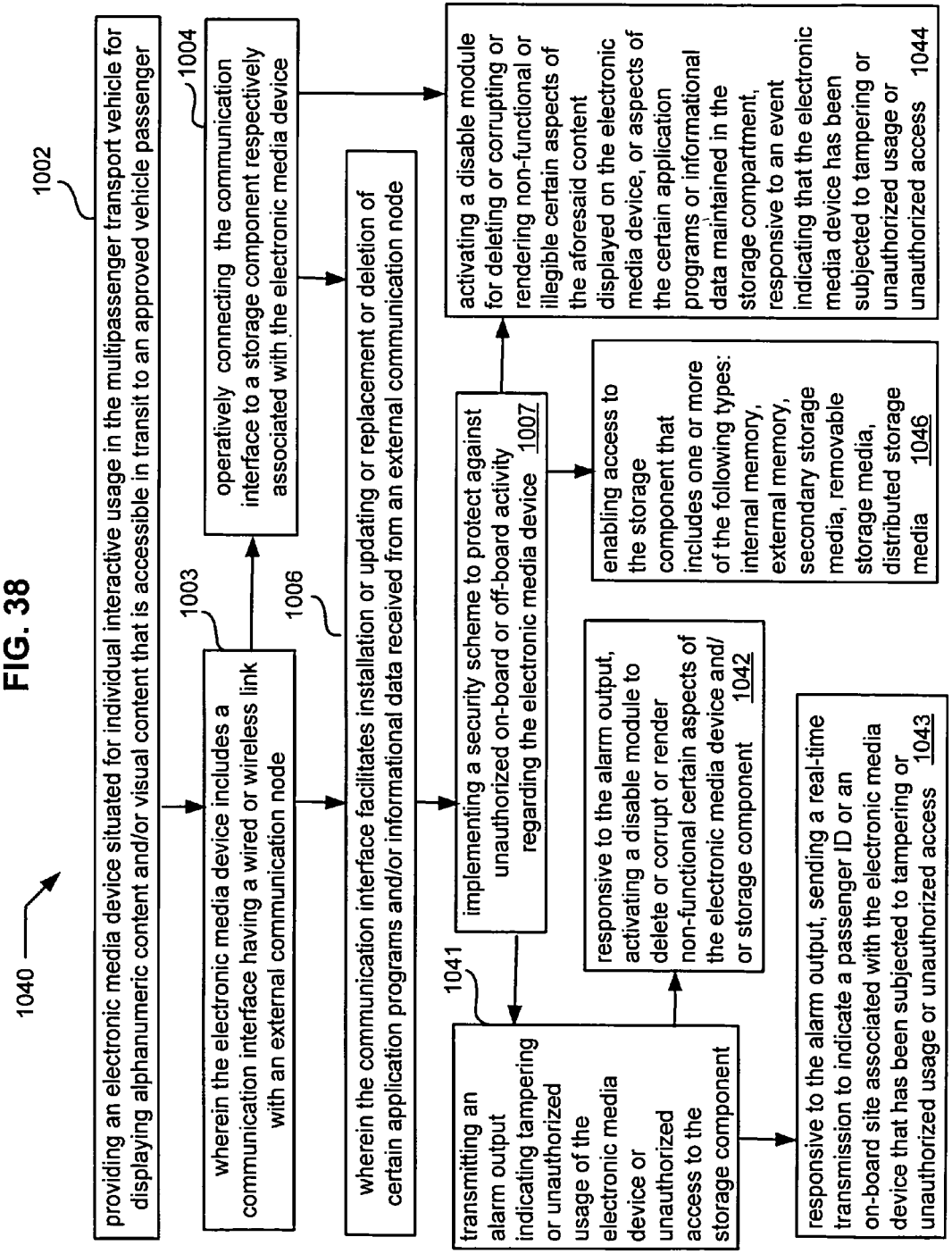

The detailed flow chart of FIG. 38 shows additional exemplary aspects 1040 that include previously described elements 1002, 1003, 1004, 1006, 1007 in combination with transmitting an alarm output indicating tampering or unauthorized usage of the electronic media device or unauthorized access to the storage component (block 1041). Related security aspects may include responsive to the alarm output, activating a disable module to delete or corrupt or render non-functional certain aspects of the electronic media device and/ or storage component (block 1042). Another example of a possible security aspect includes responsive to the alarm output, sending a real-time transmission to indicate a passenger ID or an on-board site associated with the electronic media device that has been subjected to tampering or unauthorized usage or unauthorized access (block 1043).

In some instances an exemplary embodiment may include activating a disable module for deleting or corrupting or rendering non-functional or illegible certain aspects of the aforesaid content displayed on the electronic media device, or aspects of the certain application programs or informational data maintained in the storage component, responsive to an event indicating that the electronic media device has been subjected to tampering or unauthorized usage or unauthorized access (block 1044). Other examples may include enabling access to the storage component that includes one or more of the following types: internal memory, external memory, secondary storage media, removable storage media, distributed storage media (block 1046).

Figure 39:
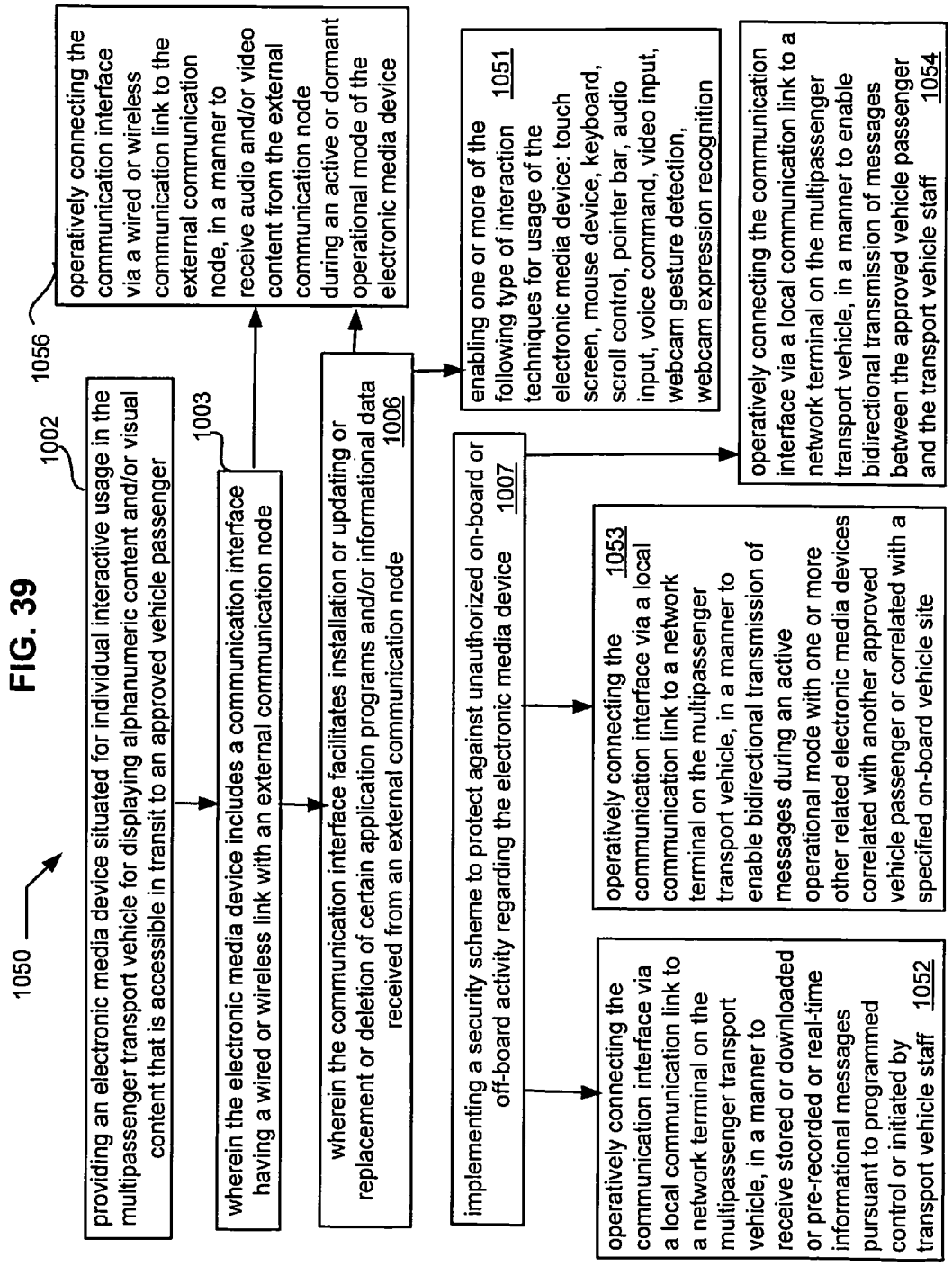

Referring to the process examples 1050 shown in FIG. 39, the illustrated features include previously described components 1002, 1003, 1006, 1007 in combination with enabling one or more of the following type of interaction techniques for usage of the electronic media device: touch screen, mouse device, keyboard, scroll control, pointer bar, audio input, voice command, video input, webcam gesture detection, webcam expression recognition (block 1051). Other illustrated aspects include operatively connecting the communication interface via a local communication link to a network terminal on the multipassenger transport vehicle, in a manner to receive stored or downloaded or pre-recorded or real-time informational messages pursuant to programmed control or initiated by transport vehicle staff (block 1052).

Further process examples include operatively connecting the communication interface via a local communication link to a network terminal on the multipassenger transport vehicle, in a manner to enable bidirectional transmission of messages during an active operational mode with one or more other related electronic media devices correlated with another approved vehicle passenger or correlated with a specified on-board vehicle site (block 1053). In some instances an embodiment may include operatively connecting the communication interface via a local communication link to a network terminal on the multipassenger transport vehicle, in a manner to enable bidirectional transmission of messages between the approved vehicle passenger and the transport vehicle staff (block 1054).

Also depicted in FIG. 39 is another possibility that includes operatively connecting the communication interface via a wired or wireless communication link to the external communication node, in a manner to receive audio and/or video content from the external communication node during an active or dormant operational mode of the electronic media device (block 1056).

Figure 40:
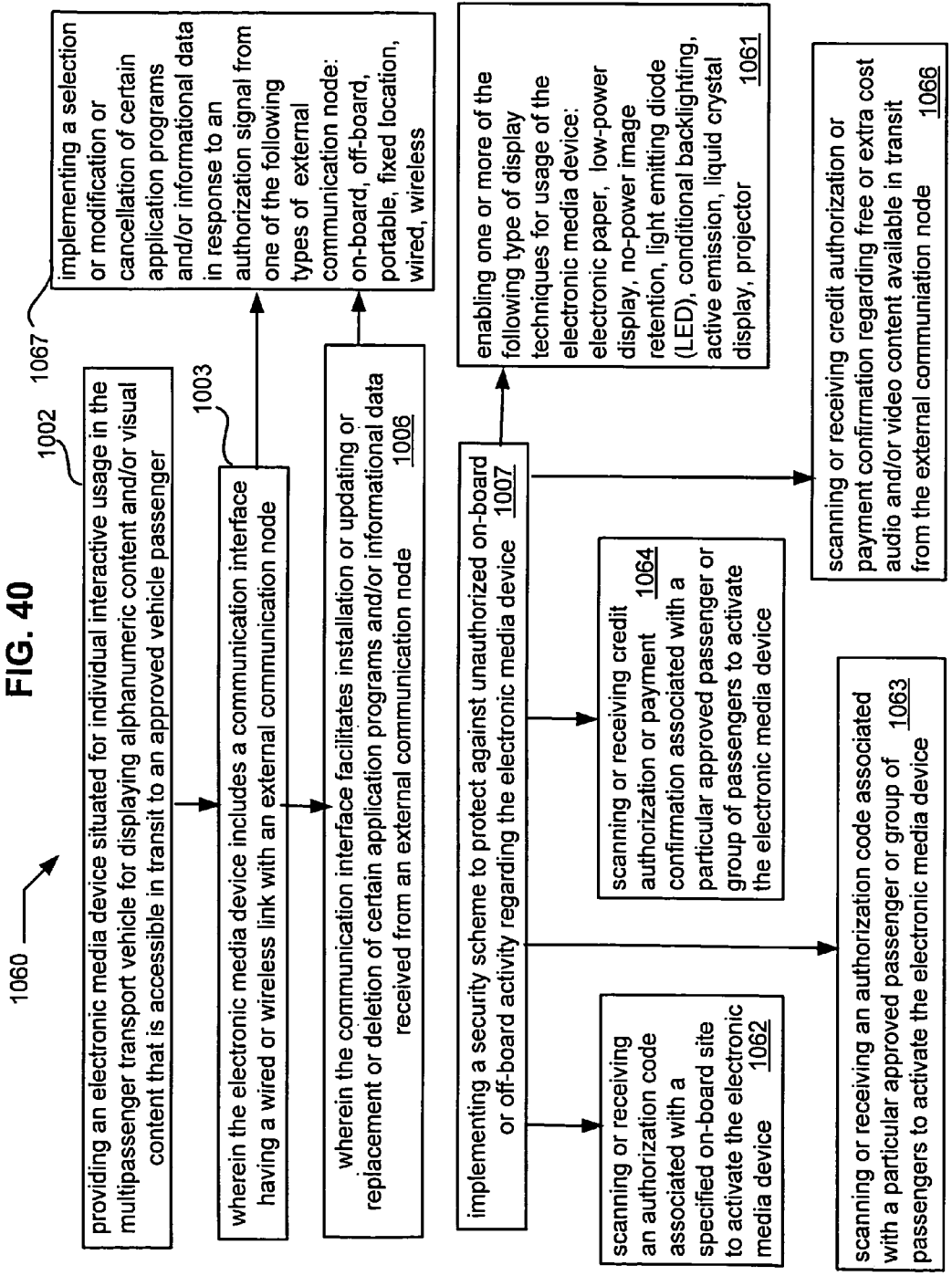

The detailed flow chart of FIG. 40 illustrates various exemplary process aspects 1060 including previously described features 1002, 1003, 1006, 1007 in combination with enabling one or more of the following type of display techniques for usage of the electronic media device: electronic paper, low-power display, no-power image retention, light emitting diode (LED), conditional backlighting, active emission, liquid crystal display, projector (block 1061). Other process possibilities include scanning or receiving an authorization code associated with a specified on-board site to activate the electronic media device (block 1062), or in some instances wherein such authorization code is associated with a particular approved passenger or group of passengers to activate the electronic media device (block 1063).

Further process aspects may include scanning or receiving credit authorization or payment confirmation associated with a particular approved passenger or group of passengers to activate the electronic media device (block 1064). Further process examples include scanning or receiving credit authorization or payment confirmation regarding free or extra cost audio and/or video content available in transit from the external communication node (block 1066). Additional possibilities may include implementing a selection or modification or cancellation of certain application programs and/or informational data in response to an authorization signal from one of the following types of external communication node: on-board, off-board, portable, fixed location, wired, wireless (block 1067).

Figure 41:
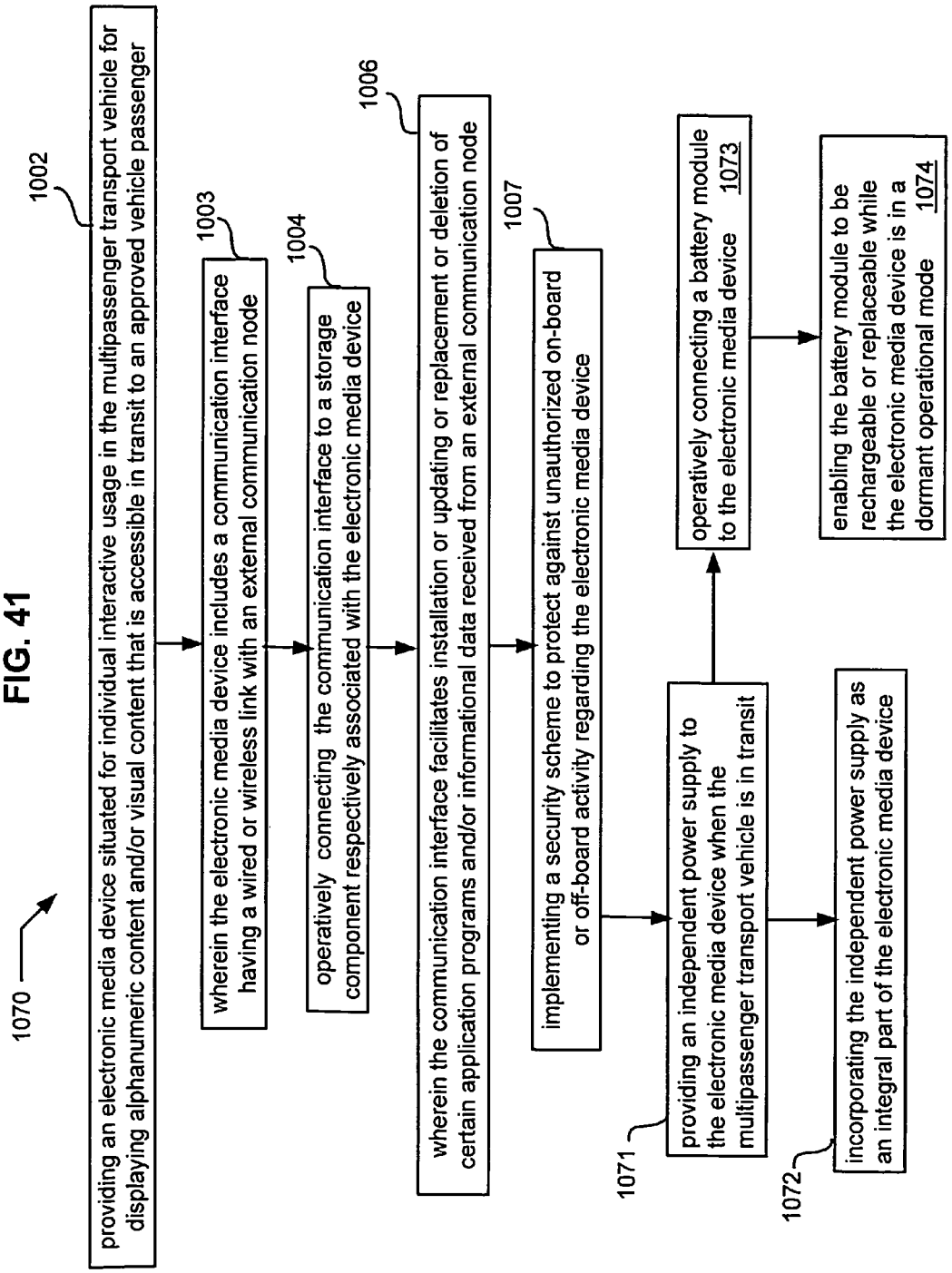

Referring to the detailed exemplary features 1070 depicted in FIG. 41, an embodiment may include previously described aspects 1002, 1003, 1004, 1006, 1007 as well as additional aspects such as providing an independent power supply to the electronic media device when the multipassenger transport vehicle is in transit (block 1071), and in some instances incorporating the independent power supply as an integral part of the electronic media device (block 1072). Other related process examples include operatively connecting a battery module to the electronic media device (block 1073), and enabling the battery module to be rechargeable or replaceable while the electronic media device is in a dormant operational mode (block 1074).

Figure 42:
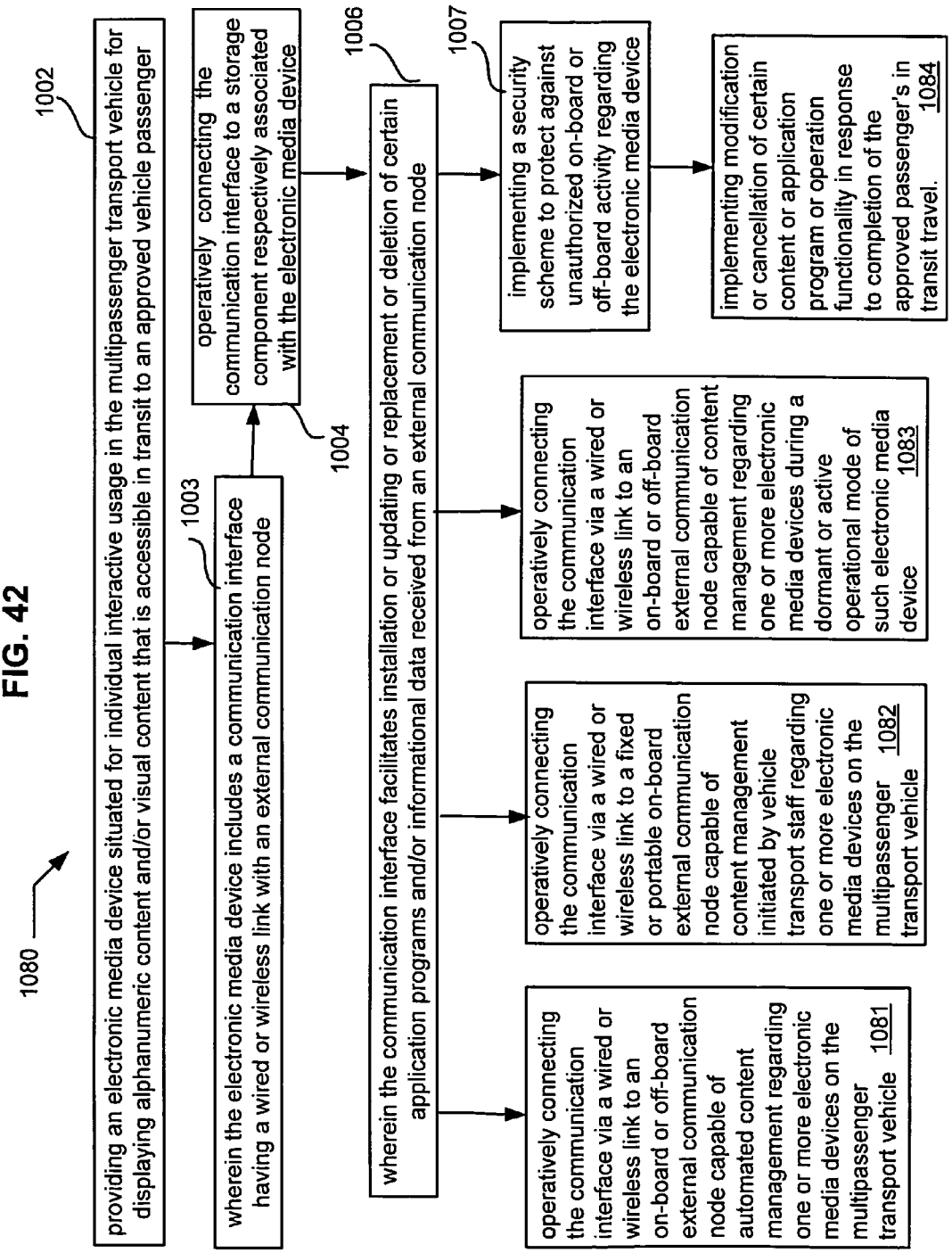

The detailed flow chart of FIG. 42 illustrates various process features 1080 including previous described process components 1002, 1003, 1004, 1006, 1007 and other possibilities such as operatively connecting the communication interface via a wired or wireless link to an on-board or off-board external communication node capable of automated content management regarding one or more electronic media devices on the multipassenger transport vehicle (block 1081). Another possible aspect includes operatively connecting the communication interface via a wired or wireless link to a fixed or portable on-board external communication node capable of content management initiated by vehicle transport staff regarding one or more electronic media devices on the multipassenger transport vehicle (block 1082). Some implementations may further includes operatively connecting the communication interface via a wired or wireless link to an on-board or off-board external communication node capable of content management regarding one or more electronic media devices during a dormant or active operational mode of such electronic media device (block 1083).

In some instances a process aspect may include implementing modification or cancellation of certain content or application program or operation functionality in response to completion of the approved passenger's in transit travel (block 1084).

Figure 43:
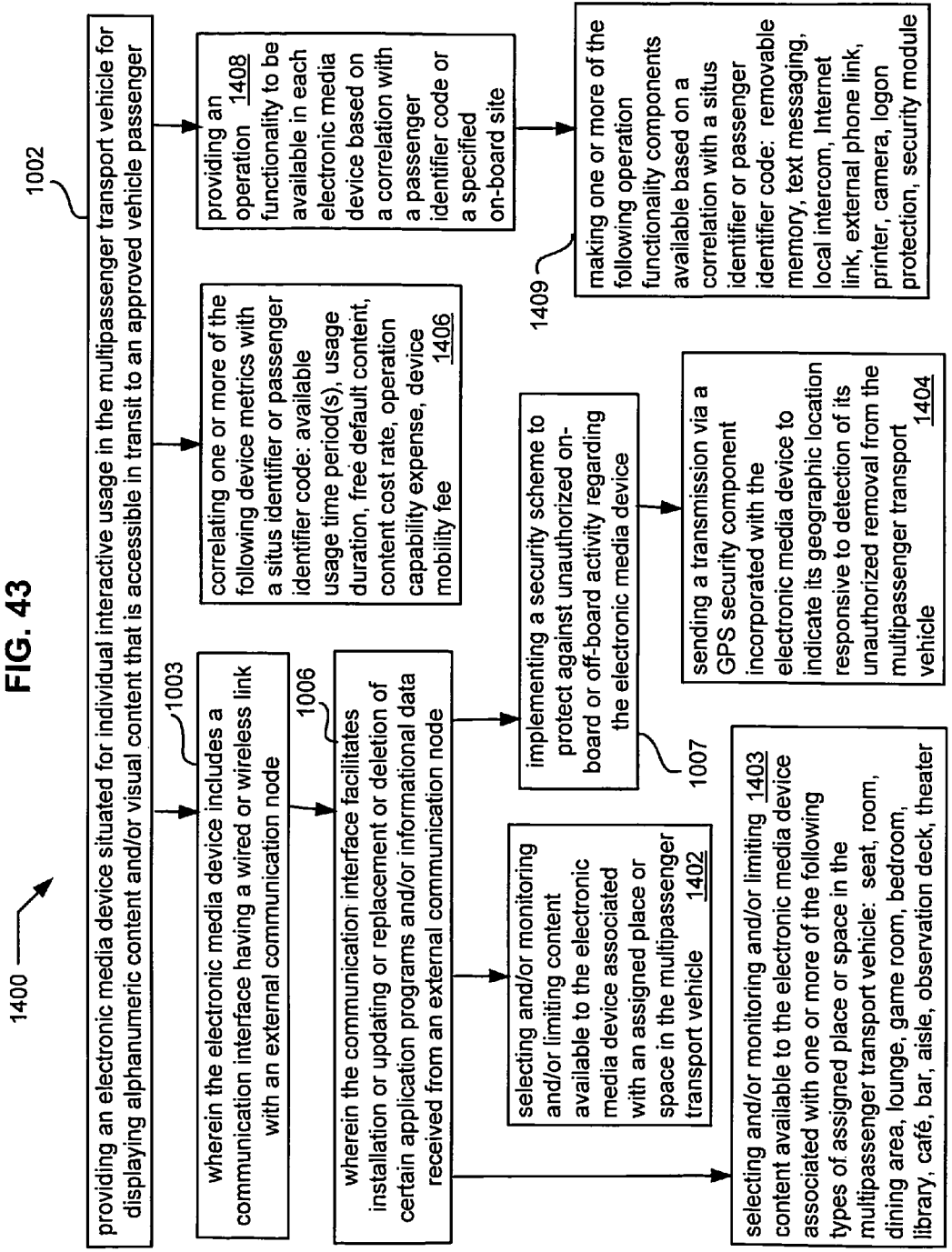

Referring to the flow chart of FIG. 43, various exemplary process components 1400 are illustrated including previously described aspects 1002, 1003, 1006, 1007 as well as selecting and/or monitoring and/or limiting content available to the electronic media device associated with an assigned place or space in the multipassenger transport vehicle (block 1402). Other possible related aspects include selecting and/or monitoring and/or limiting content available to the electronic media device associated with one or more of the following types of assigned place or space in the multipassenger transport vehicle: seat, room, dining area, lounge, game room, bedroom, library, café, bar, aisle, observation deck, theater (block 1403).

Additional exemplary process features include correlating one or more of the following device metrics with a situs identifier or passenger identifier code: available usage time period(s), usage duration, free default content, content cost rate, operation capability expense, device mobility fee (1406). A further possible process feature includes sending a transmission via a GPS security component incorporated with the electronic media device to indicate its geographic location responsive to detection of its unauthorized removal from the multipassenger transport vehicle (block 1404).

Other process embodiment features depicted in FIG. 43 include providing an operation functionality to be available in each electronic media device based on a correlation with a passenger identifier code or a specified on-board site (block 1408). Related exemplary process features include making one or more of the following operation functionality components available based on a correlation with a situs identifier or passenger identifier code: removable memory, text messaging, local intercom, Internet link, external phone link, printer, camera, logon protection, security module (block 1409).

Figure 44:
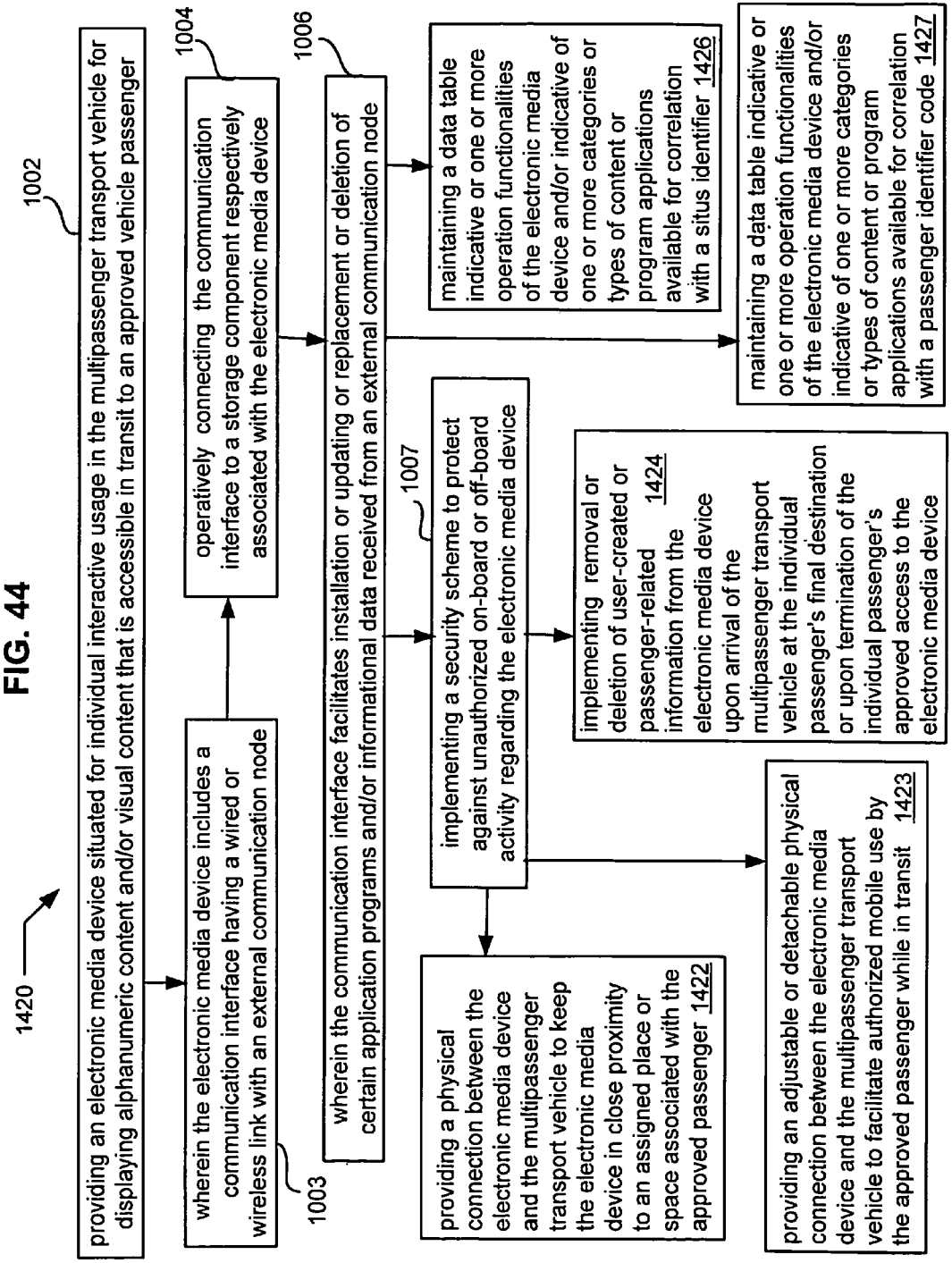

The illustrated process component examples 1420 shown in the flow chart of FIG. 44 includes previously described aspects 1002, 1003, 1004, 1006, 1007 as well as various possible security features including providing a physical connection between the electronic media device and the multipassenger transport vehicle to keep the electronic media device in close proximity to an assigned place or space associated with the approved passenger (block 1422). A related aspect may include providing an adjustable or detachable physical connection between the electronic media device and the multipassenger transport vehicle to facilitate authorized mobile use by the approved passenger while in transit (block 1423).

Other possible security features include implementing removal or deletion of user-created or passenger-related information from the electronic media device upon arrival of the multipassenger transport vehicle at the individual passenger's final destination or upon termination of the individual passenger's approved access to the electronic media device (block 1424). Additional illustrated process components may be helpful in some embodiments, including maintaining a data table indicative or one or more operation functionalities of the electronic media device and/or indicative of one or more categories or types of content or program applications available for correlation with a situs identifier (block 1426), or in some instances wherein such indicated data table items are available for correlation with a passenger identifier code (block 1427).

Figure 45:
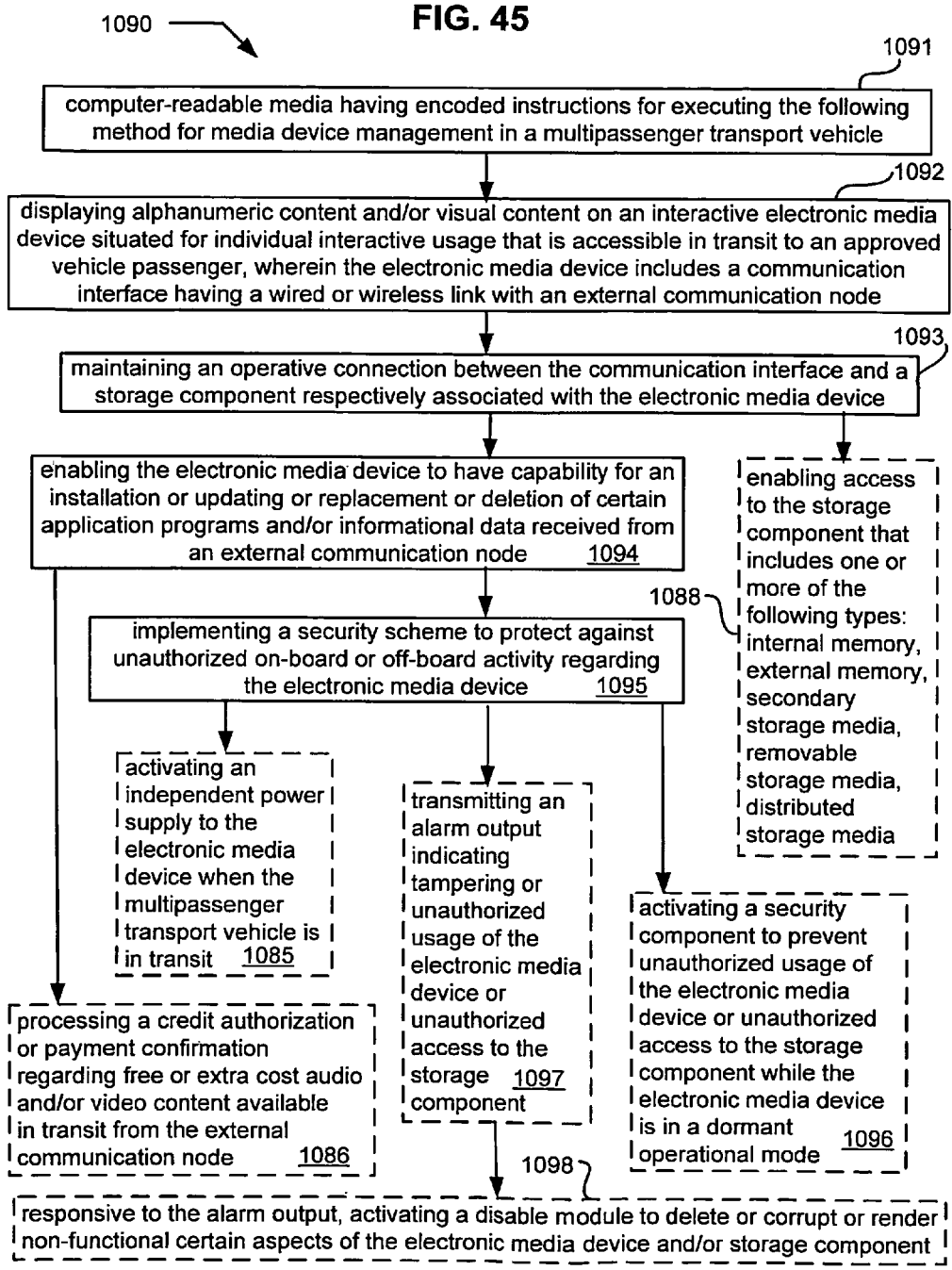
FIG. 45 is diagrammatic flow chart for other possible computer-readable media embodiment features.

FIG. 45 is a diagrammatic flow chart exemplified in an article of manufacture embodiment 1090 wherein computer readable media have encoded instructions for executing a method for media device management in a multipassenger transport vehicle (block 1091). A possible exemplary method may include displaying alphanumeric content and/or visual content on an interactive electronic media device situated for individual interactive usage that is accessible in transit to an approved vehicle passenger, wherein the electronic media device includes a communication interface having a wired or wireless link with an external communication node (block 1092); and maintaining an operative connection between the communication interface and a storage component respectively associated with the electronic media device (block 1093).

Additional programmed method features may include enabling the electronic media device to have capability for an installation or updating or replacement or deletion of certain application programs and/or informational data received from an external communication node (block 1094), and implementing a security scheme to protect against unauthorized on-board or off-board activity regarding the electronic media device (block 1095).

Other possible aspects of the security scheme may include activating a security component to prevent unauthorized usage of the electronic media device or unauthorized access to the storage component while the electronic media device is in a dormant operational mode (block 1096). Some security enhancements may further include transmitting an alarm output indicating tampering or unauthorized usage of the electronic media device or unauthorized access to the storage component (block 1097); and responsive to the alarm output, activating a disable module to delete or corrupt or render non-functional certain aspects of the electronic media device and/or storage component (block 1098).

Additional illustrated programmed method features include activating an independent power supply to the electronic media device when the multipassenger transport vehicle is in transit (block 1085). Another possible programmed method feature includes processing a credit authorization or payment confirmation regarding free or extra cost audio and/or video content available in transit from the external communication node (block 1086). A further programmed method enhancement may include enabling access to the storage component that includes one or more of the following types: internal memory, external memory, secondary storage media, removable storage media, distributed storage media (block 1088).

It will be understood that various other individual method operations depicted in the flow charts of FIGS. 35-44 can be incorporated as encoded instructions in computer readable media in order to obtain further benefits and advantages.

Figure 46:
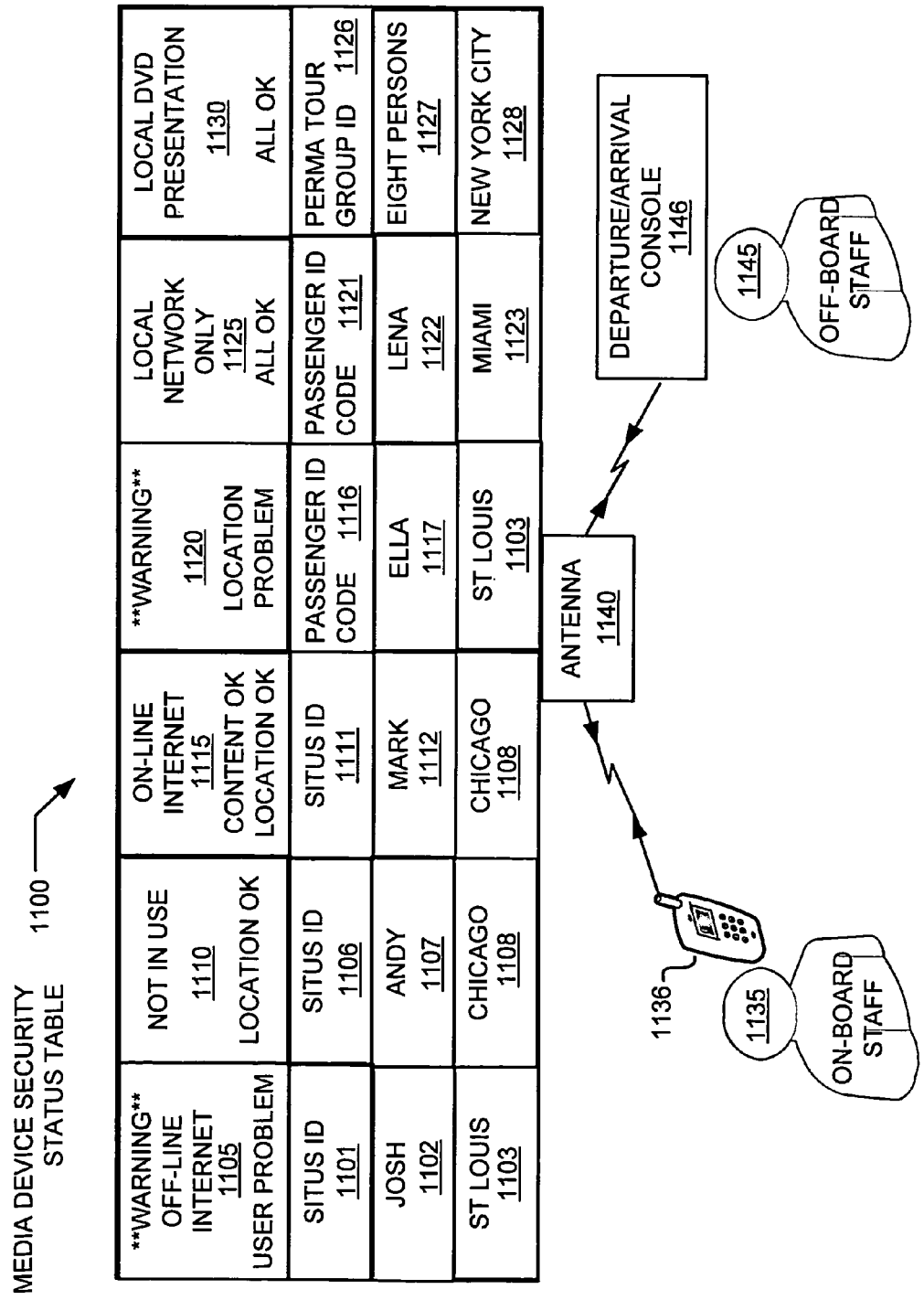
FIG. 46 shows a representative status table regarding media device security aspects.

The schematic block diagram of FIG. 46 illustrates an exemplary embodiment of a current version of an exemplary media device security status table 1100 regarding various interactive electronic media devices for a multipassenger transit vehicle. Three of the exemplary electronic media devices are referenced by an on-board assigned location: situs ID 1101, situs ID 1106, situs ID 1111. Another three of the exemplary electronic media devices are referenced by a specified user designation: passenger ID code 116, passenger ID code 1121, passenger ID code 1126.

The electronic media device referenced by situs ID 1101 is assigned to passenger Josh 1102 who is traveling to St. Louis 1103. The current output for data table 1100 indicates the following security status 1105: device is off-line; device has Internet operation capability; user matchup problem—alarm warning.

The electronic media device referenced by situs ID 1106 is assigned to passenger Andy 1107 who is traveling to Chicago 1108. The current output for data table 1100 indicates the following security status 1110: device is not in use; device location is okay.

The electronic media device referenced by situs ID 1111 is assigned to passenger Mark 1112 who is traveling to Chicago 1108. The current output for data table 1100 indicates the following security status 1115: device is on-line, device has Internet capability, content matchup is okay, device location is okay.

The electronic media device referenced by passenger ID code 1116 is assigned to passenger Ella who is traveling to St. Louis 1103. The current output for data table 1100 indicates the following security status 1120: device location problem—alarm warning.

The electronic media device referenced by passenger ID code 1121 is assigned to passenger Lena who is traveling to Miami 1123. The current output for data table 1100 indicates the following security status 1125: device has localized network capability only, all security status fields are okay.

The electronic media device referenced by passenger ID code 1126 is assigned to eight group passengers 1127 who are traveling to New York City 1128. The current output for data table 1100 indicates the following security status 1130: device capability enables local DVD presentation, all security status fields are okay.

The embodiment features illustrated in FIG. 46 provide a wireless link by on-board staff 1135 via smart phone 1136 to the various data fields in media device security status table 1100 for purposes of monitoring and/or initiating responsive action. Other embodiment features may provide another wireless link by off-board staff 1145 via departure/arrival console 1146 to the various data fields in media device security status table 1100 for purposes of monitoring and/or initiating responsive action. It will be further understood that in some instances a passenger user may have access via their assigned electronic media device to the various data fields in media device security status table which are applicable to their assigned device. Another possible aspect may enable a leadership passenger to have supervisory access to the various data fields applicable to other media devices for passengers in their traveling group.

Figure 47:
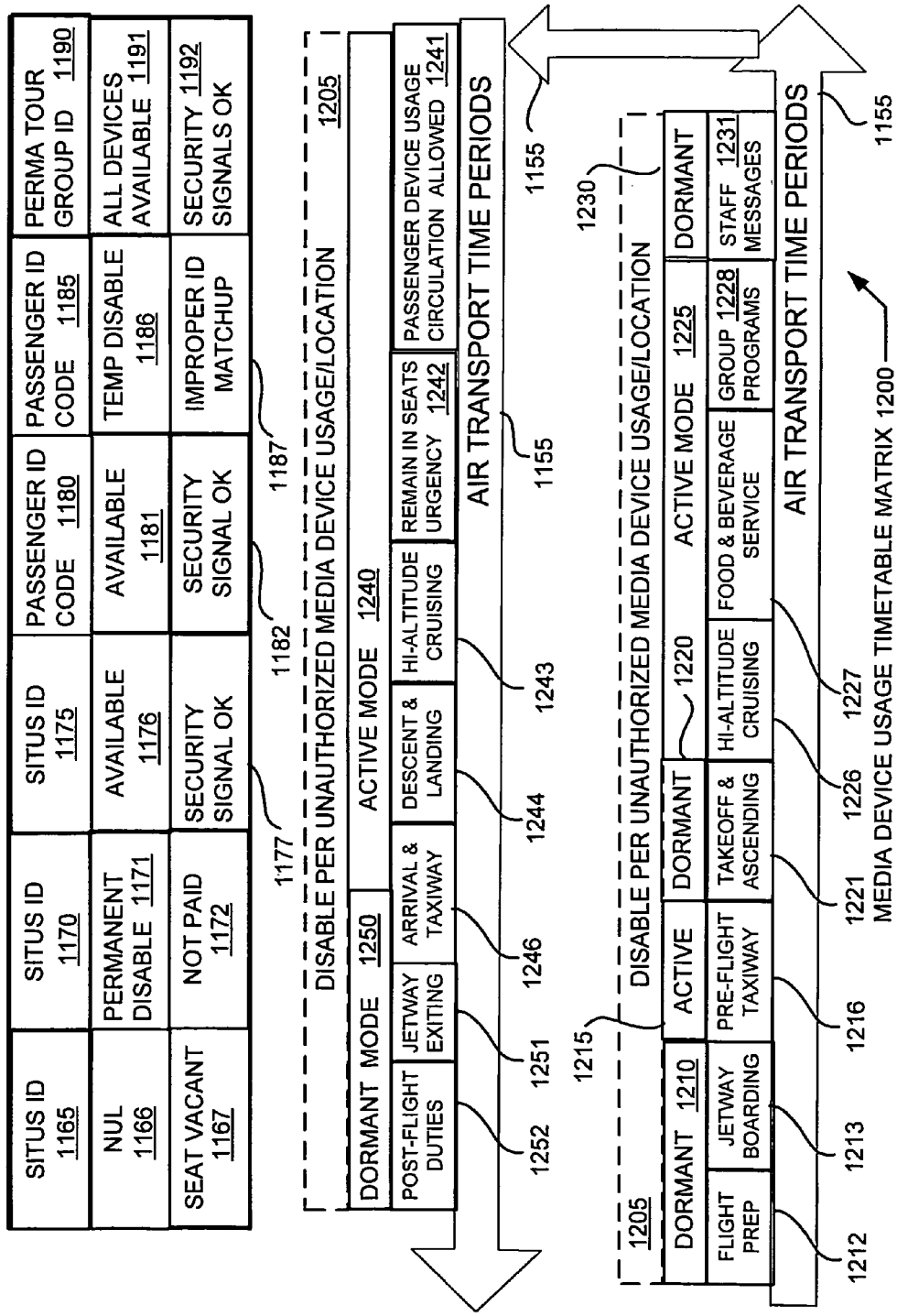
FIG. 47 shows representative status tables regarding media device usage aspects.

Referring to the representative status tables of FIG. 47, an exemplary media device usage status table 1150 may include some interactive electronic media devices that are referenced by an on-board assigned location: situs ID 1165, situs ID 1170, situs ID 1175. Additional interactive electronic media devices are referenced by a specified user designation: passenger ID code 1180, passenger ID code 1185, passenger ID code 1190.

The outputs for usage status table 1150 indicate the following updated parameters for media device associated with situs ID 1165: seat vacant 1167, nul activity 1166. Other outputs indicate the following updated parameters for media device associated with situs ID 1170: account not paid 1172, permanent disable 1171. Further outputs indicate the following updated parameters for media device associated with situs ID 1175: security signal okay 1177, device available 1176.

The outputs for usage status table 1150 indicate the following updated parameters for media device associated with passenger ID code 1180: security signal okay 1182, device available 1181. Other outputs indicate the following updated parameters for media device associated with passenger ID code 1185: improper ID matchup 1187, temporary disable 1186. Further outputs indicate the following updated parameters for media device associated with Perma Tour group ID code 1190: security signals okay 1192, all devices available 1191.

The aforesaid status usage parameters maintained in the status table 1150 can be distributed or made accessible to transit staff or to the respective passenger user or to a computerized processing node configured for further responsive action.

Referring again to FIG. 47, an exemplary media device usage timetable matrix 1200 includes the various data entries showing a coordinated relationship between air transport time periods 1155 and operational modes for electronic media devices on a multipassenger air transport plane. For example, the time periods for flight preparation 1212 and jetway boarding 1213 are coordinated with a dormant operational mode 1210; a subsequent time period for pre-flight taxiway 1216 is coordinated with an active operational mode 1215; and a subsequent time period for takeoff & ascending 1221 is coordinated with a dormant operational mode 1220. During all such time periods it may be possible to implement a necessary media device security remedy to "disable per unauthorized media device usage or location" 1205.

As a further example, a time period for high altitude cruising 1226 or food & beverage service 1227 or group programs 1228 is coordinated with an active operational mode 1225; and another time period for transit staff messages 1231 is coordinated with a dormant operational mode 1230; and a further time period for "allowed passenger device circulation" 1241 is coordinated with an active operational mode 1240. During all such time periods it may be possible to implement a necessary media device security remedy to "disable per unauthorized media device usage or location" 1205.

As a further example, a time period allocated to "remain in seats urgency" 1242 or high altitude cruising 1243 or descent and landing 1244 or arrival & taxiway 1246 is coordinated with an active operational mode 1240. Subsequent time periods for a portion of arrival & taxiway 1246 or jetway exiting 1251 or post flight duties 1252 are coordinated with a dormant operational mode 1250. During all such time periods it may be possible to implement a necessary media device security remedy to "disable per unauthorized media device usage or location" 1205.

In some unexpected circumstances, it would be possible in some embodiments to change the schedule for dormant and active operational modes, and further possible to disable all electronic media devices at any time due to real-time events.

Figure 48:
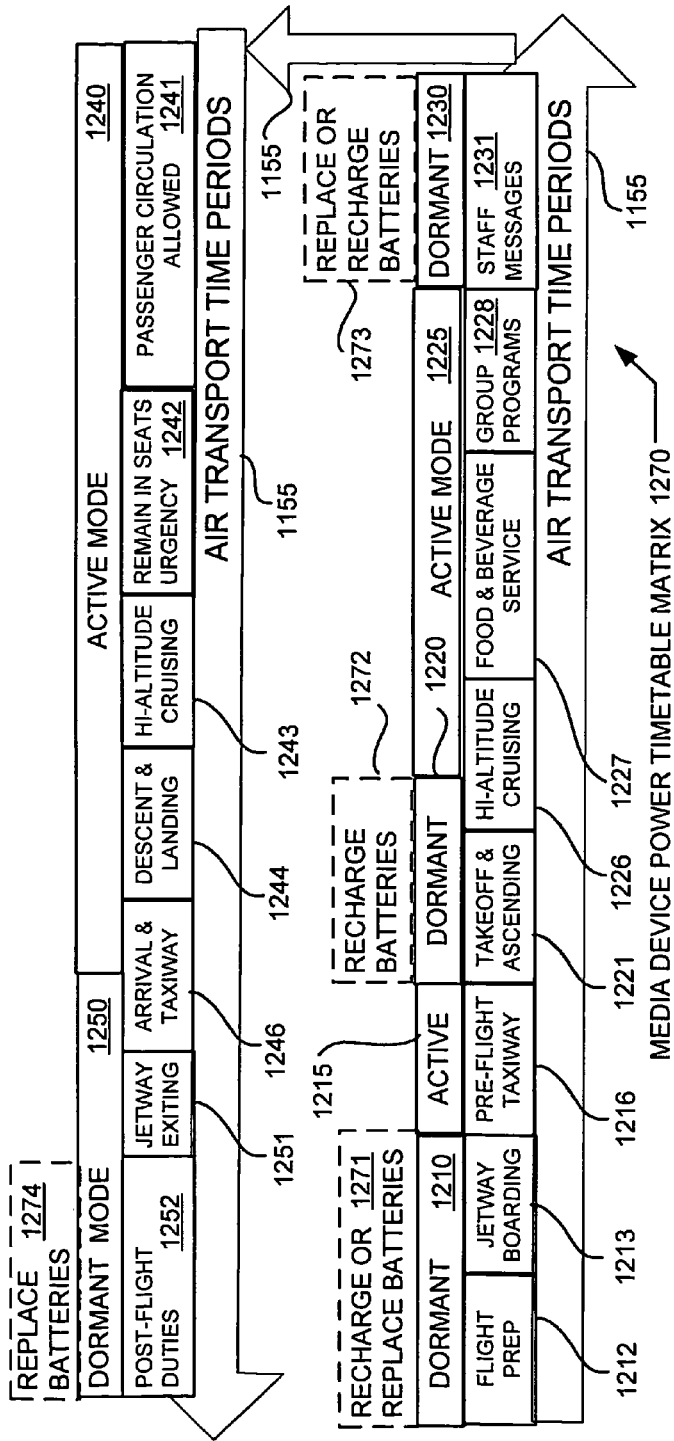
FIG. 48 shows representative status tables regarding media device power aspects.

Referring to the representative status tables of FIG. 48, an exemplary media device power status table 1260 may include previously described interactive electronic media devices that are referenced by the on-board assigned location: situs ID 1165, situs ID 1170, situs ID 1175. Additional previously described interactive electronic media devices are referenced by the specified user designation: passenger ID code 1180, passenger ID code 1185, passenger ID code 1190.

The outputs for usage status table 1260 indicate the following updated electrical power parameters for media device associated with situs ID 1165: seat vacant 1167, full charge battery 1967. Other outputs indicate the following updated electrical power parameters for media device associated with situs ID 1170: account not paid 1172, disconnected battery 1173. Further outputs indicate the following updated electric power parameters for media device associated with situs ID 1175: service signal warning 1179, low battery charge 1178.

The outputs for usage status table 1260 indicate the following updated electrical power parameters for media device associated with passenger ID code 1180: service signal okay 1184, high charge battery 1183. Other outputs indicate the following updated electrical power parameters for media device associated with passenger ID code 1185: service signal alarm 1189, dead battery 1188. Further outputs indicate the following updated electrical power parameters for media device associated with Perma Tour group ID code 1190: service signals okay 1194, all batteries working 1193.

The aforesaid status usage parameters maintained in the status table 1260 can be distributed or made accessible to transit staff or to the respective passenger user or to a computerized processing node configured for further responsive action.

Referring again to FIG. 48, an exemplary media device power timetable matrix 1270 includes the various data entries showing a coordinated relationship between media device operational modes (e.g., active, dormant) and battery power servicing tasks during various air transport time periods 1155 on a multipassenger air transport plane. For example, the time periods for flight preparation 1212 and jetway boarding 1213 are coordinated during dormant operational mode 1210 with a servicing task to recharge or replace batteries 1271; and the subsequent time period for takeoff & ascending 1221 is coordinated during dormant operational mode 1220 with a servicing task to recharge batteries 1272.

As a further example, the time period for transit staff messages 1231 is coordinated during dormant operational mode 1230 with a servicing task to replace or recharge battens 1273; and the subsequent time period for post flight duties 1252 is coordinated during dormant operational mode 1250 with a servicing task to replace batteries 1274.

In some unexpected circumstances, it would be possible in some embodiments to change the schedule for servicing tasks involving power supplied from battery modules, and further possible to disconnect all battery modules at any time due to real-time events.

It will be understood that the specific types of status information depicted in the exemplary data tables of FIGS. 47-48 are for purposes of illustration and are not intended to be limiting. Additional categories and applicable data values and remedial actions may be provided in advance or during real-time events in accordance with efficiency and safety priorities as determined by transit drivers/pilots and on-board or off-board transit staff responsible for administering the various communication functions and security protection schemes disclosed herein. In that regard, some of the data table entries may be expanded or altered in some embodiments and may be shortened or omitted in other embodiments depending on the circumstances.

Figure 49:
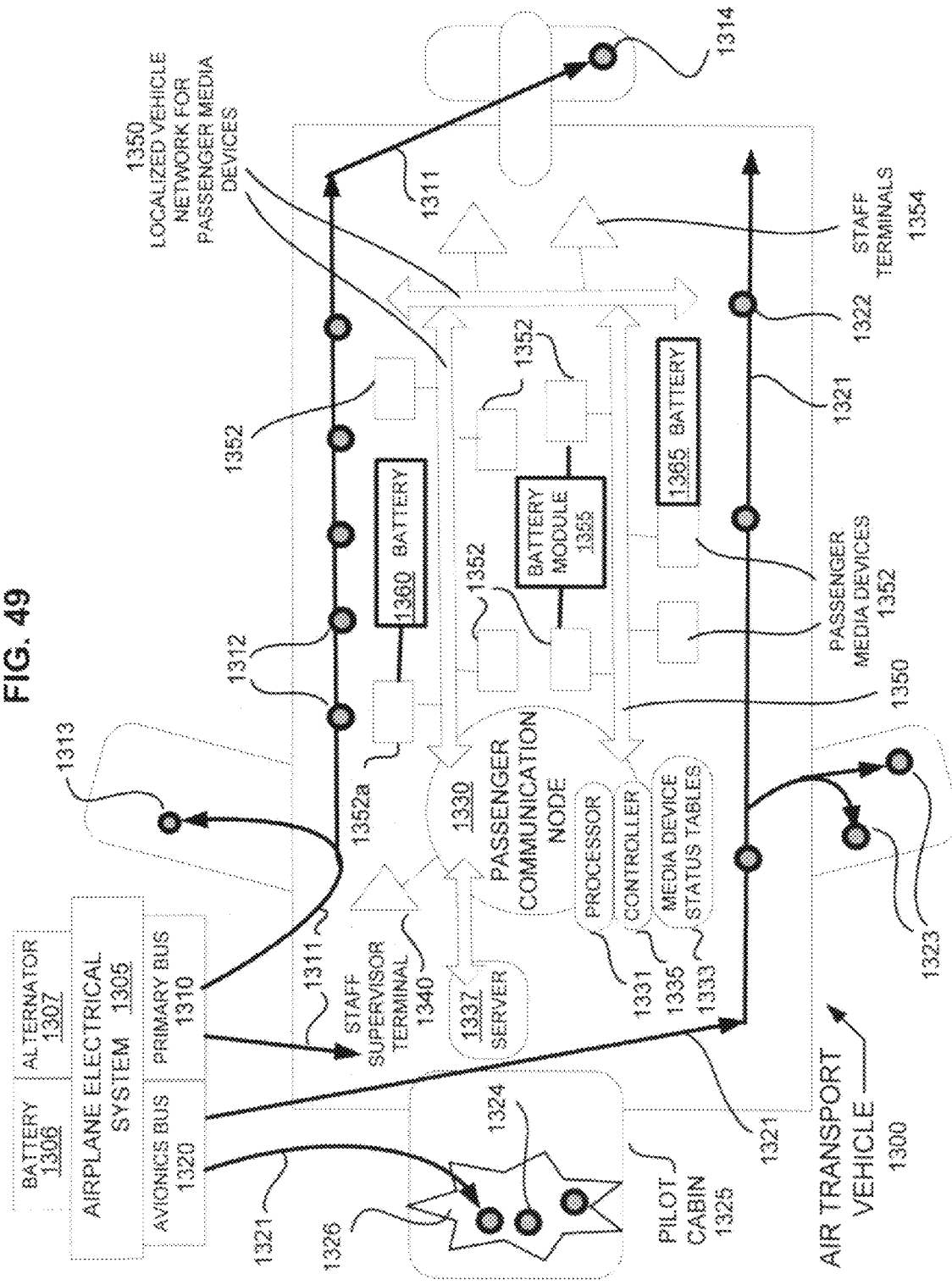
FIG. 49 is a schematic block diagram depicting another exemplary system embodiment for multiple passenger interactive media devices in an air transport vehicle.

Referring to schematic block diagram of FIG. 49, an air transport vehicle 1300 may incorporate a conventional airplane electrical system 1305 with battery 1306, alternator 1307, a primary bus 1310 and an avionics bus 1320. The primary bus 1310 may supply power to conventional electrical components via wired conduit 1311 to various fixtures (e.g., 1312, 1313, 1314) throughout the plane. In addition the avionics bus 1320 may supply power via wired conduit (1321) to precision instrumentation and diagnostic components in the pilot cabin 1325 (e.g., 1324, 1326) as well as elsewhere (e.g., 1322, 1323) throughout the plane.

An exemplary system embodiment for interactive electronic media devices 1352 available for in-transit usage by passengers can be employed without causing significant interference with the existing conventional airplane electrical system 1305. In that regard, individual on-board electronic media devices 1352 may be situated in designated locations for use in transit by approved passengers. Such electronic media devices 1352 may have access to a localized vehicle network 1350 which can provide a communication link between related electronic media devices as well as in some instances a communication link with transit staff terminals 1354. Some embodiments may further provide a staff supervisor terminal 1340 that also has access to the localized vehicle network 1350

An on-board passenger communication node 1330 may also be connected with the passenger media devices 1352 via the localized vehicle network (or via other communication links) to facilitate monitoring or downloading of certain content (e.g., application programs, informational data) that is at least partially determined by a situs ID associated with an assigned place or space for a particular passenger media device, and/or at least partially determined by a passenger ID code associated with an individual passenger or group of related passengers.

The passenger communication node 1330 may include processor 1331, media device status tables 1333, and controller 1335. It will be understood that various functional interactions may be provided between the passenger communication node 1330 and the transit staff (e.g., 1340, 1354) and the passenger media devices 1352 in a manner to provide customized operational capabilities and content management/control as well as to implement applicable security guidelines for the usage and location of such passenger media devices 1352. In that regard a server 337 may be operably coupled with the passenger communication node 1330 to enable some selected content to be accessible remotely to one or more passenger media devices 1352 without a requirement for a download. However some selected content is preferably downloaded to the appropriate interactive electronic media device 1352 to provide content accessibility during periods when an approved passenger's assigned media device 1352 is "off line" or otherwise not qualified for "on-line" access.

As indicated schematically in FIG. 49, an independent power supply (some battery modules are omitted from the drawing for simplicity) is provided in-transit to the passenger media devices 1352 by separate battery units (e.g., battery module 1355 shared by two or more media devices 1352, battery component 1360 separated from its respective media device 1352a, battery 1365 integrated with its respective media device). Various system and process embodiment features are disclosed herein to assure that battery servicing tasks (e.g., replacement, recharging) may be accomplished during appropriate time periods (see FIG. 48) to minimize any disruption of on-board usage of the electronic media devices 1352 by an approved passenger.

As disclosed herein, an exemplary computerized electronic media system embodiment for a multipassenger transport vehicle may include an electronic media device located at a specified on-board site and configured for displaying alphanumeric content and/or visual content that is accessible in transit to an approved passenger, wherein the electronic media device is independently powered by its respective battery module. Other system features may include a storage component coupled to the electronic media device; a communication node configured to install or update or replace or delete certain application programs and/or informational data in the storage component; and a situs identifier correlated with the specified on-board site, wherein the situs identifier determines a category or type of content that is accessible in transit for interactive access by the approved passenger.

In some system embodiments, a controller is configured to implement a selection or modification or cancellation of the aforesaid content in response to an authorization signal from one of the following types of communication node: on-board, off-board, portable, wired, wireless. A further system feature may include a security lockout scheme configured to cause the electronic media device to discontinue some or all operational functions based on detection of its unauthorized removal from the specified on-board site. A related system feature may further provide a GPS security component incorporated with the electronic media device and adapted to indicate its geographic location based on detection of unauthorized removal from the multipassenger transport vehicle.

Additional disclosed system embodiments may provide a local communication link to enable bidirectional transmission of messages during an active operation mode with one or more other related electronic media devices correlated with their respective situs identifiers. Another possible embodiment aspect includes a media device battery module which is configured to be rechargeable or replaceable while the electronic media device is in a dormant operational mode.

Further computerized system components may include various database records or lookup tables including a data table indicative of one or more categories or types of content available for correlation with the situs identifier. Another data table may be configured to indicate of one or more categories or types of application programs available for correlation with the situs identifier. An additional data table may be configured to indicate one or more types of functional operation capabilities available for correlation with the situs identifier.

Some computerized system embodiment components may include a controller configured to activate one or more of the following functional operation capabilities based on a correlation with the situs identifier: removable memory, text messaging, local intercom, Internet link, external phone link, printer, camera, logon protection, security component. An exemplary system controller may also be configured to correlate one or more of the following device metrics with a particular specified on-board site: available usage time period(s), usage duration, free default content, content cost rate, operation capability expense, device mobility fee.

Further system features as disclosed herein may include a wired or wireless communication link from the electronic media device to the communication node for receiving or providing accessibility to audio and/or video content correlated with the situs identifier. Further disclosed system embodiment features include a communication interface configured to receive new or updated or replacement content in response to confirmation of a cash or credit or debit payment made or authorized by the approved passenger during an active or dormant operational mode via a user interface of the electronic media device.

Additional computerized system components may include a passenger-activated control module for selecting and/or monitoring and/or limiting content available to another electronic media device associated with a related individual passenger or group of passengers.

A security feature for some system embodiments may include a disable module for deleting or corrupting or rendering non-functional or illegible certain aspects of the aforesaid content accessible in an interactive display component, or certain aspects of the application programs or informational data maintained in the storage component, responsive to an event indicating that the electronic media device has been subjected to tampering or unauthorized usage or unauthorized access. Another system security component may include a controller configured to implement modification or cancellation of certain content of application program or operation functionality based on completion of the approved passenger's in transit travel.

It will be understood by those skilled in the art that the various components and elements disclosed in the system and schematic diagrams herein as well as the various steps and sub-steps disclosed in the flow charts herein may be incorporated together in different claimed combinations in order to enhance possible benefits and advantages.

The exemplary system, apparatus, and computer program product embodiments disclosed herein including FIGS. 1-5, FIGS. 18-19, FIGS. 32-34, and FIGS. 45-49 along with other components, devices, know-how, skill and techniques known in the art have the capability of implementing and practicing the methods and processes that are depicted in FIGS. 6-17, FIGS. 20-31, and FIGS. 35-44. However it is to be further understood by those skilled in the art that other systems, apparatus and technology may be used to implement and practice such methods and processes.

As disclosed herein, exemplary methods, systems and components are implemented on a multipassenger transit vehicle to provide passenger access to a pre-assigned interactive electronic media device associated with a passenger identification (ID) code or associated with an on-board situs location. The electronic media device may include a storage component, and a battery module that can periodically be replaced or recharged. Security techniques may provide protection against unauthorized usage of each electronic media device, and also help prevent unauthorized removal of the electronic media device from its approved location in the transit vehicle. Selective content may be accessible or downloaded via a communication node, wherein such content may include application programs or informational data specifically correlated with individual electronic media devices or correlated with one or more designated vehicle passengers. The customized content and/or operation capability for the electronic media device may be varied in accordance with predetermined qualifications as well as in some instances by passenger request and/or determined by passenger payment status.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An electronic media device intended for on-board use in a multipassenger transport vehicle comprising:
    an interactive display component located at a specified on-board site accessible to an individual passenger or group of passengers;
    a controller module operatively connected with the interactive display component, wherein the controller module is operable to cause the interactive display component to operate according to provide a dormant operational mode during a first time period and to operate according to provide an active operational mode during a second time period based on a schedule;
    storage media respectively incorporated with or linked to each electronic media device, and operable to maintain content including one or more application programs and/or various informational data in memory during the dormant and active operational modes, wherein the aforesaid content and/or a functional operation capability available in each electronic media device is at least partially determined by a situs identifier correlated with the specified on-board site;
    a communication interface operatively connected to the storage media and operable to enable an on-board or an off-board communication node to periodically receive new or updated or replacement content during the dormant and/or active operational modes, in response to a request initiated by a user prior to coming aboard the multipassenger transport vehicle;
    a verification module operable to determine, based on a situs identifier, a proper or an improper matchup of informational content correlated with an assigned passenger place or space in the multipassenger transport vehicle;
    a user interface accessible to the individual passenger or group of passengers, wherein the user interface is operable to implement a selection or modification or cancellation of the aforesaid content associated with the situs identifier; and
    an individual battery module operatively connected with each electronic media device in a manner to supply independent electrical power to the electronic media device when the multipassenger transport vehicle is in transit.

2. The electronic media device of claim 1 wherein said controller module is operable to correlate one or more of the following device metrics with a particular specified on-board site: available usage time period(s), usage duration, free default content, content cost rate, operation capability expense, device mobility fee.

3. The electronic media device of claim 1 further comprising one or more of the following functional operation capability components: removable memory, text messaging, local intercom, Internet link, external phone link, printer, camera, logon protection, security component.

4. The electronic media device of claim 1, wherein said individual battery module is operable to be incorporated as an integral part of each electronic media device.

5. The electronic media device of claim 1, wherein said individual battery module is operable to be rechargeable or replaceable while the electronic media device is in dormant operational mode during the first time period.

6. The electronic media device of claim 1 wherein said storage media includes the aforesaid content which is at least partially determined by the situs identifier correlated with a specified seat or with closely proximate seats in the multipassenger transport vehicle.

7. The electronic media device of claim 1 wherein said storage media includes the aforesaid content which is at least partially determined by the situs identifier associated with a particular passenger or group of passengers assigned to one or more specified on-board sites in the multipassenger transport vehicle.

8. The electronic media device of claim 1 wherein said storage media includes the aforesaid content which is at least partially determined by the situs identifier incorporated on a passenger identity card or a passenger payment card or an encoded device access card to establish a detectable correlation with the one or more specified on-board sites.

9. The electronic media device of claim 1 wherein said storage media includes the aforesaid content which is at least partially determined by the situs identifier associated with or incorporated on one or more designated electronic media devices to establish a detectable correlation with a specified on-board site.

10. The electronic media device of claim 1 wherein said storage media includes the aforesaid content which is at least partially determined by the situs identifier incorporated as part of a device logon protocol to establish a detectable correlation with the specified on-board site.

11. The electronic media device of claim 1 wherein said storage media includes the aforesaid content which is at least partially determined by the situs identifier associated with a transport ticket reservation or transport ticket purchase or transport boarding pass to establish a detectable correlation with the specified on-board site.

12. The electronic media device of claim 1 wherein said situs identifier includes a specified personal identification number (PIN) associated with a particular passenger or group of passengers to establish a detectable correlation with the specified on-board site.

13. The electronic media device of claim 1 wherein said communication interface is operable to receive such new or updated or replacement content in response to a request initiated during the dormant or active operational mode by an on-board passenger via a user interface of the electronic media device.

14. The electronic media device of claim 1 wherein said communication interface is operable to receive such new or updated or replacement content in response to confirmation of a cash or credit or debit payment made or authorized by an on-board passenger during the dormant operational mode via a user interface of the electronic media device.

15. The electronic media device of claim 1 wherein said communication interface is operable to receive such new or updated or replacement content in response to confirmation of a cash or credit or debit payment made or authorized by an on-board passenger during the active operational mode via a user interface of the electronic device.

16. The electronic media device of claim 1 wherein said communication interface is operable to receive such new or updated or replacement content from a wired or wireless communication node located on the multipassenger transport vehicle.

17. The electronic media device of claim 1 wherein said communication interface is operable to receive such new or updated or replacement content from a portable communication node located on-board the multipassenger transport vehicle.

18. The electronic media device of claim 1 wherein said communication interface is operable to receive such new or updated or replacement content from a wired or wireless communication node located separate and apart from the multipassenger vehicle.

19. The electronic media device of claim 1 wherein said controller module further includes:
a controller operable to implement a selection or modification or cancellation of the situs identifier in response to an authorization signal from one of the following types of communication node: on-board, off-board, portable, fixed location, wired, wireless.

20. The electronic media device of claim 1 wherein said controller module further includes:
a controller operable to implement a selection or modification or cancellation of the situs identifier in response to an authorized request made by an on-board passenger via a user interface of the electronic media device.

21. The electronic media device of claim 1 wherein said controller module further includes:
a controller operable to implement a removal or deletion of user-created or passenger-related information from the electronic media device in response to an authorized request made by an on-board passenger via a user interface of the electronic media device.

22. The electronic media device of claim 1 further comprising:
a user interface accessible to supervisory staff of the multipassenger transport vehicle, wherein the user interface is operable for implementing a selection or modification or cancellation of the aforesaid content associated with the situs identifier.

23. The electronic media device of claim 1, wherein said verification module is operable to transmit notice of such improper matchup to a network terminal accessible to staff personnel of the multipassenger transport vehicle.

24. The electronic media device of claim 1 further comprising:
a disable module linked with said verification module to be responsive to such improper matchup, wherein the disable module is operable to delete or corrupt or render illegible specified aspects of the application program and/or informational data which are maintained in the storage media or on the interactive display component.

25. The electronic media device of claim 1 further comprising:
verification module operably coupled to each situs identifier to confirm a satisfactory matchup of a category or type of informational content with an assigned passenger place or space in the multipassenger transport vehicle.

26. The electronic media device of claim 25, wherein said verification module is operable to transmit notice of such satisfactory matchup to a network terminal accessible to staff personnel of the multipassenger vehicle.

27. The electronic media device of claim 1 further comprising:
an input device for scanning or receiving an authorization code associated with a satisfactory matchup of the situs identifier with a particular passenger or group of passengers, wherein the authorization code is adapted to activate the electronic media device.

28. A method for selective media content available to on-board passengers in a multipassenger transport vehicle comprising:
displaying selected alphanumeric content and/or visual content in an interactive electronic media device that is accessible based on an assigned place or space occupied by an approved passenger in the multipassenger transport vehicle;
providing a separate storage component respectively coupled to the interactive electronic media device;

control the interactive electronic media device to operate according to a dormant operational mode during a first time period and to operate according to an active operational mode during a second time period based on a schedule;

enabling a communication node to install or update or replace or delete content including certain application programs and/or informational data in the separate storage component during the dormant operational mode or during the active operational mode, in response to a request initiated by a user prior to coming aboard the multipassenger transport vehicle;

establishing a situs identifier for the assigned place or space in the transport vehicle, wherein the situs identifier determines a category or type of the selected content correlated with the interactive electronic media device accessible to the approved passenger;

determining, based on the situs identifier, a proper or an improper matchup of the application programs and/or the informational data with an assigned passenger place or space in the multipassenger transport vehicle;

providing a user interface accessible to the individual passenger or group of passengers, wherein the user interface is operable to implement a selection or modification or cancellation of the aforesaid content associated with the situs identifier; and operatively connecting an individual battery module with the electronic media device to supply independent electrical power while the multipassenger transport vehicle is in transit.

29. The method of claim 28 further comprising:
providing a functional operation capability to be available in each electronic media device based on a correlation with the situs identifier for the assigned place or space in the transport vehicle.

30. The method of claim 29 further comprising:
making one or more of the following functional operation capabilities available based on a correlation with the situs identifier: removable memory, text messaging, local intercom, Internet link, external phone link, printer, camera, logon protection, security component.

31. The method of claim 28 further comprising:
correlating one or more of the following device metrics with a particular specified on-board site: available usage time period(s), usage duration, free default content, content cost rate, operation capability expense, device mobility fee.

32. The method of claim 28 further comprising:
implementing a data retrieval protocol sufficient to transfer appropriate application programs and/or informational data to a different interactive electronic media device via induction or wired link or wireless link, in response to a detected malfunction of the electronic media device.

33. The method of claim 28 further comprising:
facilitating passenger interaction with the interactive electronic media device via a user interface that includes one or more of the following type of interaction techniques: touch screen, mouse device, keyboard, scroll control, pointer bar, audio input, voice command, video input, webcam gesture detection, webcam expression recognition.

34. The method of claim 28 further comprising:
providing passenger access to an interactive display component that includes one of more of the following types of display techniques: electronic paper, low-power display, no-power image retention, light emitting diode (LED), conditional backlighting, active emission, liquid crystal display, projector.

35. The method of claim 28 further comprising:
providing passenger access to a data table indicative of one or more categories or types of content or program applications available for correlation with the situs identifier.

36. The method of claim 28 further comprising:
providing a passenger-activated control module for selecting and/or monitoring and/or limiting content available to the interactive electronic media device associated with the assigned place or space for another related individual passenger or group of passengers.

37. The method of claim 28 further comprising:
providing passenger access to a data table indicative of one or more functional operation capabilities of the interactive electronic media device available for correlation with the situs identifier.

38. The method of claim 28 further comprising:
providing passenger access via the interactive electronic media device to informational data regarding seat-dependent safety and/or evacuation procedures and/or rest room facilities correlated with the situs identifier associated with the assigned place or space in the multipassenger transport vehicle.

39. A computer program product comprising a non-transitory computer-readable media having encoded instructions for executing the following method for facilitating management and control of selective media content to be available in a multipassenger transport vehicle, wherein the method includes:

providing selected alphanumeric and/or visual content to an interactive display component of an electronic media device that is accessible to an approved in transit passenger located at an assigned place or space;

maintaining such selected content in a separate storage component respectively coupled to the electronic media device;

control the interactive display component to operate according to a dormant operational mode during a first time period and to operate according to an active operational mode during a second time period based on a schedule;

enabling a communication node to install or replace or delete content including certain application programs and/or informational data in the separate storage component during the dormant operational mode or during the active operational mode, in response to a request initiated by a user prior to coming aboard the multipassenger transport vehicle;

confirming a situs identifier for the assigned place or space in the transport vehicle, wherein the situs identifier determines a category or type of the aforesaid content correlated with the electronic media device accessible to the approved passenger;

determining, based on the situs identifier, a proper or an improper matchup of the application programs and/or the informational data with an assigned passenger place or space in the multipassenger transport vehicle;

providing a user interface accessible to the individual passenger or group of passengers, wherein the user interface is operable to implement a selection or modification or cancellation of the aforesaid content associated with the situs identifier; and drawing energy for the electronic media device from an individual battery module that supplies independent electrical power while the multipassenger transport vehicle is in transit.

40. The computer program product of claim 39, wherein said method further includes:
enabling bidirectional transmission of or exchange of messages during the active operational mode with one or more other related electronic media devices correlated with their respective on-board sites.

41. The computer program product of claim 39, wherein said method further includes:
processing credit authorization or payment confirmation associated with a particular approved passenger or group of passengers, wherein such authorization or confirmation enables one or more of the following: activation of the electronic media device, travel reservation, overnight accommodation, in transit food or beverage, optional audio and/or video content.

42. The computer program product of claim 39, wherein said method further includes:
enabling access to informational data regarding free or extra cost audio and/or video content available in transit including optional magazine or book or news or entertainment content correlated with the situs identifier, wherein such optional content is made available via the electronic media device to a particular approved passenger or group of passengers associated with an assigned place or space in the multipassenger transport vehicle.

43. The computer program product of claim 39, wherein said method further includes:
enabling access to free or extra cost audio and/or video content regarding an optional domestic or foreign language content choice which is correlated with the situs identifier, wherein such optional content choice is made available in transit to a particular approved passenger or group of passengers associated with an assigned place or space in the multipassenger transport vehicle.

44. The computer program product of claim 39, wherein said method further includes:
enabling access via the electronic media device to free or extra cost audio and/or video content regarding an optional content choice for a game or educational material or an instructional course which is correlated with the situs identifier, wherein such optional content choice is made available in transit to a particular approved passenger or group of passengers associated with the assigned place or space in the multipassenger transport vehicle.

45. The computer program product of claim 39, wherein said method further includes:
enabling passenger access via the electronic media device to passenger related data including one or more of the following type or category: car rental, hotel rental, arrival instructions, map destination directions, destination weather, baggage status, travel status of related group members, pre-school content, school-age content.

46. The computer program product of claim 39, wherein said method further includes:
enabling passenger access via the electronic media device to informational and/or advertising and/or entertainment content associated with one or more of the following type of demographic characteristics of the individual passenger or group of passengers: age, gender, ethnicity, religion, culture, nationality.

47. The computer program product of claim 39, wherein said method further includes:
enabling passenger access via the electronic media device to content which is selected in accordance with a regulation or requirement or rule applicable to the geographic travel location of the multipassenger transport vehicle.

48. The computer program product of claim 39, wherein said method further includes:
selecting and/or monitoring and/or limiting content available to the electronic media device associated with an assigned place or space in the multipassenger transport vehicle.

49. The computer program product of claim 48, wherein said method further includes:
selecting and/or monitoring and/or limiting content available to the electronic media device associated with one or more of the following types of assigned place or space in the multipassenger transport vehicle: seat, room, dining area, lounge, game room, bedroom, library, cafe, bar, aisle, observation deck, theater.

50. The computer program product of claim 39, wherein said method further includes:
enabling passenger access to a data table indicative of one or more categories or types of the aforesaid content and/or a functional operation capability available for correlation with the situs identifier.

51. The computer program product of claim 39, wherein said method further includes:
enabling passenger capability for selecting and/or monitoring and/or limiting content regarding an electronic media device associated with an assigned place or space for another related individual passenger or group of passengers.

* * * * *